United States Patent
Fukushige

(10) Patent No.: US 12,357,910 B2
(45) Date of Patent: Jul. 15, 2025

(54) PROGRAM, METHOD, AND INFORMATION TERMINAL DEVICE

(71) Applicant: COLOPL, INC., Tokyo (JP)

(72) Inventor: Junya Fukushige, Tokyo (JP)

(73) Assignee: COLOPL, INC., Tokyo (JP)

( * ) Notice: Subject to any disclaimer, the term of this patent is extended or adjusted under 35 U.S.C. 154(b) by 495 days.

(21) Appl. No.: 17/606,633

(22) PCT Filed: Jun. 22, 2020

(86) PCT No.: PCT/JP2020/024304
§ 371 (c)(1),
(2) Date: Oct. 26, 2021

(87) PCT Pub. No.: WO2020/218625
PCT Pub. Date: Oct. 29, 2020

(65) Prior Publication Data
US 2022/0233956 A1 Jul. 28, 2022

(30) Foreign Application Priority Data
Apr. 26, 2019 (JP) .................. 2019-086380

(51) Int. Cl.
*A63F 13/428* (2014.01)
*A63F 13/525* (2014.01)
(Continued)

(52) U.S. Cl.
CPC .......... *A63F 13/428* (2014.09); *A63F 13/525* (2014.09); *A63F 13/53* (2014.09); *G06T 13/40* (2013.01); *G06T 19/006* (2013.01)

(58) Field of Classification Search
CPC ....... G06T 13/40; G06T 19/006; G06F 3/011; A63F 13/00; A63F 13/213; A63F 13/25;
(Continued)

(56) References Cited

U.S. PATENT DOCUMENTS 6,917,370 B2 * 7/2005 Benton ................. G06T 19/006
345/204
9,377,626 B2 * 6/2016 Lyons .................. G02B 27/022
(Continued)

FOREIGN PATENT DOCUMENTS

JP 2003-346190 A 12/2003
JP 2018-094326 A 6/2018
(Continued)

OTHER PUBLICATIONS

Tuomas Kantonen et al., "Mixed Reality in Virtual World Teleconferencing", 2010 IEEE Virtual Reality Conference, Mar. 20-24, 2010, pp. 179-182, ISBN: 978-1-4244-6237-7, DOI: 10.1109/VR.2010.5444792, IEEE.
(Continued)

*Primary Examiner* — Milap Shah
(74) *Attorney, Agent, or Firm* — MICHAEL BEST & FRIEDRICH LLP

(57) ABSTRACT

An image of an augmented reality space, in which a character is arranged with respect to an acquired image acquired by the imaging sensor, is displayed on the display unit, and the behavior of the character in the augmented reality space is produced on the basis of data transmitted from an external source, wherein the data is motion data and sound data that are input by a performer who plays live as the character.

17 Claims, 33 Drawing Sheets

(51) Int. Cl.
*A63F 13/53* (2014.01)
*G06T 13/40* (2011.01)
*G06T 19/00* (2011.01)

(58) Field of Classification Search
CPC ...... A63F 13/428; A63F 13/52; A63F 13/525; A63F 13/53; A63F 13/86; A63F 2300/8982
See application file for complete search history.

(56) References Cited

U.S. PATENT DOCUMENTS

| | | | |
|---|---|---|---|
| 10,198,871 B1* | 2/2019 | Hariton | G06T 19/006 |
| 2006/0277474 A1 | 12/2006 | Robarts et al. | |
| 2009/0221374 A1 | 9/2009 | Yen et al. | |
| 2011/0242134 A1* | 10/2011 | Miller | G06F 3/017 |
| | | | 345/633 |
| 2013/0278631 A1* | 10/2013 | Border | G06F 3/04842 |
| | | | 345/633 |
| 2013/0303285 A1* | 11/2013 | Kochi | A63F 13/00 |
| | | | 463/32 |
| 2014/0306866 A1* | 10/2014 | Miller | G06T 19/006 |
| | | | 345/8 |
| 2014/0375688 A1* | 12/2014 | Redmann | H04L 12/1822 |
| | | | 345/633 |
| 2016/0026253 A1* | 1/2016 | Bradski | H04N 13/128 |
| | | | 345/8 |
| 2017/0160815 A1* | 6/2017 | Glazier | G06F 3/017 |
| 2017/0213473 A1* | 7/2017 | Ribeira | G06T 19/00 |
| 2017/0269713 A1* | 9/2017 | Marks | A63F 13/86 |
| 2017/0293351 A1* | 10/2017 | Li | G06F 3/0236 |
| 2018/0001198 A1 | 1/2018 | Frappiea | |
| 2018/0136814 A1* | 5/2018 | Parekkadan | G06T 19/006 |
| 2018/0260023 A1* | 9/2018 | Perlin | G06F 1/1626 |
| 2019/0051101 A1* | 2/2019 | Russ | G07F 17/3211 |
| 2019/0057551 A1* | 2/2019 | Mathwig | G06F 3/011 |
| 2019/0094981 A1 | 3/2019 | Bradski et al. | |
| 2019/0196690 A1* | 6/2019 | Chong | G06F 3/04815 |
| 2019/0358547 A1* | 11/2019 | Mack | H04N 21/2187 |
| 2020/0061470 A1 | 2/2020 | Kidera | |
| 2020/0289935 A1* | 9/2020 | Azmandian | G06F 3/04815 |
| 2020/0298112 A1* | 9/2020 | Fish | A63F 13/332 |
| 2020/0368616 A1* | 11/2020 | Delamont | H04N 13/239 |
| 2021/0166485 A1* | 6/2021 | Islamov | G06T 7/70 |
| 2022/0233956 A1 | 7/2022 | Fukushige | |

FOREIGN PATENT DOCUMENTS

| | | |
|---|---|---|
| JP | 2018-124926 A | 8/2018 |
| JP | 6776400 B1 | 10/2020 |
| WO | 2014/164901 A1 | 10/2014 |
| WO | WO-2018/158836 A1 | 9/2018 |

OTHER PUBLICATIONS

Lucia Vera et al., "Augmented Mirror: Interactive Augmented Reality System Based on Kinect", 13th International Conference on Human-Computer Interaction (INTERACT), Sep. 5, 2011, pp. 483-486, ISBN: 978-3-540-74549-5, DOI: 10.1007/978-3-642-23768-3_63.hal-01597008, International Federation for Information Processing.

Michael E. Walker et al., "The Influence of Size in Augmented Reality Telepresence Avatars", 2019 IEEE Conference on Virtual Reality and 3D User Interfaces, Mar. 23-27, 2019, pp. 538-546, ISBN: 978-1-7281-1377-7/19, DOI: 10.1109/VR.2019.8798152, IEEE.

E. Jovanov et al., "Avator—a Multi-sensory System for Real Time Body Position Monitoring", 31st Annual International Conference of the IEEE EMBS, Sep. 2-6, 2009, pp. 2462-2465, ISBN: 978-1-4244-3296-7, DOI: 10.1109/IEMBS.2009.5334774, IEEE.

Felix Born et al., "Increasing Presence in a Mixed Reality Application by Integrating a Real Time Tracked Full Body Representation", SAT 2015 18th International Conference, Advances in Computer Entertainment Technology, Sep. 24-27, 2015, pp. 46-60 (Part of the Lecture Notes in Computer Science book series, vol. 10714), ISBN: 978-3-540-74549-5, DOI: 10.1007/978-3-319-76270-8_4, Springer International Publishing AG.

The Extended Search Report in European Application No. 20795721.8, Dated Apr. 24, 2023.

International Search Report issued in Application No. PCT/JP2020/024304, mailed Sep. 1, 2020.

Office Action issued in Japanese Application No. 2019-086380, dated Apr. 7, 2020.

Website, MoguLive, "AR application "Elmina AR" that connects the world of VTuber and reality is now available" Jun. 18, 2018, URL, https://www.moguravr.com/vtuber-elmina-ar/, Mogura Inc. Japan.

Minoru Hirota, 26,000 people in 2D—Possibility created by VR character live "HoloLive", webpage <http://panora.tokyo/46586>, Dec. 10, 2017, Retrieved from Internet Archive Wayback Machine <https://web.archive.org/web/20190509071543/http://panora.tokyo:80/46586/>, Panora (Panora Virtual Reality Japan).

Office Action issued in Japanese Application No. 2020-169525, Drafted May 26, 2023, Issued May 30, 2023.

* cited by examiner

FIG. 16

| USER | TAG |
|---|---|
| A A A A A | A MAGAZINE, 10 F, A BOSS, and "WINNING AGAINST THE BOSS BECAUSE OF GIFT OF THE MAGAZINE" |
| B B B B B | A FIRST-AID KIT, 3 F, ZAKO, and "RESTORATION IMMEDIATELY BEFORE GAME OVER" |
| C C C C C | A BARRICADE, 5 F, ZAKO, and "STOP TWO ZOMBIES FROM COMING HERE USING BARRICADE" |
| ⋮ | ⋮ |

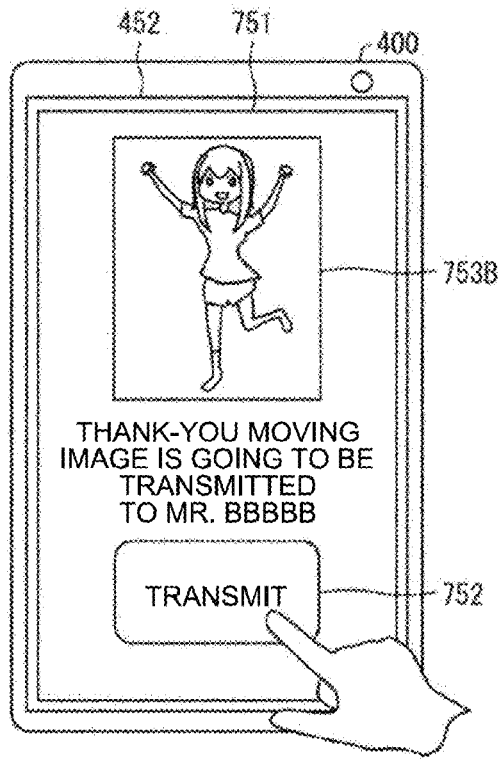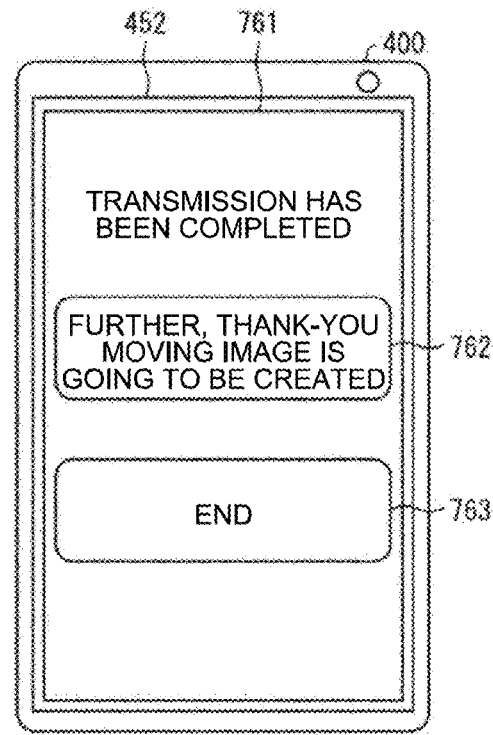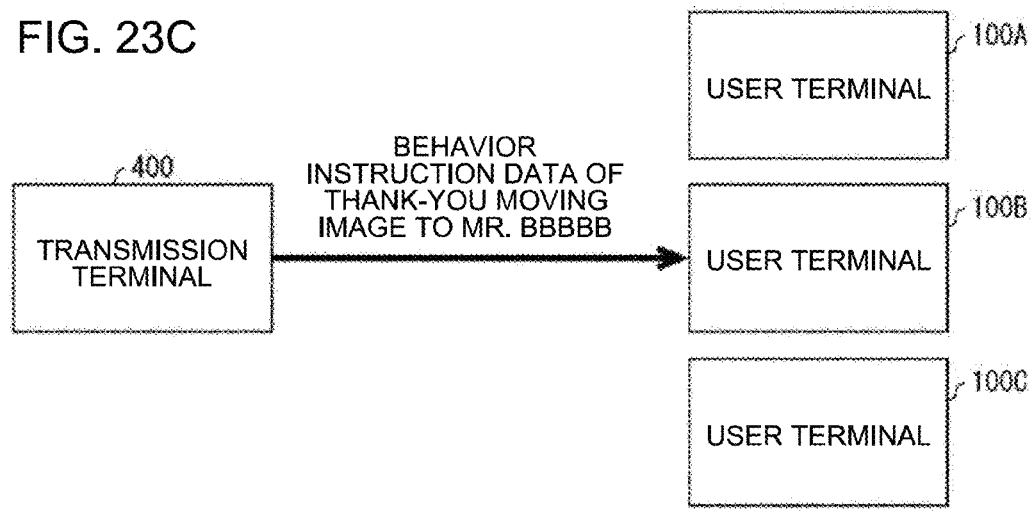

PROGRAM, METHOD, AND INFORMATION TERMINAL DEVICE

TECHNICAL FIELD

The present invention relates to a program, a method, and an information terminal device.

BACKGROUND ART

As an application installed on an information terminal device, there is an application that produces the behaviors of a predetermined character and other objects that are superimposed on a captured image captured by a camera, and changes the motion of the character or a dialog to be uttered by the character, depending on a time zone.

CITATION LIST

Non-Patent Literature

Non-Patent Literature 1: MoguLive, Distribution start of an AR application "Elmina AR" connecting a world of VTuber and reality, Jun. 18, 2018, [online], searched on Apr. 23, 2019, URL, https://www.moguravr.com/vtuber-elmina-ar/

SUMMARY OF INVENTION

Technical Problem

In the conventional application, however, the character is controlled in accordance with data in which the motion and dialogue of the character are recorded and prepared in advance. For this reason, variations in behavior of the character become poor and monotonous, and there is room for improvement in attracting users' attention.

The present invention has been conceived in view of such circumstances, and an object thereof is to provide a program, method, and information terminal device which are capable of attracting users' attention more than those of the prior art.

Solution to Problem

According to an aspect of an embodiment of the present disclosure, there is provided a program to be executed in an information terminal device which includes a processor, a memory, an input unit, a display unit, and an imaging sensor, the program causing the processor to execute the steps of: displaying on the display unit an image of an augmented reality space where a character is arranged with respect to an acquired image acquired by the imaging sensor; and producing the behavior of the character in the augmented reality space on the basis of data transmitted from an external source, wherein the data is motion data and sound data that are input by a performer who plays live as the character.

According to an aspect of an embodiment, there is provided a method to be executed by an information terminal device which includes a processor, a memory, an input unit, a display unit, and an imaging sensor, the method including the steps of: displaying on the display unit an image of an augmented reality space where a character is arranged with respect to an acquired image acquired by the imaging sensor; and producing a behavior of the character in the augmented reality space on the basis of data transmitted from an external source, wherein the data is motion data and sound data that are input by a performer who plays live as the character.

According to an aspect of an embodiment, there is provided an information terminal device which includes a processor, a memory, an input unit, a display unit, and an imaging sensor. The information terminal device is configured to: display on the display unit an image of an augmented reality space where a character is arranged with respect to an acquired image acquired by the imaging sensor; and produce the behavior of the character in the augmented reality space on the basis of data transmitted from an external source, wherein the data is motion data and sound data that are input by a performer who plays live as the character.

Advantageous Effects of Invention

According to the present invention, it is possible to attract users' attention more than the prior art.

BRIEF DESCRIPTION OF DRAWINGS

FIG. 16 is a diagram showing a specific example of a list of users who participate in a game according to an embodiment.

FIGS. 23A to 23C are diagrams showing further another specific example of a screen displayed on the transmission terminal according to an embodiment and an overview of transmission of behavior instruction data.

DESCRIPTION OF EMBODIMENTS

Figure 1:
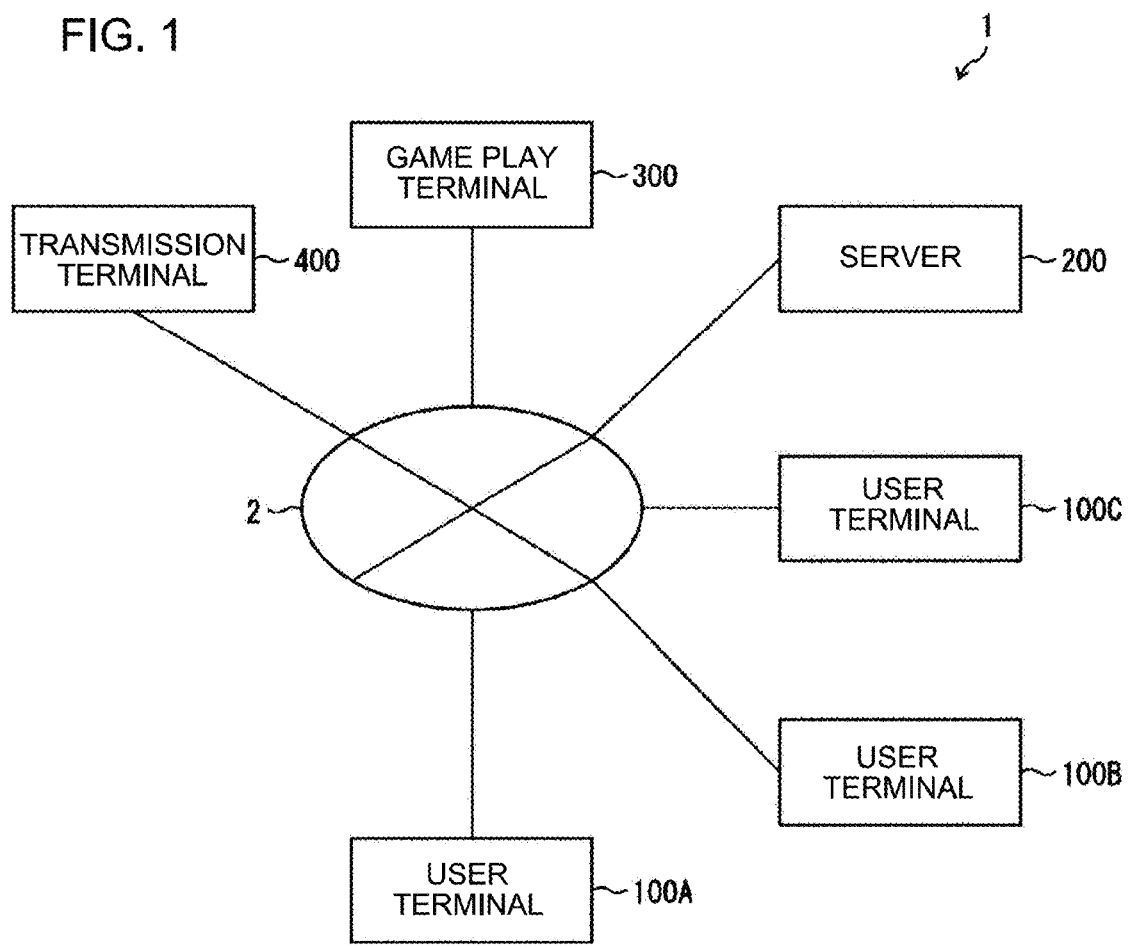
FIG. 1 is a diagram showing an overview of a system according to an embodiment.

A system according to the present disclosure is a system for providing a game to a plurality of users. The system will be described below with reference to the drawings. The present invention is not limited to these illustrations but is indicated by the scope of the claims, and it is intended that the present invention includes all modifications within the meaning and scope equivalent to the scope of the claims. In the following description, the same components are denoted by the same reference numerals in the description of the drawings, and will not be repeatedly described.

<Overview of Operations of System 1>

FIG. 1 is a diagram showing an overview of a system 1 according to the present embodiment. The system 1 includes a plurality of user terminals 100 (computers), a server 200, a game play terminal 300 (an external device, a second external device), and a transmission terminal 400 (an external device, a first external device). In FIG. 1, user terminals 100A to 100C, that is, three user terminals 100 are shown as an example of the plurality of user terminals 100, but the number of user terminals 100 is not limited to the shown example. In the present embodiment, the user terminals 100A to 100C are described as "user terminals 100" when being not necessary to be distinguished from each other. The user terminal 100, the game play terminal 300, and the transmission terminal 400 are connected to the server 200 via a network 2. The network 2 is configured by various mobile communication systems constructed by the Internet and a wireless base station. Examples of the mobile communication system include so-called 3G and 4G mobile communication systems, LTE (Long Term Evolution), and a wireless network (for example, Wi-Fi (registered trademark)) that can be connected to the Internet through a predetermined access point.

(Overview of Game)

In the present embodiment, as an example of a game provided by the system 1 (hereinafter, referred to as "main game"), a game mainly played by the user of the game play terminal 300 will be described. Hereinafter, the user of the game play terminal 300 called a "player". As an example, the player (performer) operates one or more characters appearing in the main game to carry on the game. In the main game, the user of the user terminal 100 plays a role of supporting the progress of the game by the player. Details of the main game will be described below. The game provided by the system 1 may be a game in which a plurality of users participate, and no limitation to this example is intended.

(Game Play Terminal 300)

The game play terminal 300 controls the progress of the game in response to operations input by the player. Further, the game play terminal 300 sequentially transmits information (hereinafter, game progress information) generated by a player's game play to the server 200 in real time.

(Server 200)

The server 200 sends the game progress information (second data) received in real time from the game play terminal 300, to the user terminal 100. In addition, the server 200 mediates the sending and reception of various types of information between the user terminal 100, the game play terminal 300, and the transmission terminal 400.

(Transmission Terminal 400)

The transmission terminal 400 generates behavior instruction data (first data) in response to operations input by the user of the transmission terminal 400, and transmits the behavior instruction data to the user terminal 100 via the server 200. The behavior instruction data is data for reproducing a moving image on the user terminal 100, and specifically, is data for producing behaviors of characters appearing in the moving image.

In the present embodiment, as an example, the user of the transmission terminal 400 is a player of the main game. Further, as an example, the moving image reproduced on the user terminal 100 based on the behavior instruction data is a moving image in which the characters operated by the player in the game behave. The "behavior" is to move at least a part of a character's body, and also includes a speech.

Therefore, the behavior instruction data according to the present embodiment includes, for example, sound data for controlling the character to speak and motion data for moving the character's body.

As an example, the behavior instruction data is sent to the user terminal 100 after the main game is over. Details of the behavior instruction data and the moving image reproduced based on the behavior instruction data will be described below.

(User Terminal 100)

The user terminal 100 receives game progress information in real time, and generate a game screen to display using the information. In other words, the user terminal 100 reproduces the game screen of the game being played by the player in real-time rendering. Thereby, the user of the user terminal 100 can visually recognize the same game screen as the game screen that the player visually recognize while playing the game at substantially the same timing as the player.

In addition, the user terminal 100 generates information for supporting the progress of the game by the player in response to the operation input by the user, and sends the information to the game play terminal 300 via the server 200. Details of the information will be described below.

Further, the user terminal 100 receives the behavior instruction data from the transmission terminal 400, and generates and reproduces a moving image (video) using the behavior instruction data. In other words, the user terminal 100 reproduces the behavior instruction data by rendering.

<Hardware Configuration of System 1>

Figure 2:
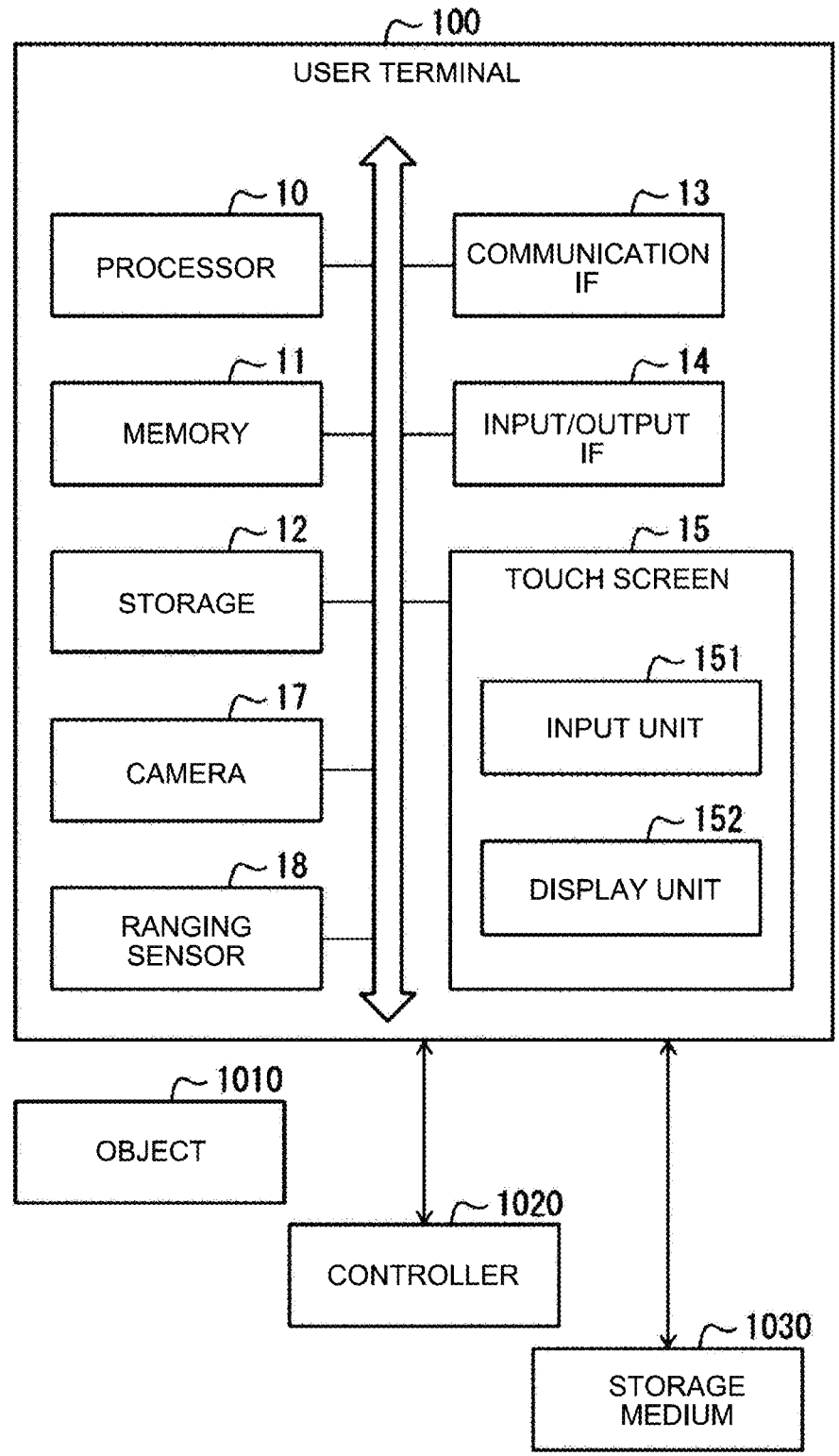
FIG. 2 is a diagram showing a hardware configuration of a user terminal according to an embodiment.
Figure 3:
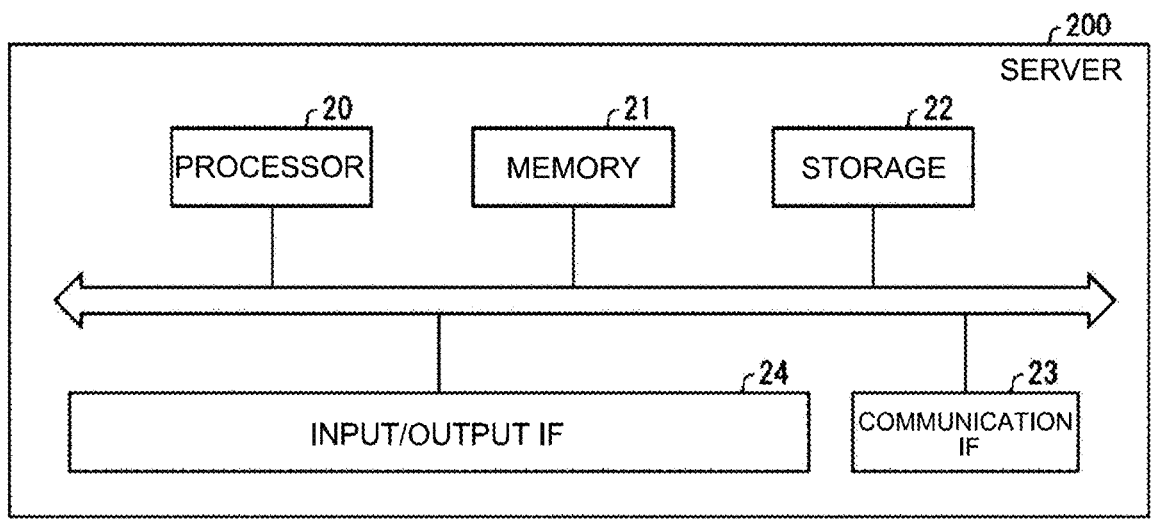
FIG. 3 is a diagram showing a hardware configuration of a server according to an embodiment.
Figure 4:
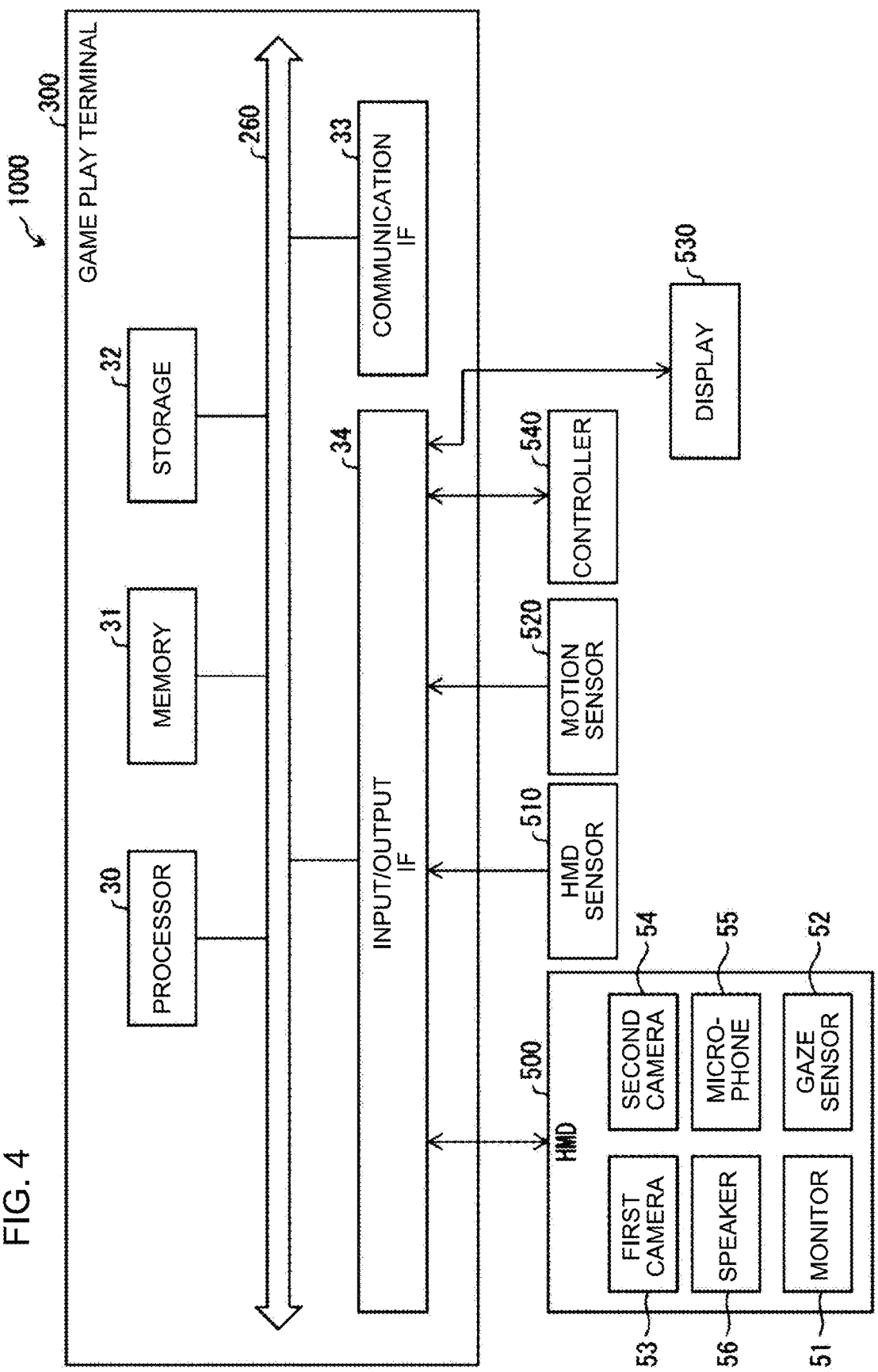
FIG. 4 is a diagram showing a hardware configuration of a game play terminal according to an embodiment.
Figure 5:
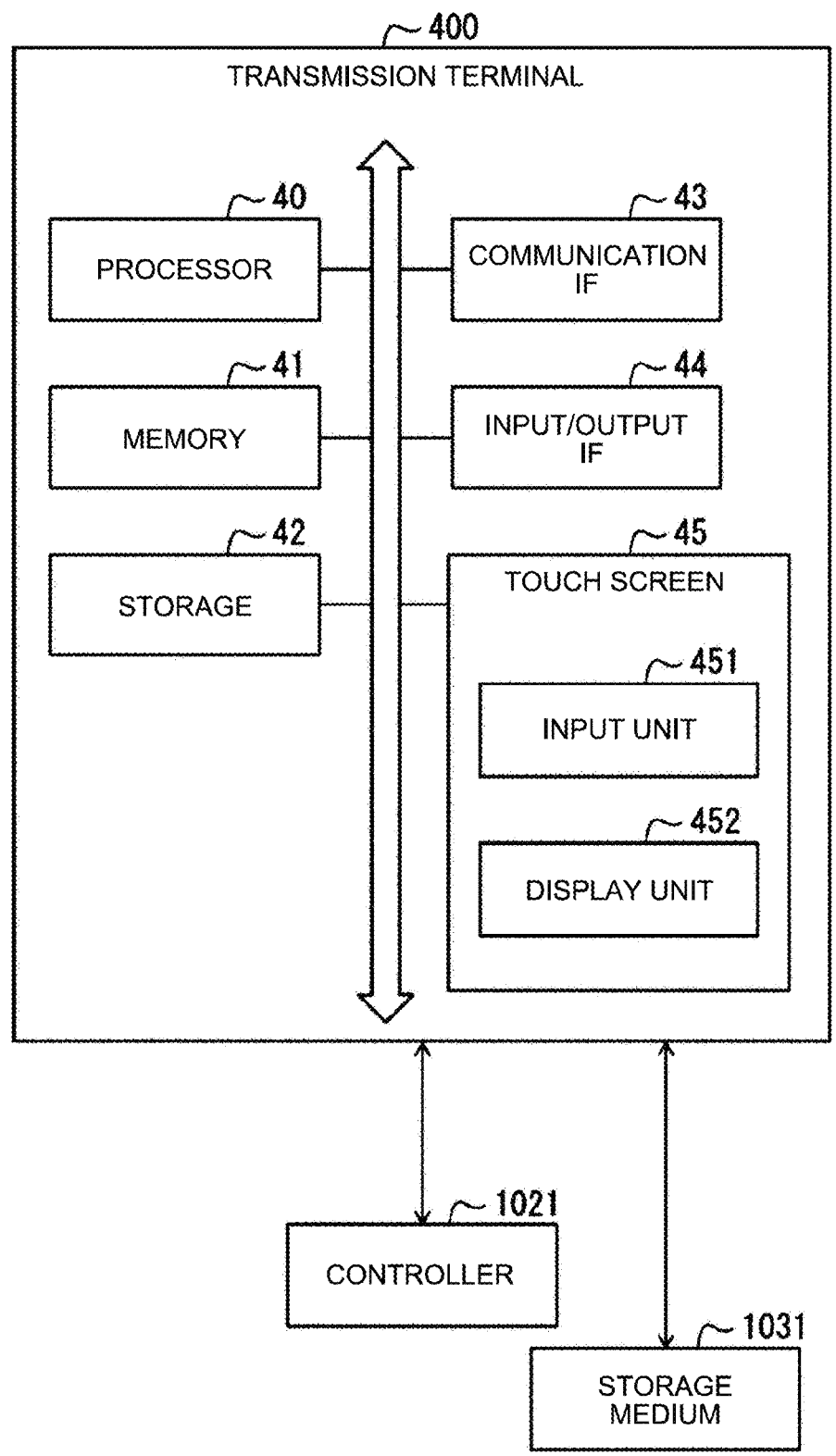
FIG. 5 is a diagram showing a hardware configuration of a transmission terminal according to an embodiment.

FIG. 2 is a diagram showing a hardware configuration of the user terminal 100. FIG. 3 is a view showing a hardware configuration of the server 200. FIG. 4 is a diagram showing a hardware configuration of the game play terminal 300. FIG. 5 is a diagram showing a hardware configuration of the transmission terminal 400.

(User Terminal 100)

In the present embodiment, as an example, an example is described in which the user terminal 100 is implemented as a smartphone, but the user terminal 100 is not limited to the smartphone. For example, the user terminal 100 may be implemented as a feature phone, a tablet computer, a laptop computer (a so-called notebook computer), or a desktop computer. Further, the user terminal 100 may be a game device suitable for a game play.

As shown in FIG. 2, the user terminal 100 includes a processor 10, a memory 11$a$, a storage 12, a communication interface (IF) 13, an input/output IF 14, a touch screen 15 (display unit), a camera 17, and a ranging sensor 18. These components of the user terminal 100 are electrically connected to one another via a communication bus. The user terminal 100 may include an input/output IF 14 that can be connected to a display (display unit) configured separately from a main body of the user terminal 100 instead of or in addition to the touch screen 15.

Further, as shown in FIG. 2, the user terminal 100 may be configured to have the capability to communicate with one or more controller 1020. The controller 1020 establishes communication with the user terminal 100 in accordance with a communication standard, for example, Bluetooth (registered trademark). The controller 1020 may include one or more button, and sends an output value based on the user's input operation to the button to the user terminal 100. In addition, the controller 1020 may include various sensors such as an acceleration sensor and an angular velocity sensor, and sends the output values of the various sensors to the user terminal 100.

Instead of or in addition to the user terminal 100 including the camera 17 and the ranging sensor 18, the controller 1020 may include the camera 17 and the ranging sensor 18.

It is desirable that the user terminal 100 allows a user, who uses the controller 1020, to input user identification information such as a user's name or login ID to the via the controller 1020 at the time of start of a game, for example. Thereby, the user terminal 100 enables to associate the controller 1020 with the user, and can specify on the basis of a sending source (controller 1020) of the received output value that the output value belongs to any user.

When the user terminal 100 communicates with a plurality of controllers 1020, each user grasps each of the controllers 1020, so that it is possible to implement multiplay with one user terminal 100 without communication with another device such as the server 200 via the network 2. In addition, the user terminals 100 communicate with one another in accordance with a wireless standard such as a wireless LAN (Local Area Network) standard (communicate with one another without using the server 200), whereby multiplay can be implemented locally with a plurality of user terminals 100. When the above-described multiplay is implemented locally with one user terminal 100, the user terminal 100 may further have at least a part of various functions (to be described below) provided in the server 200. Further, when the above-described multiplay is implemented locally with the plurality of user terminals 100, the plurality of user terminals 100 may have various functions (to be described below) provided in the server 200 in a distributed manner.

Even when the above-described multiplay is implemented locally, the user terminal 100 may communicate with the server 200. For example, the user terminal may send information indicating a play result such as a record or win/loss in a certain game and user identification information in association with each other to the server 200.

Further, the controller 1020 may be configured to be detachable from the user terminal 100. In this case, a coupling portion with the controller 1020 may be provided on at least any surface of a housing of the user terminal 100, controller 1020. When the user terminal 100 is coupled to the controller 1020 by a cable via the coupling portion, the user terminal 100 and the controller 1020 sends and receives signals via the cable.

As shown in FIG. 2, the user terminal 100 may be connected to a storage medium 1030 such as an external memory card via the input/output IF 14. Thereby, the user terminal 100 can read program and data recorded on the storage medium 1030. The program recorded on the storage medium 1030 is a game program, for example.

The user terminal 100 may store the game program acquired by communicating with an external device such as the server 200 in the memory 11 of the user terminal 100, or may store the game program acquired by reading from the storage medium 1030 in the memory 11.

As described above, the user terminal 100 includes the communication IF 13, the input/output IF 14, the touch screen 15, the camera 17, and the ranging sensor 18 as an example of a mechanism for inputting information to the user terminal 100. Each of the components described above as an input mechanism can be regarded as an operation unit configured to receive a user's input operation.

For example, when the operation unit is configured by at least any one of the camera 17 and the ranging sensor 18, the operation unit detects an object 1010 in the vicinity of the user terminal 100, and specifies an input operation from the detection result of the object. As an example, a user's hand as the object 1010 or a marker having a predetermined shape is detected, and an input operation is specified based on color, shape, movement, or type of the object 1010 obtained as a detection result. More specifically, when a user's hand is detected from a captured image of the camera 17, the user terminal 100 specifies a gesture (a series of movements of the user's hand) detected based on the captured image, as a user's input operation. The captured image may be a still image or a moving image.

Alternatively, when the operation unit is configured by the touch screen 15, the user terminal 100 specifies and receives the user's operation performed on an input unit 151 of the touch screen 15 as a user's input operation. Alternatively, when the operation unit is configured by the communication IF 13, the user terminal 100 specifies and receives a signal (for example, an output value) sent from the controller 1020 as a user's input operation. Alternatively, when the operation unit is configured by the input/output IF 14, a signal output from an input device (not shown) different from the controller 1020 connected to the input/output IF 14 is specified and received as a user's input operation.

(Server 200)

The server 200 may be a general-purpose computer such as a workstation or a personal computer as an example. The server 200 includes a processor 20, a memory 21, a storage 22, a communication IF 23, and an input/output IF 24. These components in the server 200 are electrically connected to one another via a communication bus.

(Game Play Terminal 300)

The game play terminal 300 may be a general-purpose computer such as a personal computer as an example. The game play terminal 300 includes a processor 30, a memory 31, a storage 32, a communication IF 33, and an input/output IF 34. These components in the game play terminal 300 are electrically connected to one another via a communication bus.

As shown in FIG. 4, the game play terminal 300 according to the present embodiment is included in an HMD (Head Mounted Display) set 1000 as an example. In other words, it can be expressed that the HMD set 1000 is included in the system 1, and it can also be expressed that the player plays a game using the HMD set 1000. A device for the player to play the game is not limited to the HMD set 1000. As an example, the device may be any device that allows the player to experience the game virtually. The device may be implemented as a smartphone, a feature phone, a tablet computer, a laptop computer (a so-called notebook computer), or a desktop computer. Further, the device may be a game device suitable for a game play.

The HMD set 1000 includes not only the game play terminal 300 but also an HMD 500, an HMD sensor 510, a motion sensor 520, a display 530, and a controller 540. The HMD 500 includes a monitor 51, a gaze sensor 52, a first camera 53, a second camera 54, a microphone 55, and a speaker 56. The controller 540 may include a motion sensor 520.

The HMD 500 may be mounted on a head of the player to provide a virtual space to the player during operations. More specifically, the HMD 500 displays each of a right-eye image and a left-eye image on the monitor 51. When each eye of the player visually recognizes each image, the player may recognize the image as a three-dimensional image based on a parallax of both the eyes. The HMD 500 may include either a so-called head-mounted display including a monitor or a head-mounted device capable of mounting a terminal including a smartphone or another monitor.

The monitor 51 is implemented as, for example, a non-transmissive display device. In an aspect, the monitor 51 is arranged on a main body of the HMD 500 to be located in front of both eyes of the player. Therefore, when the player visually recognizes the three-dimensional image displayed on the monitor 51, the player can be immersed in the virtual space. In an aspect, the virtual space includes, for example, a background, player-operatable objects, and player-selectable menu images. In an aspect, the monitor 51 may be implemented as a liquid crystal monitor or an organic EL (Electro Luminescence) monitor included in a so-called smart phone or other information display terminals.

In another aspect, the monitor 51 can be implemented as a transmissive display device. In this case, the HMD 500 may be an open type such as a glasses type, instead of a closed type that covers the player's eyes as shown in FIG. 1. The transmissive monitor 51 may be temporarily configured as a non-transmissive display device by adjustment of its transmittance. The monitor 51 may include a configuration in which a part of the image constituting the virtual space and a real space are displayed at the same time. For example, the monitor 51 may display an image of the real space captured by a camera mounted on the HMD 500, or may make the real space visually recognizable by setting a part of the transmittance to be high.

In an aspect, the monitor 51 may include a sub-monitor for displaying a right-eye image and a sub-monitor for displaying a left-eye image. In another aspect, the monitor 51 may be configured to integrally display the right-eye image and the left-eye image. In this case, the monitor 51 includes a high-speed shutter. The high-speed shutter operates to enable alternate display of the right-eye image and the left-eye image so that only one of the eyes can recognize the image.

In an aspect, the HMD 500 includes a plurality of light sources (not shown). Each of the light source is implemented by, for example, an LED (Light Emitting Diode) configured to emit infrared rays. The HMD sensor 510 has a position tracking function for detecting the movement of the HMD 500. More specifically, the HMD sensor 510 reads a plurality of infrared rays emitted by the HMD 500 and detects the position and inclination of the HMD 500 in the real space.

In another aspect, the HMD sensor 510 may be implemented by a camera. In this case, the HMD sensor 510 can detect the position and the inclination of the HMD 500 by executing image analysis processing using image information of the HMD 500 output from the camera.

In another aspect, the HMD 500 may include a sensor (not shown) as a position detector instead of the HMD sensor 510 or in addition to the HMD sensor 510. The HMD 500 can use the sensor to detect the position and the inclination of the HMD 500 itself. For example, when the sensor is an angular velocity sensor, a geomagnetic sensor, or an acceleration sensor, the HMD 500 can use any of those sensors instead of the HMD sensor 510 to detect its position and inclination. As an example, when the sensor provided in the HMD 500 is an angular velocity sensor, the angular velocity sensor detects an angular velocity around each of three axes of the HMD 500 in the real space over time. The HMD 500 calculates a temporal change of the angle around each of the three axes of the HMD 500 based on each of the angular velocities, and further calculates an inclination of the HMD 500 based on the temporal change of the angles.

The gaze sensor 52 detects a direction in which lines of sight of the right eye and the left eye of the player are directed. The gaze sensor 52 detects the lines of sight of the player. The direction of the line of sight is detected by, for example, a known eye tracking function. The gaze sensor 52 is implemented by a sensor having the eye tracking function. In an aspect, the gaze sensor 52 preferably includes a right-eye sensor and a left-eye sensor. The gaze sensor 52 may be, for example, a sensor configured to irradiate the right eye and the left eye of the player with infrared light and to receive reflection light from the cornea and the iris with respect to the irradiation light, thereby detecting a rotational angle of each eyeball. The gaze sensor 52 can detect the line of sight of the player based on each of the detected rotational angles.

The first camera 53 captures a lower part of the player's face. More specifically, the first camera 53 captures a nose and a mouse of the player. The second camera 54 captures eyes and eyebrows of the player. The housing of the HMD 500 on the player side is defined as an inside of the HMD 500, and the housing of the HMD 500 on the side opposite to the player. In an aspect, the first camera 53 can be located outside the HMD 500, and the second camera 54 can be located inside the HMD 500. The imaged generated by the first camera 53 and the second camera 54 are input to the game play terminal 300. In another aspect, the first camera 53 and the second camera 54 may be implemented as one camera, and the player's face may be captured by the one camera.

The microphone 55 converts the speech of the player into a sound signal (electric signal) and outputs the sound signal to the game play terminal 300. The speaker 56 converts the sound signal into a sound and outputs the sound to the player. In another aspect, the HMD 500 may include earphones instead of the speaker 56.

The controller 540 is connected to the game play terminal 300 in a wired or wireless manner. The controller 540 receives as an input a command from the player to the game play terminal 300. In an aspect, the controller 540 is configured to be capable of being gripped by the player. In another aspect, the controller 540 is configured to be wearable on a part of player's body or clothing. In further another aspect, the controller 540 may be configured to output at least one of vibration, sound, and light in accordance with the signal sent from the game play terminal 300. In further another aspect, the controller 540 receives an operation for controlling the position and movement of an object arranged in the virtual space, from the player.

In an aspect, the controller 540 includes a plurality of light sources. Each of the light sources is implemented, for example, by an LED that emits infrared rays. The HMD sensor 510 has a position tracking function. In this case, the HMD sensor 510 reads the plurality of infrared rays emitted by the controller 540, and detects position and inclination of the controller 540 in the real space. In another aspect, the HMD sensor 510 may be implemented by a camera. In this case, the HMD sensor 510 can detect the position and the inclination of the controller 540 by executing image analysis processing using the image information of the controller 540 output from the camera.

The motion sensor 520 is attached to the player's hand in an aspect, and detects movement of the player's hand. For example, the motion sensor 520 detects a rotation speed of the hand and the number of rotations of the hand. The detected signal is sent to the game play terminal 300. The motion sensor 520 is provided in the controller 540, for example. In an aspect, the motion sensor 520 is provided in, for example, the controller 540 configured to be capable of being gripped by the player. In another aspect, for safety in the real space, the controller 540 is a glove-type controller that is mounted on the player's hand not to easily fly away.

In further another aspect, a sensor not mounted on the player may detect the movement of the player's hand. For example, a signal of a camera capturing the player may be input to the game play terminal 300 as a signal representing a behavior of the player. The motion sensor 520 and the game play terminal 300 are connected to each other in a wireless manner, for example. In the case of the wireless, a communication mode is not particularly limited, and Bluetooth or other known communication methods may be used, for example.

The display 530 displays the same image as the image displayed on the monitor 51. Thereby, users other than the player wearing the HMD 500 can also view the same image like the player. The image displayed on the display 530 does not have to be a three-dimensional image, and may be a right-eye image or a left-eye image. Examples of the display 530 include a liquid crystal display and an organic EL monitor.

The game play terminal 300 produces the behavior of a character to be operated by the player, on the basis of various types of information acquired from the respective units of the HMD 500, the controller 540, and the motion sensor 520, and controls the progress of the game. The "behavior" herein includes moving respective parts of the body, changing postures, changing facial expressions, moving, speaking, touching and moving the object arranged in the virtual space, and using weapons and tools gripped by the character. In other words, in the main game, as the respective parts of the player's body move, respective parts of the character's body also move in the same manner as the player. In the main game, the character speaks the contents of the speech of the player. In other words, in the main game, the character is an avatar object that behaves as a player's alter ego. As an example, at least some of the character's behaviors may be executed in response to an input to the controller 540 from the player.

In the present embodiment, the motion sensor 520 is attached to both hands of the player, both legs of the player, a waist of the player, and a head of the player. The motion sensor 520 attached to both hands of the player may be provided in the controller 540 as described above. In addition, the motion sensor 520 attached to the head of the player may be provided in the HMD 500. The motion sensor 520 may be further attached to both elbows and knees of the user. As the number of motion sensors 520 attached to the player increases, the movement of the player can be more accurately reflected in the character. Further, the player may wear a suit to which one or more motion sensors 520 are attached, instead of attaching the motion sensors 520 to the respective parts of the body. In other words, a motion capturing method is limited to an example of using the motion sensor 520.

(Transmission Terminal 400)

The transmission terminal 400 may be a mobile terminal such as a smartphone, a PDA (Personal Digital Assistant), or a tablet computer. Further, the transmission terminal 400 may be a so-called stationary terminal such as a desktop computer terminal.

As shown in FIG. 5, the transmission terminal 400 includes a processor 40, a memory 41, a storage 42, a communication IF 43, an input/output IF 44, and a touch screen 45. The transmission terminal 400 may include an input/output IF 44 connectable to a display (display unit) configured separately from the main body of the transmission terminal 400, instead of or in addition to the touch screen 45.

The controller 1021 may include one or physical input mechanisms of buttons, levers, sticks, and wheels. The controller 1021 sends an output value based on an input operation input to the input mechanisms from the operator (the player in the present embodiment) of the transmission terminal 400, to the transmission terminal 400. Further, the controller 1021 may include various sensors of an acceleration sensor and an angular velocity sensor, and may send the output values of the various sensors to the transmission terminal 400. The above-described output values are received by the transmission terminal 400 via the communication IF 43.

The transmission terminal 400 may include a camera and a ranging sensor (not shown). The controller 1021 may alternatively or additionally include the camera and the ranging sensor provided in the transmission terminal 400.

As described above, the transmission terminal 400 includes the communication IF 43, the input/output IF 44, and the touch screen 45 as examples of mechanisms that input information to the transmission terminal 400. The above-described respective components as an input mechanism can be regarded as an operation unit configured to receive the user's input operation.

When the operation unit is configured by the touch screen 45, the transmission terminal 400 specifies and receives a user's operation, which is performed on an input unit 451 of the touch screen 45, as a user's input operation. Alternatively, when the operation unit is configured by the communication IF 43, the transmission terminal 400 specifies and receives a signal (for example, an output value), which is sent from the controller 1021, as a user's input operation. Alternatively, when the operation unit is configured by the input/output IF 44, the transmission terminal 400 specifies and receives a signal, which is output from an input device (not shown) connected to the input/output IF 44, as a user's input operation.

<Hardware Components of Each Device>

Each of the processors 10, 20, 30, and 40 controls operations of all the user terminal 100, the server 200, the game play terminal 300, and the transmission terminal 400. Each of the processors 10, 20, 30, and 40 includes a CPU (Central Processing Unit), an MPU (Micro Processing Unit), and a GPU (Graphics Processing Unit). Each of the processors 10, 20, 30, and 40 reads a program from each of storages 12, 22, 32, and 42 which will be described below. Then, each of the processors 10, 20, 30, and 40 expands the read program to each of memories 11, 21, 31, and 41 which will be described below. The processors 10, 20, and 30 execute the expanded program.

Each of the memories 11, 21, 31, and 41 is a main storage device. Each of the memories 11, 21, 31, and 41 is configured by storage devices of a ROM (Read Only Memory) and a RAM (Random Access Memory). The memory 11 temporarily stores a program and various types of data read from the storage 12 to be described below by the processor 10 to give a work area to the processor 10. The memory 11 also temporarily stores various types of data generated when the processor 10 is operating in accordance with the program. The memory 21 temporarily stores a program and various types of data read from the storage 22 to be described below by the processor 20 to give a work area to the processor 20. The memory 21 also temporarily stores various types of data generated when the processor 20 is operating in accordance with the program. The memory 31 temporarily stores a program and various types of data read from the storage 32 to be described below by the processor 30 to give a work area to the processor 30. The memory 31 also temporarily stores various types of data generated when the processor 30 is operating in accordance with the program. The memory 41 temporarily stores a program and various types of data read from the storage 42 to be described below by the processor 40 to give a work area to the processor 40. The memory 41 also temporarily stores various types of data generated when the processor 40 is operating in accordance with the program.

In the present embodiment, the programs to be executed by the processors 10 and 30 may be game programs of the main game. In the present embodiment, the program executed by the processor 40 may be a transmission program for implementing transmission of behavior instruction data. In addition, the processor 10 may further execute a viewing program for implementing the reproduction of a moving image.

In the present embodiment, the program to be executed by the processor 20 may be at least one of the game program, the transmission program, and the viewing program. The processor 20 executes at least one of the game program, the transmission program, and the viewing program in response to a request from at least one of the user terminal 100, the game play terminal 300, and the transmission terminal 400. The transmission program and the viewing program may be executed in parallel.

In other words, the game program may be a program for implementing the game by cooperation of the user terminal 100, the server 200, and the game play terminal 300. The transmission program may be a program implementing the transmission of the behavior instruction data by cooperation of the server 200 and the transmission terminal 400. The viewing program may be a program for implementing the reproduction of the moving image by cooperation of the user terminal 100 and the server 200.

Each of the storages 12, 22, 32, and 42 is an auxiliary storage device. Each of the storages 12, 22, 32, and 42 is configured by a storage device such as a flash memory or an HDD (Hard Disk Drive). Each of the storages 12 and 32 stores various types data regarding the game, for example. The storage 42 stores various types of data regarding transmission of the behavior instruction data. Further, the storage 12 stores various types of data regarding the reproduction of the moving image. The storage 22 may store at least some of various types of data regarding each of the game, the transmission of the behavior instruction data, and the reproduction of the moving image.

Each of the communication IFs 13, 23, 33, and 43 controls the sending and reception of various types of data in the user terminal 100, the server 200, the game play terminal 300, and the transmission terminal 400. Each of the communication IFs 13, 23, 33, and 43 controls, for example, communication via a wireless LAN (Local Area Network), Internet communication via a wired LAN, a wireless LAN, or a mobile phone network, and communication using short-range wireless communication.

Each of the input/output IFs 14, 24, 34, and 44 are interfaces through which the user terminal 100, the server 200, the game play terminal 300, and the transmission terminal 400 receives a data input and outputs the data. Each of the input/output IFs 14, 24, 34, and 44 may perform input/output of data via a USB (Universal Serial Bus) or the like. Each of the input/output IFs 14, 24, 34, and 44 may include a physical button, a camera, a microphone, a speaker, a mouse, a keyboard, a display, a stick, and a lever. Further, each of the input/output IFs 14, 24, 34, and 44 may include a connection portion for sending to and receiving from a peripheral device.

The touch screen 15 is an electronic component in which the input unit 151 and the display unit 152 (display) are combined. The touch screen 45 is an electronic component in which the input unit 451 and the display unit 452 are combined. Each of the input units 151 and 451 is, for example, a touch-sensitive device, and is configured by a touch pad, for example. Each of the display units 152 and 452 is configured by a liquid crystal display or an organic EL (Electro-Luminescence) display, for example.

Each of the input units 151 and 451 has a function of detecting a position where user's operations (mainly, physical contact operations including a touch operation, a slide operation, a swipe operation, and a tap operation) are input to an input surface, and sending information indicating the position as an input signal. Each of the input units 151 and 451 includes a touch sensor (not shown). The touch sensor may adopt any one of methods such as a capacitive touch method and a resistive-film touch method.

Although not shown, the user terminal 100 and the transmission terminal 400 may include one or more sensors configured to specify a holding posture of the user terminal 100 and a holding posture of the transmission terminal 400, respectively. The sensor may be, for example, an acceleration sensor or an angular velocity sensor.

When each of the user terminal 100 and the transmission terminal 400 includes a sensor, the processors 10 and 40 can specify the holding posture of the user terminal 100 and the holding posture of the transmission terminal 400 from the outputs of the sensors, respectively, and can perform processing depending on the holding postures. For example, when the processors 10 and 40 may be vertical screen displays in which a vertically long images are displayed on the display units 152 and 452 when the user terminal 100 and the transmission terminal 400 are held in a vertical direction, respectively. On the other hand, when the user terminal 100 and the transmission terminal 400 are held horizontally, a horizontally long image may be displayed on the display unit as a horizontal screen display. In this way, the processors 10 and 40 may be able to switch between a vertical screen display and a horizontal screen display depending on the holding postures of the user terminal 100 and the transmission terminal 400, respectively.

<Functional Configuration of System 1>

Figure 6:
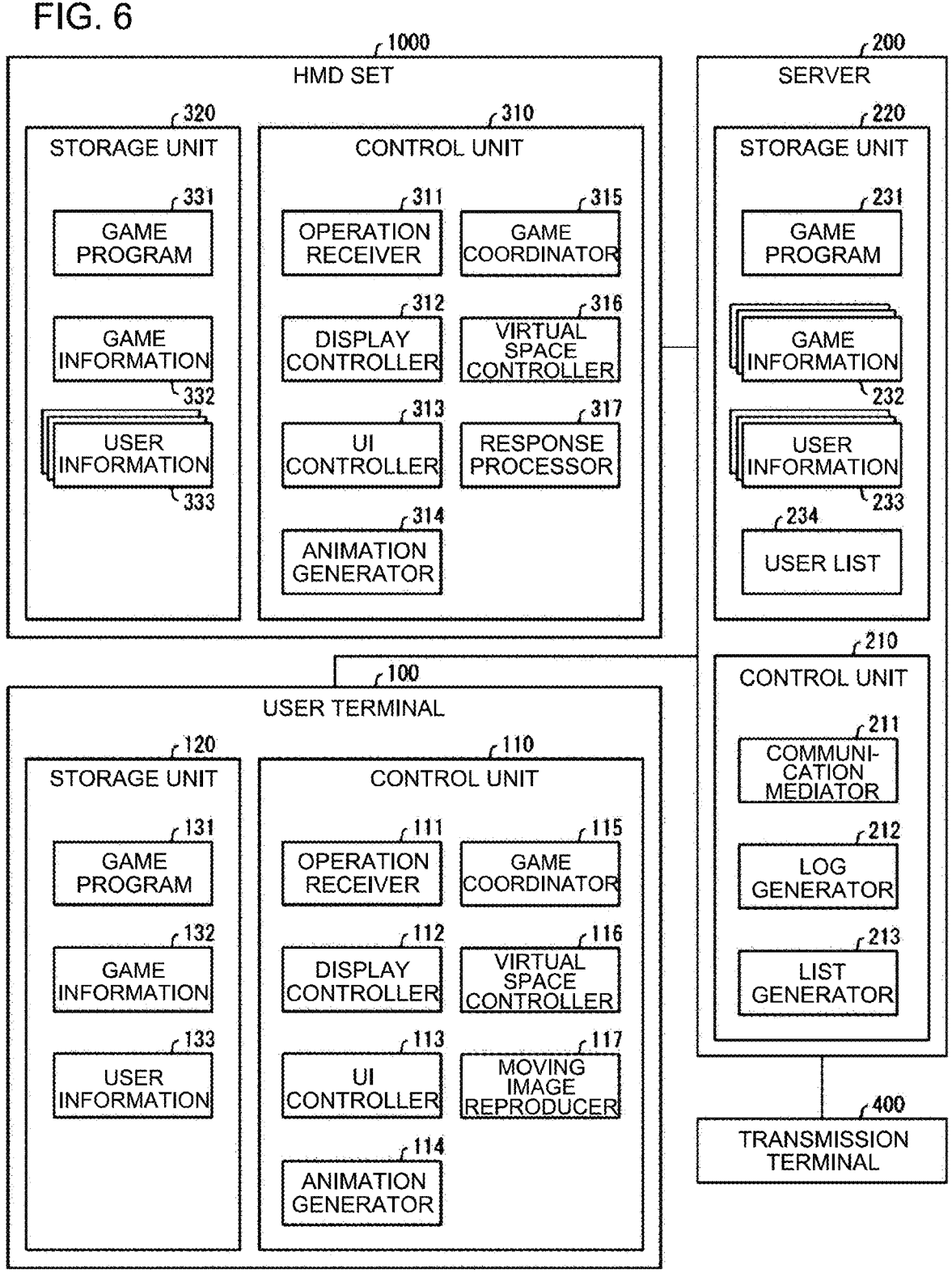
FIG. 6 is a block diagram showing functional configurations of a user terminal, a server, and an HMD set according to an embodiment.
Figure 7:
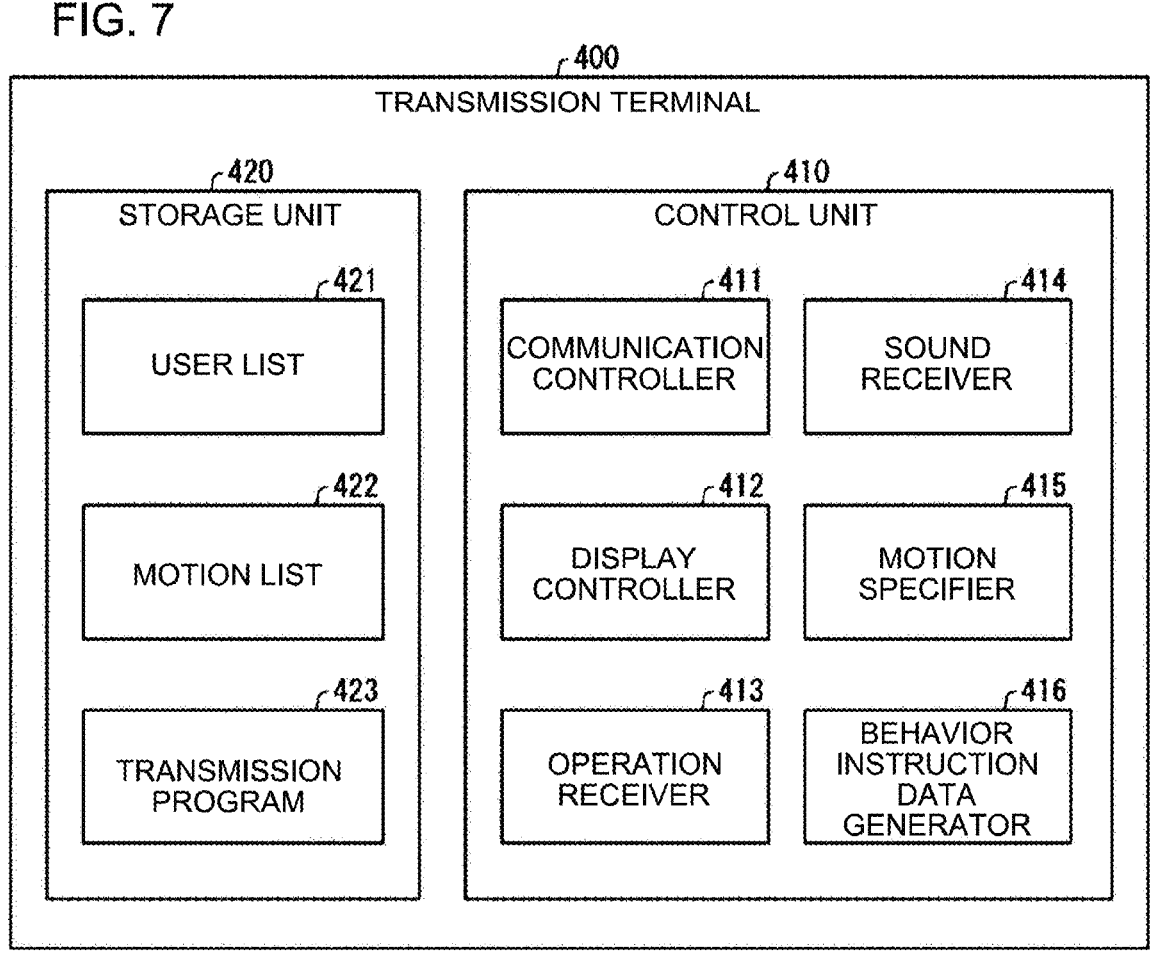
FIG. 7 is a block diagram showing an example of a functional configuration of a transmission terminal according to an embodiment.

FIG. 6 is a block diagram showing functional configurations of the user terminal 100, the server 200, and the HMD set 1000 included in the system 1. FIG. 7 is a block diagram showing a functional configuration of the transmission terminal 400 shown in FIG. 6.

The user terminal 100 has a function as an input device that receives a user's input operation, and a function as an output device that outputs an image or a sound of the game. The user terminal 100 functions as a control unit 110 and a storage unit 120 by cooperation of the processor 10, the memory 11, the storage 12, the communication IF 13, the input/output IF 14, and the touch screen 15.

The server 200 has a function of mediating the sending and reception of various types of information between the user terminal 100, the HMD set 1000, and the transmission terminal 400. The server 200 functions as a control unit 210 and a storage unit 220 by cooperation of the processor 20, the memory 21, the storage 22, the communication IF 23, and the input/output IF 24.

The HMD set 1000 (the game play terminal 300) has a function as an input device that receives a player's input operation, a function as an output device that outputs an image and a sound of the game, and a function of sending game progress information to the user terminal 100 via the server 200 in real time. The HMD set 1000 functions as a control unit 310 and a storage unit 320 by cooperation of the processor 30, the memory 31, the storage 32, the communication IF 33, and the input/output IF 34 of the game play terminal 300 with the HMD 500, the HMD sensor 510, the motion sensor 520, and the controller 540.

The transmission terminal 400 has a function of generating behavior instruction data and sending the behavior instruction data to the user terminal 100 via the server 200. The transmission terminal 400 functions as a control unit 410 and a storage unit 420 by cooperation of the processor 40, the memory 41, the storage 42, the communication IF 43, the input/output IF 44, and the touch screen 45.

(Data Stored in Storage Unit of Each device)

The storage unit 120 stores a game program 131 (a program), game information 132, and user information 133. The storage unit 220 stores a game program 231, game information 232, user information 233, and a user list 234. The storage unit 320 stores a game program 331, game information 332, and user information 333. The storage unit 420 stores a user list 421, a motion list 422, and a transmission program 423 (a program, a second program).

The game programs 131, 231, and 331 are game programs to be executed by the user terminal 100, the server 200, and the HMD set 1000, respectively. The respective devices operates by cooperation based on the game programs 131, 231, and 331, and thus the main game is implemented. The game programs 131 and 331 may be stored in the storage unit 220 and downloaded to the user terminal 100 and the HMD set 1000, respectively. In the present embodiment, the user terminal 100 performs rendering on the data received from the transmission terminal 400 in accordance with the game program 131 and reproduces a moving image. In other words, the game program 131 is also a program for reproducing the moving image using moving image instruction data transmitted from the transmission terminal 400. The program for reproducing the moving image may be different from the game program 131. In this case, the storage unit 120 stores a program for reproducing the moving image separately from the game program 131.

The game information 132, 232, and 332 are data used for reference when user terminal 100, the server 200, and the HMD set 1000 execute the game programs, respectively. Each of the user information 133, 233, and 333 is data regarding a user's account of the user terminal 100. The game information 232 is the game information 132 of each of the user terminals 100 and the game information 332 of the HMD set 1000. The user information 233 is the user information 133 of each of the user terminals 100 and player's user information included in the user information 333. The user information 333 is the user information 133 of each of the user terminals 100 and player's user information.

Each of the user list 234 and the user list 421 is a list of users who have participated in the game. Each of the user list 234 and the user list 421 may include not only a list of users who have participated in the most recent game play by the player but also a list of users who have participated in each of game plays before the most recent game play. The motion list 422 is a list of a plurality of motion data created in advance. The motion list 422 is, for example, a list in which motion data is associated with information (for example, a motion name) identifies each motion. The transmission program 423 is a program for implementing transmission of the behavior instruction data for reproducing the moving image on the user terminal 100 to the user terminal 100.

(Functional Configuration of Server 200)

The control unit 210 comprehensively controls the server 200 by executing the game program 231 stored in the storage unit 220. For example, the control unit 210 mediates the sending and reception of various types of information between the user terminal 100, the HMD set 1000, and the transmission terminal 400.

The control unit 210 functions as a communication mediator 211, a log generator 212, and a list generator 213 in accordance with the description of game program 231. The control unit 210 can also as other functional blocks (not shown) for the purpose of mediating the sending and reception of various types of information regarding the game play and transmission of the behavior instruction data and supporting the progress of the game.

The communication mediator 211 mediates the sending and reception of various types of information between the user terminal 100, the HMD set 1000, and the transmission terminal 400. For example, the communication mediator 211 sends the game progress information received from the HMD set 1000 to the user terminal 100. The game progress information includes data indicating information on movement of the character operated by the player, parameters of the character, and items and weapons possessed by the character, and enemy characters. The server 200 sends the game progress information to the user terminal 100 of all the users who participate in the game. In other words, the server 200 sends common game progress information to the user terminal 100 of all the users who participate in the game. Thereby, the game progresses in each of the user terminals 100 of all the users who participate in the game in the same manner as in the HMD set 1000.

Further, for example, the communication mediator 211 sends information received from any one of the user terminals 100 to support the progress of the game by the player, to the other user terminals 100 and the HMD set 1000. As an example, the information may be an item for the player to carry on the game advantageously, and may be item information indicating an item provided to the player (character). The item information includes information (for example, a user name and a user ID) indicating the user who provides the item. Further, the communication mediator 211 may mediate the transmission of the behavior instruction data from the transmission terminal 400 to the user terminal 100.

The log generator 212 generates a log for the game progress based on the game progress information received from the HMD set 1000. The list generator 213 generates the user list 234 after the end of the game play. Although details will be described below, each user in the user list 234 is associated with a tag indicating the content of the support provided to the player by the user. The list generator 213 generates a tag based on the log for the game progress generated by the log generator 212, and associates it with the corresponding user. The list generator 213 may associate the content of the support, which is input by the game operator or the like using a terminal device such as a personal computer and provided to the player by each user, with the corresponding user, as a tag. Thereby, the content of the support provided by each user becomes more detailed. The user terminal 100 sends, based on the user's operation, the information indicating the user to the server 200 when the users participate in the game. For example, the user terminal 100 sends a user ID, which is input by the user, to the server 200. In other words, the server 200 holds information indicating each user for all the users who participate in the game. The list generator 213 may generate, using the information, the user list 234.

(Functional Configuration of HMD Set 1000)

The control unit 310 comprehensively controls the HMD set 1000 by executing the game program 331 stored in the storage unit 320. For example, the control unit 310 allows the game to progress in accordance with the game program 331 and the player's operation. In addition, the control unit 310 communicates with the server 200 to send and receive information as needed while the game is in progress. The control unit 310 may send and receive the information directly to and from the user terminal 100 without using the server 200.

The control unit 310 functions as an operation receiver 311, a display controller 312, a UI controller 313, an animation generator 314, a game coordinator 315, a virtual space controller 316, and a response processor 317 in accordance with the description of the game program 331. The control unit 310 can also as other functional blocks (not shown) for the purpose of controlling characters appearing in the game, depending on the nature of the game to be executed.

The operation receiver 311 detects and receives the player's input operation. The operation receiver 311 receives signals input from the HMD 500, the motion sensor 520, and the controller 540, determines what kind of input operation has been performed, and outputs the result to each component of the control unit 310.

The UI controller 313 controls user interface (hereinafter, referred to as UI) images to be displayed on the monitor 51 and the display 530. The UI image is a tool for the player to make an input necessary for the progress of the game to the HMD set 1000, or a tool for obtaining information, which is output during the progress of the game, from the HMD set 1000. The UI image is not limited thereto, but includes icons, buttons, lists, and menu screens, for example.

The animation generator 314 generates, based on control modes of various objects, animations showing motions of various objects. For example, the animation generator 314 may generate an animation that expresses a state where an object (for example, a player's avatar object) moves as if it is there, its mouth moves, or its facial expression changes.

The game coordinator 315 controls the progress of the game in accordance with the game program 331, the player's input operation, and the behavior of the avatar object corresponding to the input operation. For example, the game coordinator 315 performs predetermined game processing when the avatar object performs a predetermined behavior. Further, for example, the game coordinator 315 may receive information indicating the user's operation on the user terminal 100, and may perform game processing based on the user's operation. In addition, the game coordinator 315 generates game progress information depending on the progress of the game, and sends the generated information to the server 200. The game progress information is sent to the user terminal 100 via the server 200. Thereby, the progress of the game in the HMD set 1000 is shared in the user terminal 100. In other words, the progress of the game in the HMD set 1000 synchronizes with the progress of the game in the user terminal 100.

The virtual space controller 316 performs various controls related to the virtual space provided to the player, depending on the progress of the game. As an example, the virtual space controller 316 generates various objects, and arranges the objects in the virtual space. Further, the virtual space controller 316 arranges a virtual camera in the virtual space. In addition, the virtual space controller 316 produces the behaviors of various objects arranged in the virtual space, depending on the progress of the game. Further, the virtual space controller 316 controls the position and inclination of the virtual camera arranged in the virtual space, depending on the progress of the game.

The display controller 312 outputs a game screen reflecting the processing results executed by each of the above-described components to the monitor 51 and the display 530. The display controller 312 may display an image based on a field of view from the virtual camera arranged in the virtual space, on the monitor 51 and the display 530 as a game screen. Further, the display controller 312 may include the animation generated by the animation generator 314 in the game screen. Further, the display controller 312 may draw the above-described UI image, which is controlled by the UI controller 313, in a manner of being superimposed on the game screen.

The response processor 317 receives a feedback regarding a response of the user of the user terminal 100 to the game play of the player, and outputs the feedback to the player. In the present embodiment, for example, the user terminal 100 can create, based on the user's input operation, a comment (message) directed to the avatar object. The response processor 317 receives comment data of the comment and outputs the comment data. The response processor 317 may display text data corresponding to the comment of the user on the monitor 51 and the display 530, or may output sound data corresponding to the comment of the user from a speaker (not shown). In the former case, the response processor 317 may draw an image corresponding to the text data (that is, an image including the content of the comment) in a manner of being superimposed on the game screen.

(Functional Configuration of User Terminal 100)

The control unit 110 comprehensively controls the user terminal 100 by executing the game program 131 stored in the storage unit 120. For example, the control unit 110 controls the progress of the game in accordance with the game program 131 and the user's operation. In addition, the control unit 110 communicates with the server 200 to send and receive information as needed while the game is in progress. The control unit 110 may send and receive the information directly to and from the HMD set 1000 without using the server 200.

The control unit 110 functions as an operation receiver 111, a display controller 112, a UI controller 113, an animation generator 114, a game coordinator 115, a virtual space controller 116, and a moving image reproducer 117 in accordance with the description of the game program 131. The control unit 110 can also as other functional blocks (not shown) for the purpose of progressing the game, depending on the nature of the game to be executed.

The operation receiver 111 detects and receives the user's input operation with respect to the input unit 151. The operation receiver 111 determines what kind of input operation has been performed from the action exerted by the user on a console via the touch screen 15 and another input/output IF 14, and outputs the result to each component of the control unit 110.

For example, the operation receiver 111 receives an input operation for the input unit 151, detects coordinates of an input position of the input operation, and specifies a type of the input operation. The operation receiver 111 specifies, for example, a touch operation, a slide operation, a swipe operation, and a tap operation as the type of the input operation. Further, the operation receiver 111 detects that the contact input is released from the touch screen 15 when the continuously detected input is interrupted.

The UI controller 113 controls a UI image to be displayed on the display unit 152 to construct a UI according to at least one of the user's input operation and the received game progress information. The UI image is a tool for the user to make an input necessary for the progress of the game to the user terminal 100, or a tool for obtaining information, which is output during the progress of the game, from the user terminal 100. The UI image is not limited thereto, but includes icons, buttons, lists, and menu screens, for example.

The animation generator 114 generates, based on control modes of various objects, animations showing motions of various objects.

The game coordinator 115 controls the progress of the game in accordance with the game program 131, the received game progress information, and the user's input operation. When predetermined processing is performed by the user's input operation, the game coordinator 115 sends information on the game processing to the HMD set 1000 via the server 200. Thereby, the predetermined game processing is shared in the HMD set 1000. In other words, the progress of the game in the HMD set 1000 synchronizes with the progress of the game in the user terminal 100. The predetermined game processing is, for example, processing of providing an item to an avatar object, and in this example, information on the game processing is the item information described above.

The virtual space controller 116 performs various controls related to the virtual space provided to the user, depending on the progress of the game. As an example, the virtual space controller 116 generates various objects, and arranges the objects in the virtual space. Further, the virtual space controller 116 arranges a virtual camera in the virtual space. In addition, the virtual space controller 116 produces the behaviors of the various objects arranged in the virtual space, depending on the progress of the game, specifically, depending on the received game progress information. Further, the virtual space controller 316 controls position and inclination of the virtual camera arranged in the virtual space, depending on the progress of the game, specifically, the received game progress information.

The display controller 112 outputs a game screen reflecting the processing results executed by each of the above-described components to the display unit 152. The display controller 112 may display an image based on a field of view from the virtual camera arranged in the virtual space provided to the user, on the display unit 152 as a game screen. Further, the display controller 112 may include the animation generated by the animation generator 114 in the game screen. Further, the display controller 112 may draw the above-described UI image, which is controlled by the UI controller 113, in a manner of being superimposed on the game screen. In any case, the game screen displayed on the display unit 152 is the game screen as the game screen displayed on the other user terminal 100 and the HMD set 1000.

The moving image reproducer 117 performs analysis (rendering) on the behavior instruction data received from the transmission terminal 400, and reproduces the moving image.

(Functional Configuration of Transmission Terminal 400)

The control unit 410 comprehensively controls the transmission terminal 400 by executing a program (not shown) stored in the storage unit 420. For example, the control unit 410 generates behavior instruction data in accordance with the program and the operation of the user (the player in the present embodiment) of the transmission terminal 400, and transmits the generated data to the user terminal 100. Further, the control unit 410 communicates with the server 200 to send and receive information as needed. The control unit 410 may send and receive the information directly to and from the user terminal 100 without using the server 200.

The control unit 410 functions as a control unit 411, a display controller 412, an operation receiver 413, a sound receiver 414, a motion specifier 415, and a behavior instruction data generator 416 in accordance with the description of the program. The control unit 410 can also function as other functional blocks (not shown) for the purpose of generating and transmitting behavior instruction data.

The communication controller 411 controls the sending and reception of information to and from the server 200 or the user terminal 100 via the server 200. The communication controller 411 receives the user list 421 from the server 200 as an example. Further, the communication controller 411 sends the behavior instruction data to the user terminal 100 as an example.

The display controller 412 outputs various screens, which reflects results of the processing executed by each component, to the display unit 452. The display controller 412 displays a screen including the received user list 234 as an example. Further, as an example, the display controller 412 displays a screen including the motion list 422 for enabling the player to select motion data included in the behavior instruction data to be transmitted for use in production of the behavior of an avatar object.

The operation receiver 413 detects and receives the player's input operation with respect to the input unit 151. The operation receiver 111 determines what kind of input operation has been performed from the action exerted by the user on a console via the touch screen 45 and another input/output IF 44, and outputs the result to each component of the control unit 410.

For example, the operation receiver 413 receives an input operation for the input unit 451, detects coordinates of an input position of the input operation, and specifies a type of the input operation. The operation receiver 413 specifies, for example, a touch operation, a slide operation, a swipe operation, and a tap operation as the type of the input operation. Further, the operation receiver 413 detects that the contact input is released from the touch screen 45 when the continuously detected input is interrupted.

The sound receiver 414 receives a sound generated around the transmission terminal 400, and generates sound data of the sound. As an example, the sound receiver 414 receives a sound output by the player and generates sound data of the sound.

The motion specifier 415 specifies the motion data selected by the player from the motion list 422 in accordance with the player's input operation.

The behavior instruction data generator 416 generates behavior instruction data. As an example, the behavior instruction data generator 416 generates behavior instruction data including the generated sound data and the specified motion data.

The functions of the HMD set 1000, the server 200, and the user terminal 100 shown in FIG. 6 and the function of the transmission terminal 400 shown in FIG. 7 are merely examples. Each of the HMD set 1000, the server 200, the user terminal 100, and the transmission terminal 400 may have at least some of functions provided by other devices. Further, another device other than the HMD set 1000, the server 200, the user terminal 100, and the transmission terminal 400 may be used as a component of the system 1, and another device may be made to execute some of the processing in the system 1. In other words, the computer, which executes the game program in the present embodiment, may be any of the HMD set 1000, the server 200, the user terminal 100, the transmission terminal 400, and other devices, or may be implemented by a combination of these plurality of devices.

<Control Processing of Virtual Space>

Figure 8:
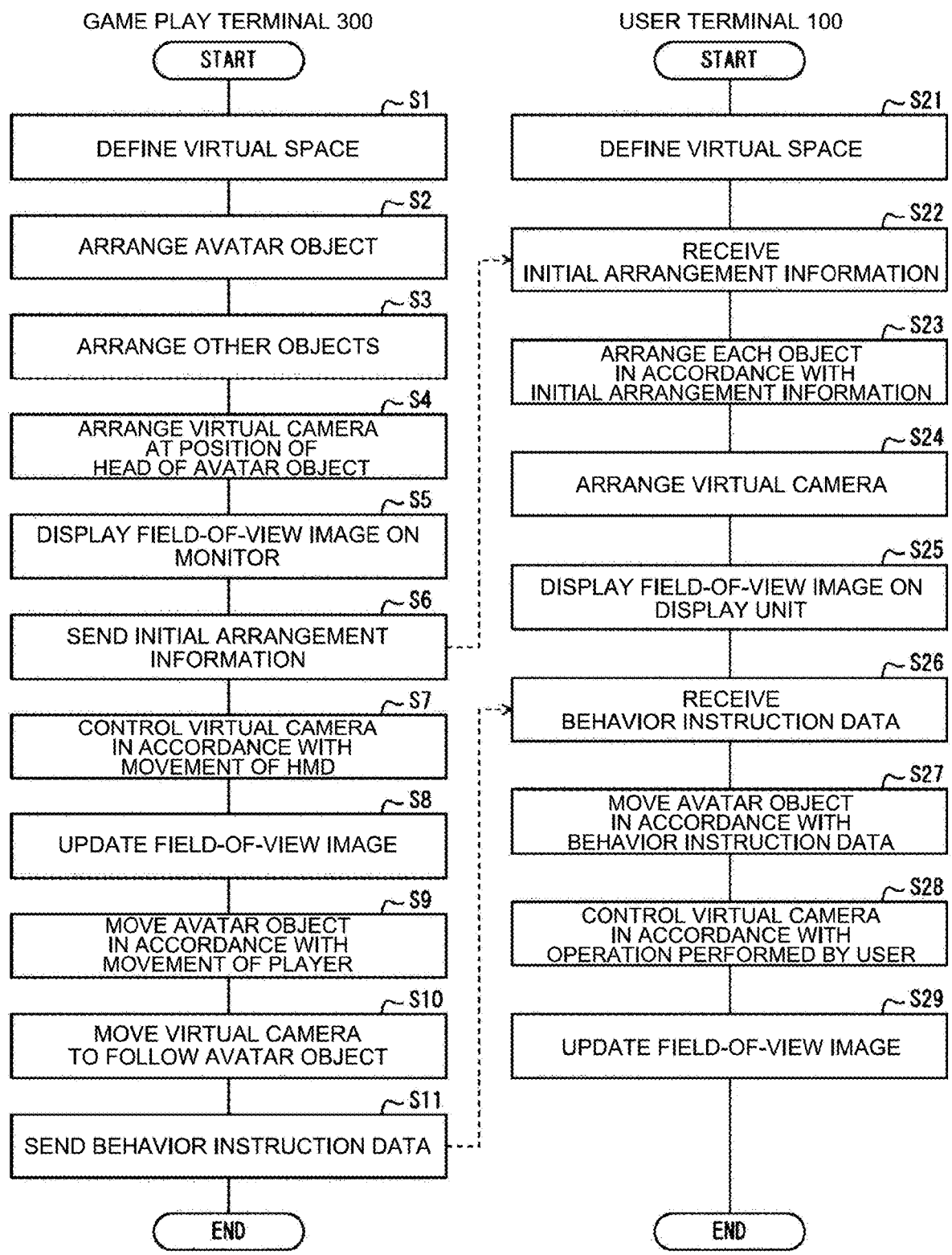
FIG. 8 is a flowchart showing a part of processing executed by the user terminal and the game play terminal according to an embodiment.
Figure 9A:
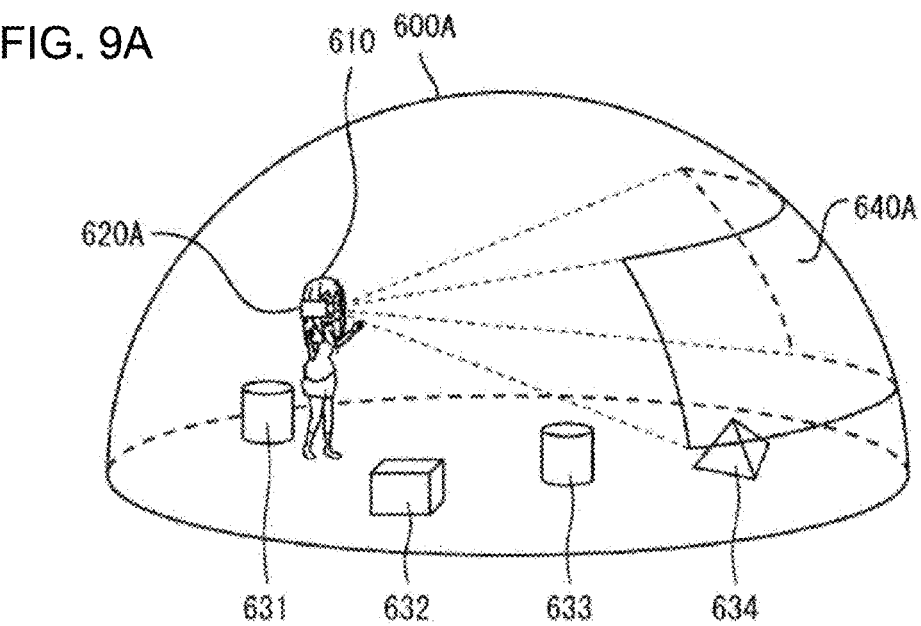
FIGS. 9A and 9B are diagrams showing a virtual space provided to a player and a field-of-view image visually recognized by the player according to an embodiment.
Figure 9B:
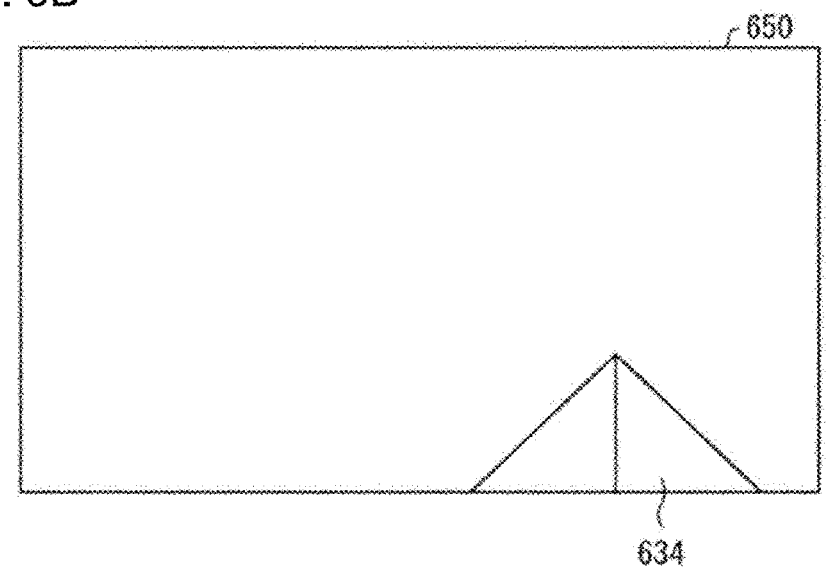
Figure 10A:
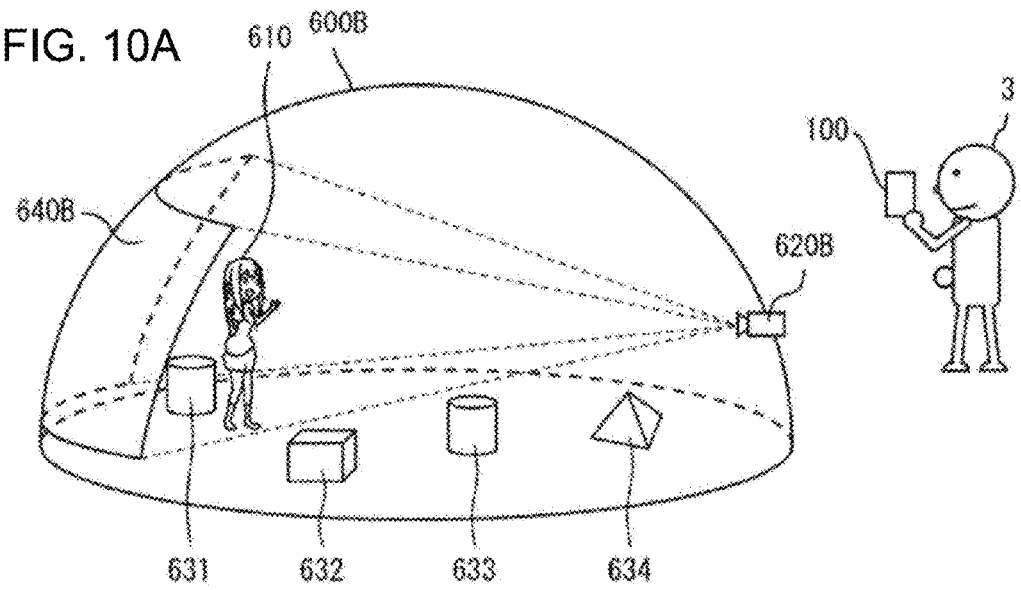
FIGS. 10A and 10B are diagrams showing a virtual space provided to a user of the user terminal and a field-of-view image visually recognized by the user according to an embodiment.
Figure 10B:
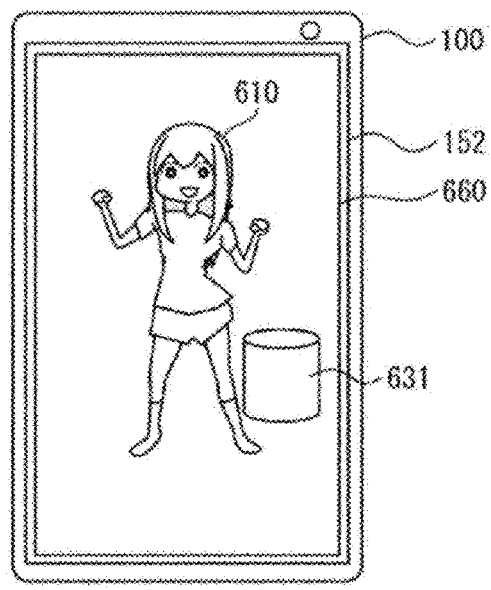

FIG. 8 is a flowchart showing an example of a flow of control processing of the virtual space provided to the player and the virtual space provided to the user of the user terminal 100. FIGS. 9A and 9B are diagrams showing a virtual space 600A provided to the player and a field-of-view image visually recognized by the player according to an embodiment. FIGS. 10A and 10B are diagrams showing a virtual space 600B provided to the user of the user terminal 100 and a field-of-view image visually recognized by the user according to an embodiment. Hereinafter, the virtual spaces 600A and 600B are described as "virtual spaces 600" when being not necessary to be distinguished from each other.

In step S1, the processor 30 functions as the virtual space controller 316 to define the virtual space 600A shown in FIG. 9A. The processor 30 defines the virtual space 600A using virtual space data (not shown). The virtual space data may be stored in the game play terminal 300, may be generated by the processor 30 in accordance with the game program 331, or may be acquired by the processor 30 from the external device such as the server 200.

As an example, the virtual space 600 has an all-celestial sphere structure that covers the entire sphere in a 360-degree direction around a point defined as a center. In FIGS. 9A and 10A, an upper half of the virtual space 600 is illustrated as a celestial sphere not to complicate the description.

In step S2, the processor 30 functions as the virtual space controller 316 to arrange an avatar object (character) 610 in the virtual space 600A. The avatar object 610 is an avatar object associated with the player, and behaves in accordance with the player's input operation.

In step S3, the processor 30 functions as the virtual space controller 316 to arrange other objects in the virtual space 600A. In the example of FIGS. 9A and 9B, the processor 30 arranges objects 631 to 634. Examples of other objects may include character objects (so-called non-player characters, NPC) that behaves in accordance with the game program 331, operation objects such as virtual hands, and objects that imitate animals, plants, artificial objects, or natural objects that are arranged depending on the progress of the game.

In step S4, the processor 30 functions as the virtual space controller 316 to arrange a virtual camera 620A in the virtual space 600A. As an example, the processor 30 arranges the virtual camera 620A at a position of the head of the avatar object 610.

In step S5, the processor 30 displays a field-of-view image 650 on the monitor 51 and the display 530. The processor 30 defines a field-of-view area 640A, which is a field of view from the virtual camera 620A in the virtual space 600A, in accordance with an initial position and an inclination of the virtual camera 620A. Then, the processor 30 defines a field-of-view image 650 corresponding to the field-of-view area 640A. The processor 30 outputs the field-of-view image 650 to the monitor 51 and the display 530 to allow the HMD 500 and the display 530 to display the field-of-view image 650.

In the example of FIGS. 9A and 9B, as shown in FIG. 9A, since a part of the object 634 is included in the field-of-view area 640A, the field-of-view image 650 includes a part of the object 634 as shown in FIG. 9B.

In step S6, the processor 30 sends initial arrangement information to the user terminal 100 via the server 200. The initial arrangement information is information indicating initial arrangement positions of various objects in the virtual space 600A. In the example of FIGS. 9A and 9B, the initial arrangement information includes information on initial arrangement positions of the avatar object 610 and the objects 631 to 634. The initial arrangement information can also be expressed as one of the game progress information.

In step S7, the processor 30 functions as the virtual space controller 316 to control the virtual camera 620A depending on the movement of the HMD 500. Specifically, the processor 30 controls the direction and inclination of the virtual camera 620A depending on the movement of the HMD 500, that is, the posture of the head of the player. As will be described below, the processor 30 moves the head of the player (changes the posture of the head) and moves a head of the avatar object 610 in accordance with such movement. The processor 30 controls the direction and inclination of the virtual camera 620A such that a direction of the line of sight of the avatar object 610 coincides with a direction of the line of sight of the virtual camera 620A. In step S8, the processor 30 updates the field-of-view image 650 in response to changes in the direction and inclination of the virtual camera 620A.

In step S9, the processor 30 functions as the virtual space controller 316 to move the avatar object 610 depending on the movement of the player. As an example, the processor 30 moves the avatar object 610 in the virtual space 600A as the player moves in the real space. Further, the processor 30 moves the head of the avatar object 610 in the virtual space 600A as the head of the player moves in the real space.

In step S10, the processor 30 functions as the virtual space controller 316 to move the virtual camera 620A to follow the avatar object 610. In other words, the virtual camera 620A is always located at the head of the avatar object 610 even when the avatar object 610 moves.

The processor 30 updates the field-of-view image 650 depending on the movement of the virtual camera 620A. In other words, the processor 30 updates the field-of-view area 640A depending on the posture of the head of the player and the position of the virtual camera 620A in the virtual space 600A. As a result, the field-of-view image 650 is updated.

In step S11, the processor 30 sends the behavior instruction data of the avatar object 610 to the user terminal 100 via the server 200. The behavior instruction data herein includes at least one of motion data that takes the motion of the player during a virtual experience (for example, during a game play), sound data of a sound output by the player, and operation data indicating the content of the input operation to the controller 540. When the player is playing the game, the behavior instruction data is sent to the user terminal 100 as game progress information, for example.

Processes of steps S7 to S11 are consecutively and repeatedly executed while the player is playing the game.

In step S21, the processor 10 of the user terminal 100 of a user 3 functions as the virtual space controller 116 to define a virtual space 600B shown in FIG. 10A. The processor 10 defines a virtual space 600B using virtual space data (not shown). The virtual space data may be stored in the user terminal 100, may be generated by the processor 10 based on the game program 131, or may be acquired by the processor 10 from an external device such as the server 200.

In step S22, the processor 10 receives initial arrangement information. In step S23, the processor 10 functions as the virtual space controller 116 to arrange various objects in the virtual space 600B in accordance with the initial arrangement information. In the example of FIGS. 10A and 10B, various objects are an avatar object 610 and objects 631 to 634.

In step S24, the processor 10 functions as the virtual space controller 116 to arrange a virtual camera 620B in the virtual space 600B. As an example, the processor 10 arranges the virtual camera 620B at the position shown in FIG. 10A.

In step S25, the processor 10 displays a field-of-view image 660 on the display unit 152. The processor 10 defines a field-of-view area 640B, which is a field of view from the virtual camera 620B in the virtual space 600B, in accordance with an initial position and an inclination of the virtual camera 620B. Then, the processor 10 defines a field-of-view image 660 corresponding to the field-of-view area 640B. The processor 10 outputs the field-of-view image 660 to the display unit 152 to allow the display unit 152 to display the field-of-view image 660.

In the example of FIGS. 10A and 10B, since the avatar object 610 and the object 631 are included in the field-of-view area 640B as shown in FIG. 10A, the field-of-view image 660 includes the avatar object 610 and the object 631 as shown in FIG. 10B.

In step S26, the processor 10 receives the behavior instruction data. In step S27, the processor 10 functions as the virtual space controller 116 to move the avatar object 610 in the virtual space 600B in accordance with the behavior instruction data. In other words, the processor 10 reproduces a video in which the avatar object 610 is behaving, by real-time rendering.

In step S28, the processor 10 functions as the virtual space controller 116 to control the virtual camera 620B in accordance with the user's operation received when functioning as the operation receiver 111. In step S29, the processor 10 updates the field-of-view image 660 depending on changes in the position of the virtual camera 620B in the virtual space 600B and the direction and inclination of the virtual camera 620B. In step S28, the processor 10 may automatically control the virtual camera 620B depending on the movement of the avatar object 610, for example, the change in the movement and direction of the avatar object 610. For example, the processor 10 may automatically move the virtual camera 620B or change its direction and inclination such that the avatar object 610 is always captured from the front. As an example, the processor 10 may automatically move the virtual camera 620B or change its direction and inclination such that the avatar object 610 is always captured from the rear in response to the movement of the avatar object 610.

As described above, the avatar object 610 behaves in the virtual space 600A depending on the movement of the player. The behavior instruction data indicating the behavior is sent to the user terminal 100. In the virtual space 600B, the avatar object 610 behaves in accordance with the received behavior instruction data. Thereby, the avatar object 610 performs the same behavior in the virtual space 600A and the virtual space 600B. In other words, the user 3 can visually recognize the behavior of the avatar object 610 depending on the behavior of the player using the user terminal 100.

<Overview of Game>

FIGS. 11A to 11D are diagrams showing another example of the field-of-view image displayed on the user terminal 100. Specifically, FIG. 11 is a diagram showing an example of a game screen of a game (main game) to be executed by the system 1 in which the player is playing.

The main game is a game in which the avatar object 610 who operates weapons, for example, guns and knives and a plurality of enemy objects 671 who is NPC appear in the virtual space 600 and the avatar object 610 fights against the enemy objects 671. Various game parameters, for example, a physical strength of the avatar object 610, the number of usable magazines, the number of remaining bullets of the gun, and the number of remaining enemy objects 671 are updated depending on the progress of the game.

A plurality of stages are prepared in the main game, and the player can clear the stage by establishing predetermined achievement conditions associated with each stage. Examples of the predetermined achievement conditions may include conditions established by defeating all the appearing enemy objects 671, defeating a boss object among the appearing enemy objects 671, acquiring a predetermined item, and reaching a predetermined position. The achievement conditions are defined in the game program 131. In the main game, the player clears the stage when the achievement conditions are established depending on the content of the game, in other words, a win of the avatar object 610 against the enemy objects 671 (win or loss between the avatar object 610 and the enemy object 671) is determined. On the other hand, for example, when the game executed by the system 1 is a racing game, the ranking of the avatar object 610 is determined when a condition is established that the avatar object reaches a goal.

In the main game, the game progress information is live transmitted to the plurality of user terminals 100 at predetermined time intervals in order to share the virtual space between the HMD set 1000 and the plurality of user terminals 100. As a result, on the touch screen 15 of the user terminal 100 on which the user watches the game, a field-of-view image of the field-of-view area defined by the virtual camera 620B corresponding to the user terminal 100 is displayed. Further, on an upper right side and an upper left side of the field-of-view image, parameter images showing the physical strength of the avatar object 610, the number of usable magazines, the number of remaining bullets of the gun, and the number of remaining enemy objects 671 are displayed in a manner of being superimposed. The field-of-view image can also be expressed as a game screen.

As described above, the game progress information includes motion data that takes the behavior of the player, sound data of a sound output by the player, and operation data indicating the content of the input operation to the controller 540. These data are, that is, information for specifying the position, posture, and direction of the avatar object 610, information for specifying the position, posture, and direction of the enemy object 671, and information for specifying the position of other objects (for example, obstacle objects 672 and 673). The processor 10 specifies the position, posture, and direction of each object by analyzing (rendering) the game progress information.

The game information 132 includes data of various objects, for example, the avatar object 610, the enemy object 671, and the obstacle objects 672 and 673. The processor 10 uses the data and the analysis result of the game progress information to update the position, posture, and direction of each object. Thereby, the game progresses, and each object in the virtual space 600B moves in the same manner as each object in the virtual space 600A. Specifically, in the virtual space 600B, each object including the avatar object 610 behaves in accordance with the game progress information regardless of whether the user operates the user terminal 100.

On the touch screen 15 of the user terminal 100, as an example, UI images 701 and 702 are displayed in a manner of being superimposed on the field-of-view image. The UI image 701 is an UI image that receives an operation for controlling the touch screen 15 to display an UI image 711 that receives an item-supply operation for supporting the avatar object 610 from the user 3. The UI image 702 is an UI image that receives an operation for controlling the touch screen 15 to display an UI image (to be described below) receives an operation for inputting and sending a comment for the avatar object 610 (in other words, a player 4) from the user 3. The operation received by the UI images 701 and 702 may be, for example, an operation of tapping the UI images 701 and 702.

When the UI image 701 is tapped, the UI image 711 is displayed in a manner of being superimposed on the field-of-view image. The UI image 711 includes, for example, a UI image 711A on which a magazine icon is drawn, a UI image 711B on which a first-aid kit icon is drawn, a UI image 711C on which a triangular cone icon is drawn, and a UI image 711D on which a barricade icon is drawn. The item-supply operation corresponds to an operation of tapping any UI image, for example.

As an example, when the UI image 711A is tapped, the number of remaining bullets of the gun used by the avatar object 610 increases. When the UI image 711B is tapped, the physical strength of the avatar object 610 is restored. When the UI images 711C and 711D are tapped, the obstacle objects 672 and 673 are arranged in the virtual space to obstruct the movement of the enemy object 671. One of the obstacle objects 672 and 673 may obstruct the movement of the enemy object 671 more than the other obstacle object.

The processor 10 sends item-supply information indicating that the item-supply operation has been performed, to the server 200. The item-supply information includes at least information for specifying a type of the item specified by the item-supply operation. The item-supply information may include another information on the item such as information indicating a position where the item is arranged. The item-supply information is sent to another user terminal 100 and the HMD set 1000 via the server 200.

FIGS. 12A to 12D are diagrams showing another example of the field-of-view image displayed on the user terminal 100. Specifically, FIG. 12 is a diagram showing an example of a game screen of the main game, and is a diagram for illustrating a communication between the player and user terminal 100 during the game play.

Figure 12A:
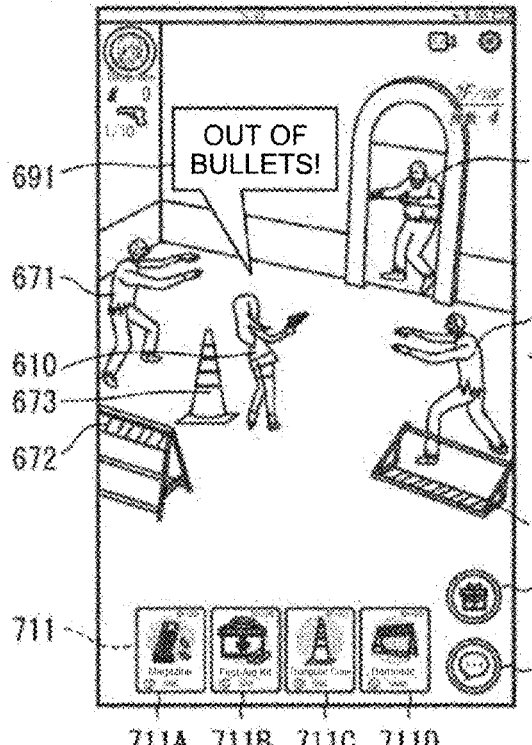
FIGS. 12A to 12D are diagrams showing further another example of a field-of-view image visually recognized by the user of the user terminal.

In a case of FIG. 12A, the user terminal 100 produces a speech 691 of the avatar object 610. Specifically, the user terminal 100 produces the speech 691 of the avatar object 610 on the basis of the sound data included in the game progress information. The content of the speech 691 is "OUT OF BULLETS!" output by a player 4. In other words, the content of the speech 691 is to inform each user that there is no magazine (0) and the number of bullets loaded in the gun is 1, so that a means for attacking the enemy object 671 is likely to be lost.

In FIG. 12A, a balloon is used to visually indicate the speech of the avatar object 610, but the sound is output by the speaker of the user terminal 100 in fact. In addition to the output of the sound, the balloon shown in FIG. 12A (that is, the balloon including a text of the sound content) may be displayed in the field-of-view image. This also applies to a speech 692 to be described below.

Figure 12B:
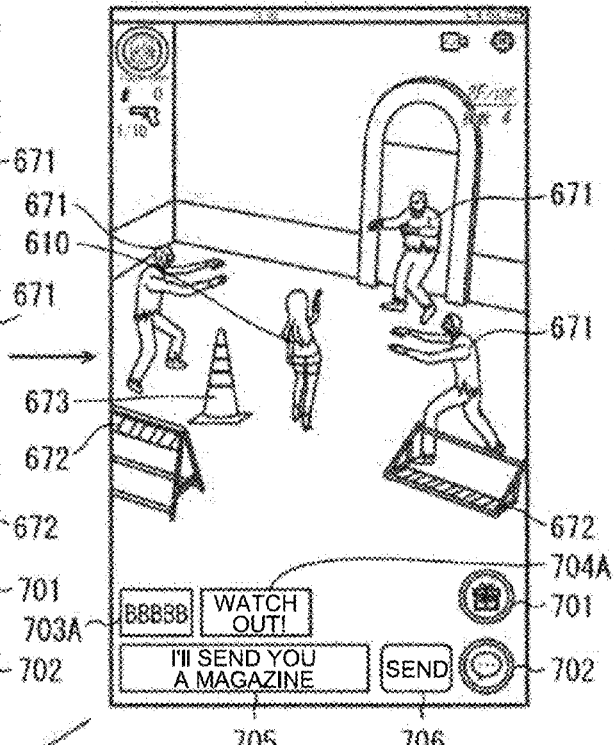

Upon reception of the tap operation on the UI image 702, the user terminal 100 displays UI images 705 and 706 (message UI) in a manner of being superimposed on the field-of-view image as shown in FIG. 12B. The UI image 705 is a UI image on which a comment on the avatar object 610 (in other words, the player) is displayed. The UI image 706 is a UI image that receives a comment-sending operation from the user 3 in order to send the input comment.

As an example, upon reception of the tap operation on the UI image 705, the user terminal 100 controls the touch screen 15 to display a UI image (not shown, hereinafter simply referred to as "keyboard") imitating a keyboard. The user terminal 100 controls the UI image 705 to display a text corresponding to the user's input operation on the keyboard. In the example of FIG. 12B, the text "I'll SEND YOU A MAGAZINE" is displayed on the UI image 705.

As an example, upon reception of the tap operation on the UI image 706 after the text is input, the user terminal 100 sends comment information including information indicating the input content (text content) and information indicating the user, to the server 200. The comment information is sent to another user terminal 100 and HMD set 1000 via the server 200.

A UI image 703A is a UI image indicating a user name of the user who sends the comment, and a UI image 704A is a UI image indicating a content of the comment sent by the user. In the example of FIG. 12B, a user with the user name "BBBBB" uses his/her own user terminal 100 to send comment information having the content "watch out!", whereby the UI image 703A and the UI image 704A are displayed. The UI image 703A and the UI image 704A are displayed on the touch screen 15 of all the user terminals 100 participating in the main game and the monitor 51 of the HMD 500. The UI image 703A and the 704A may be one UI image. In other words, one UI image may include the user name and the content of the comment.

Figure 12C:
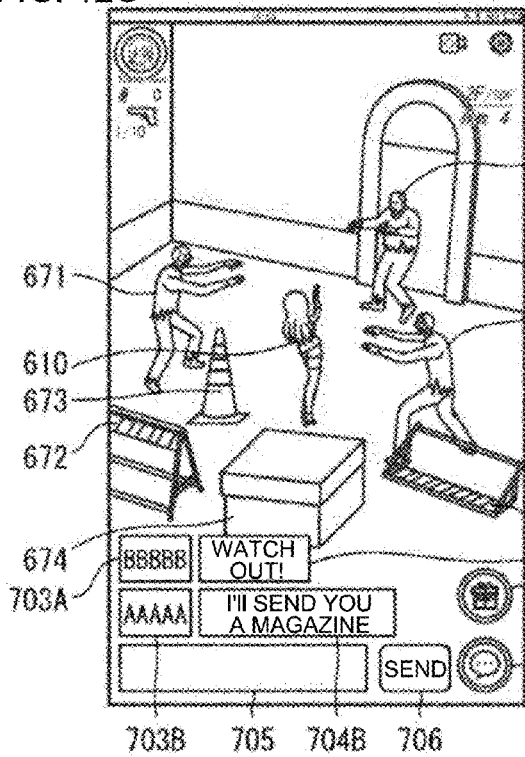

In an example of FIG. 12C, a user with the user name "AAAAA", who is the user of the user terminal 100 shown in FIGS. 12A to 12D, inputs and sends a comment as described above, whereby UI images 703B and 704B are displayed on the touch screen 15. The UI image 703B contains the user name "AAAAA", and the UI image 704B contains the comment "I'll SEND YOU A MAGAZINE!" input in the example of FIG. 12B.

Further, the example of FIG. 12C shows a field-of-view image 611 in which the user "AAAAA" further inputs a tap operation to the UI image 701 and displays the UI image 711 on the touch screen 15 and the input of the tap operation to the UI image 711A is completed. In other words, item-supply information indicating a magazine is sent from the user terminal 100 of the user "AAAAA" to another user terminal 100 and the HMD set 1000, and as a result, the user terminal 100 and the HMD set 1000 arrange a presentment object 674 (to be described below) in the virtual space 600. As an example, the user terminal 100 and the HMD set 1000 executes a presentment related to the presentment object 674 after the elapsed time indicated in the item-supply information has elapsed, and executes processing of arousing the effect of the item object.

Figure 12D:
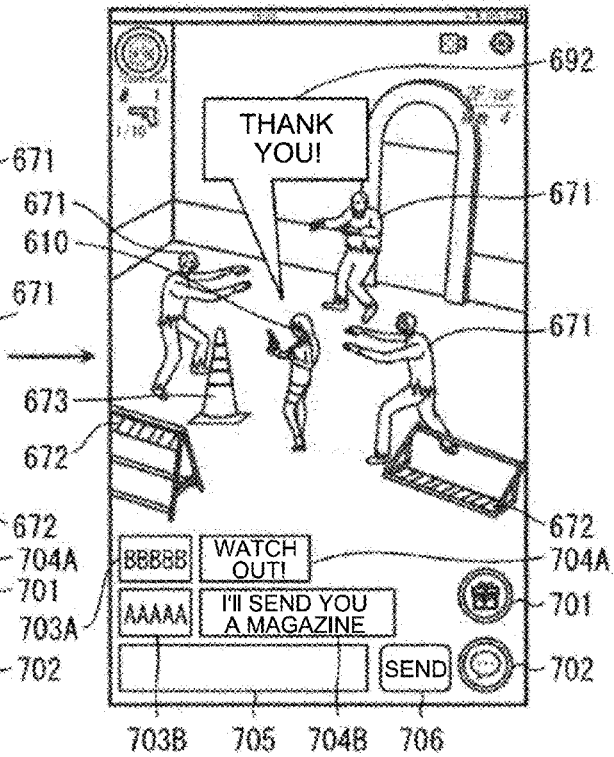

In an example of FIG. 12D, the number of magazines is increased from 0 to 1 by execution of the processing of arousing the effect of the item object. As a result, the player speaks the phrase "thank you!" to the user "AAAAA", and sound data of the speech is sent to each of the user terminals 100. Thereby, each of the user terminals 100 outputs the sound "than you!" as a speech 692 of the avatar object 610.

As described above, the communication between the user and the avatar object 610 is achieved in the main game by both the input of the comment of each user and the output of the speech sound of the avatar object 610 based on the speech of the player.

(Game Progress Processing in Game Play Terminal 300)

Figure 13:
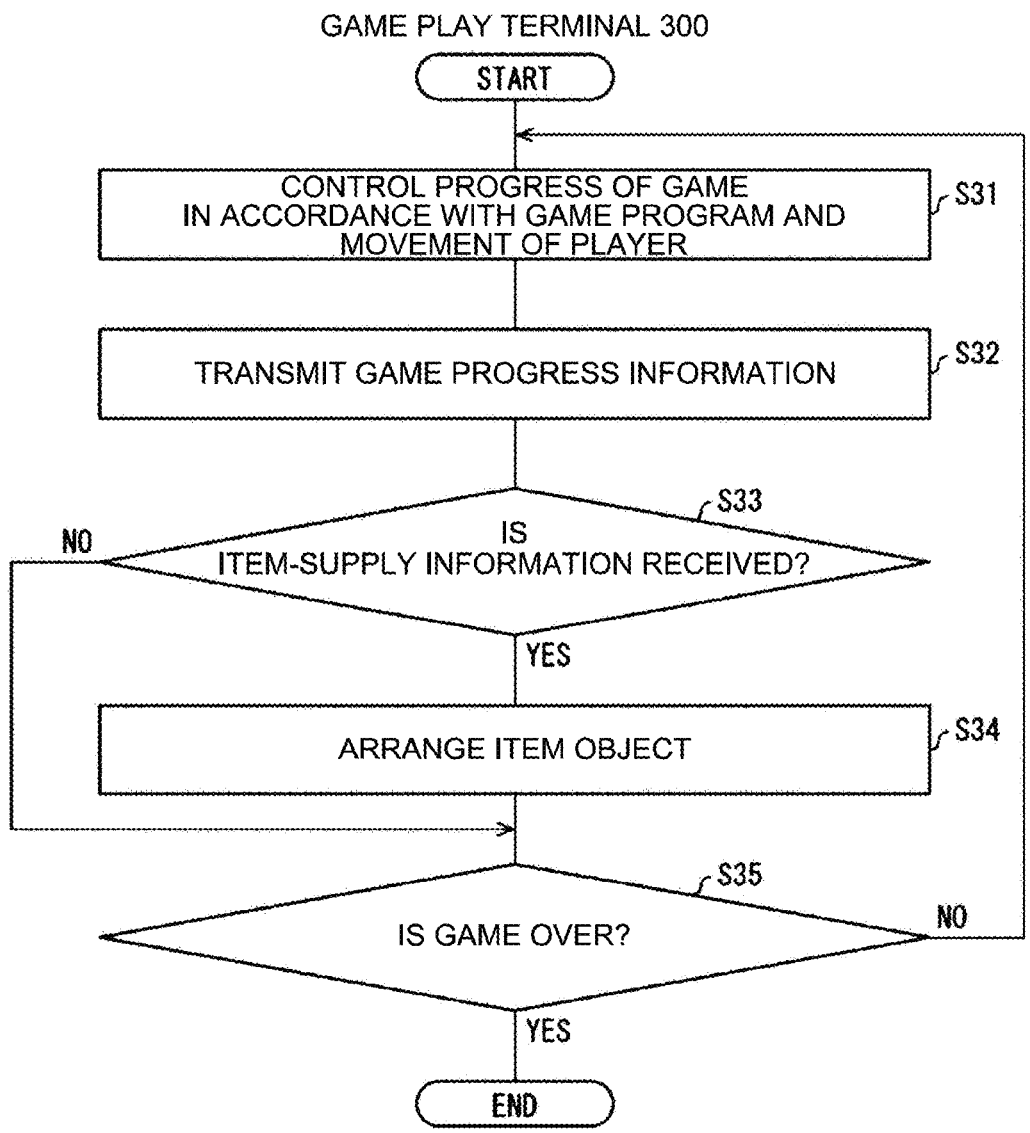
FIG. 13 is a flowchart showing a part of processing to be executed in the game play terminal according to an embodiment.

FIG. 13 is a flowchart showing an example of a flow of game progress processing to be executed by the game play terminal 300.

In step S31, the processor 30 functions as the game coordinator 315 to control the progress of the game in accordance with the game program 331 and the movement of the player. In step S32, the processor 30 generates game progress information and transmits the generated information to user terminal 100. Specifically, the processor 30 sends the generated game progress information to each of the user terminals 100 via the server 200.

In step S33, upon receiving item-supply information (YES in S33), the processor 30 arranges item objects in the virtual space 600A based on the item-supply information in step S34. As an example, the processor 30 arranges the presentment object 674 in the virtual space 600A before the arrangement of the item objects (see FIG. 11C). The presentment object 674 may be, for example, an object imitating a present box. As an example, the processor 30 may execute the presentment related to the to the presentment object 674 after the elapsed time indicated in the item-supply information has elapsed. The presentment may be, for example, an animation in which a lid of the present box opens. The processor 30 executes processing for arousing the effect of the item object after executing the animation. For example, in the example of FIG. 11D, the obstacle object 673 is arranged.

The processor 30 may arrange the item object corresponding to the tapped UI image in the virtual space 600A after executing the animation. For example, when a tap operation is performed on the UI image 711A, the processor 30 arranges the magazine object indicating the magazine in the virtual space 600A after executing the animation. In addition, when a tap operation is performed on the UI image 711B, the processor 30 arranges the first-aid kit object indicating the first-aid kit in the virtual space 600A after executing the animation. The processor 30 may execute the processing of arousing the effect of the magazine object or the first-aid kit object when the avatar object 610 moves to the position of the magazine object or the first-aid kit object, for example.

The processor 30 continues and repeats the processes of steps S31 to S34 until the game is over. When the game is over, for example, when the player inputs a predetermined input operation for the end of the game (YES in step S35), the processing shown in FIG. 13 ends.

(Game Progress Processing in User Terminal 100)

Figure 14:
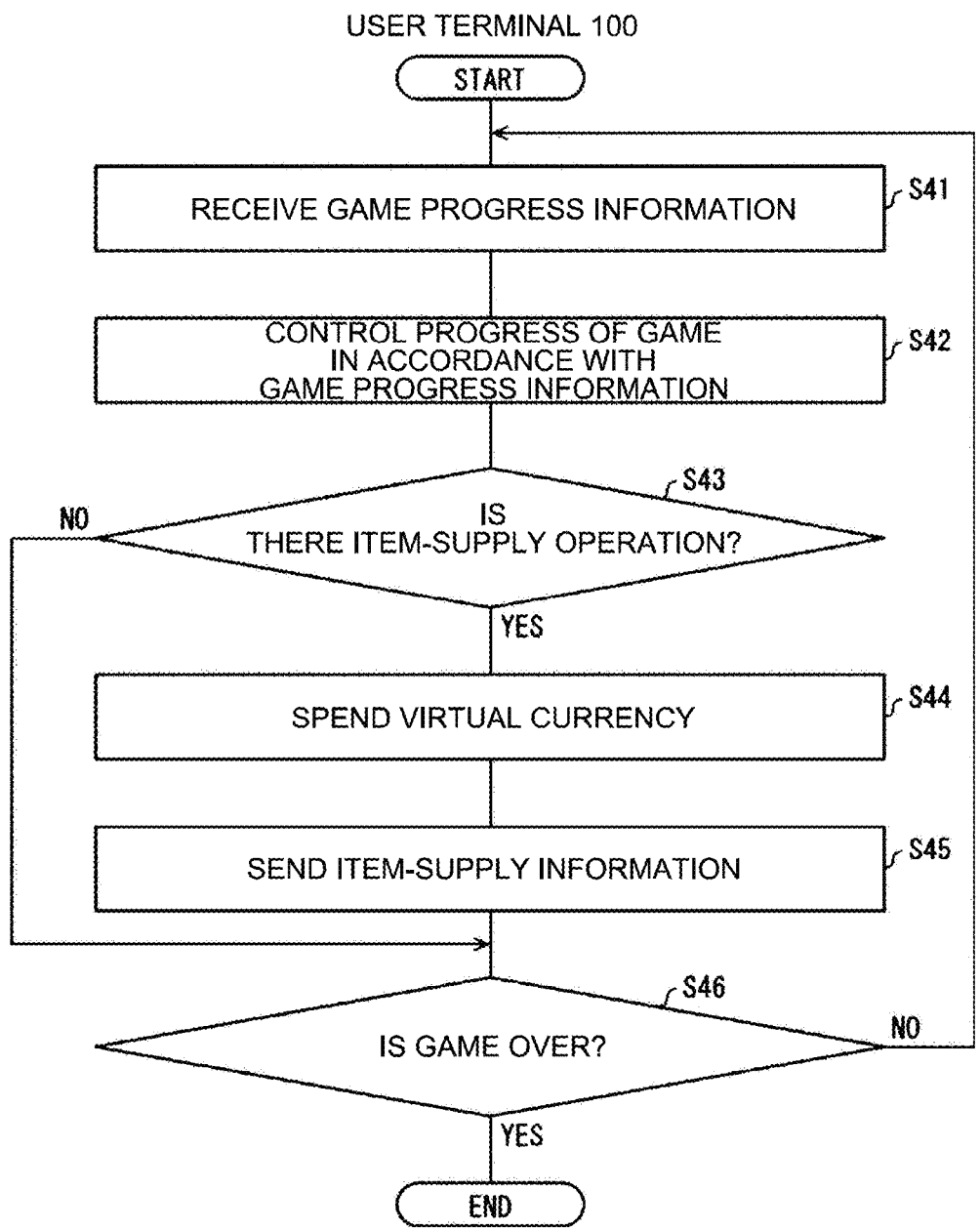
FIG. 14 is a flowchart showing a part of processing to be executed in the user terminal according to an embodiment.

FIG. 14 is a flowchart showing an example of a flow of game progress processing to be executed by the user terminal 100.

In step S41, the processor 10 receives the game progress information. In step S42, the processor 10 functions as the game coordinator 115 to control the progress of the game in accordance with the game progress information.

In step S43, when the processor 10 receives the item-supply operation from the user 3 (YES in step S43), the processor 10 spends virtual currency and arranges the presentment object 674 in the virtual space 600B in step S44. Here, the virtual currency may be purchased (charged for the main game) when the user 3 performs a predetermined operation on the processor 10 before or during the participation in the game, or may be given to the user 3 when predetermined conditions are satisfied. The predetermined conditions may be those that require participation in the main game such as clearing a quest in the main game, or those that do not require participation in the main game such as answering a questionnaire. As an example, the amount of virtual currency (holding amount of virtual currency) is stored in the user terminal 100 as game information 132.

In step S45, the processor 10 sends the item-supply information to the server 200. The item-supply information is sent to the game play terminal 300 via the server 200.

The processor 10 arranges item objects in the virtual space 600A when a predetermined time elapses after the arrangement of the presentment object 674. In the example of FIGS. 11A to 11D, the obstacle object 673 is arranged. In other words, when the user 3 inputs a tap operation to the UI image 711C, a predetermined amount of virtual currency is spent and the obstacle object 673 is arranged.

The processor 10 continues and repeats the processes of steps S41 to S45 when the game is over. When the game is over, for example, when the player inputs a predetermined input operation for the end of the game or when the user 3 performs a predetermined input operation for leaving in the middle of the game (YES in step S46), the processing shown in FIG. 14 ends.

(Game Progress Processing in Server 200)

Figure 15:
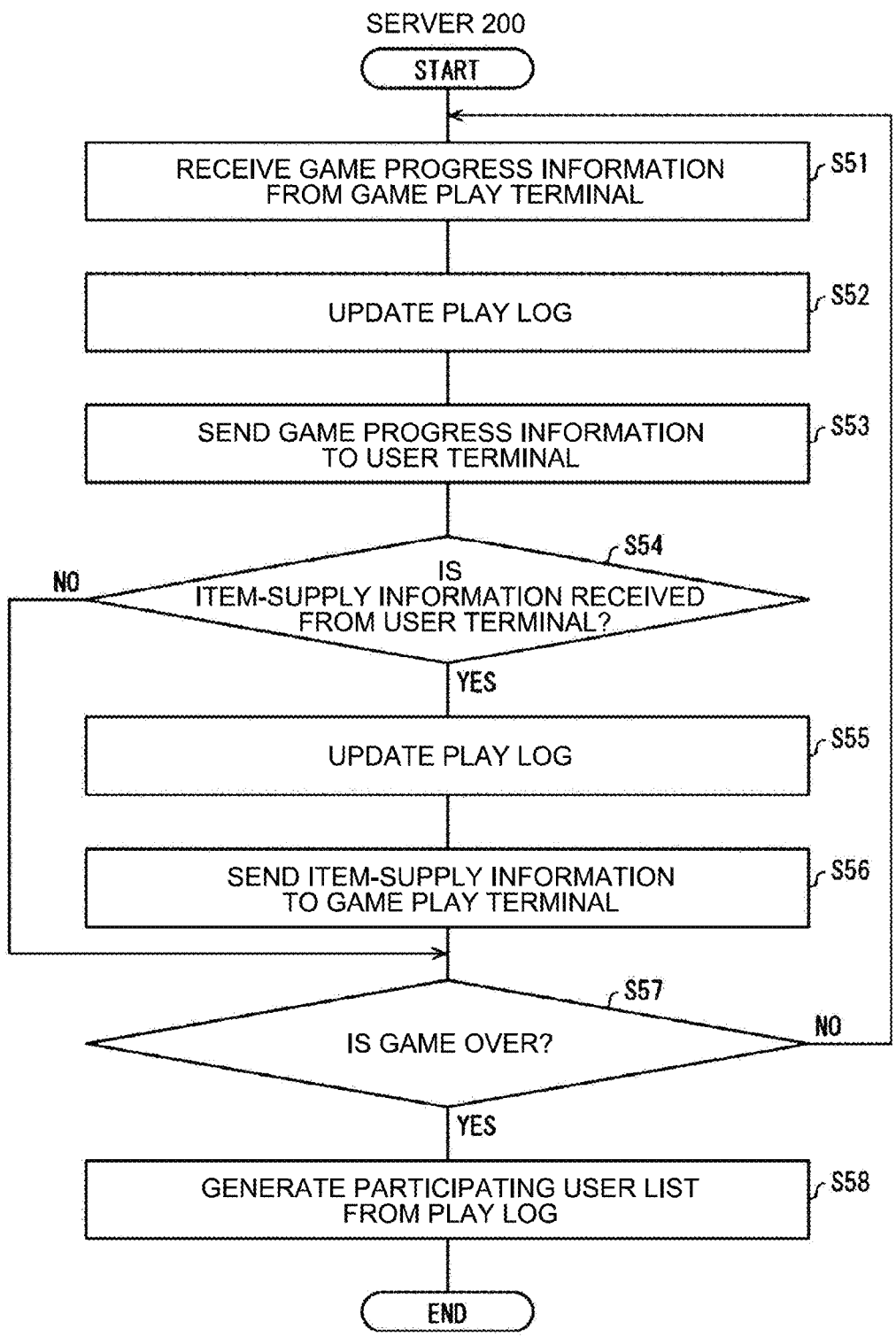
FIG. 15 is a flowchart showing a part of processing to be executed in the server according to an embodiment.

FIG. 15 is a flowchart showing an example of a flow of game progress processing to be executed by the server 200.

In step S51, the processor 20 receives the game progress information from the game play terminal 300. In step S52, the processor 20 functions as the log generator 212 to update a game progress log (hereinafter, a play log). As an example, the play log is generated by the processor 20 when the initial arrangement information is received from the game play terminal 300.

In step S53, the processor 20 sends the received game progress information to each of the user terminals 100.

In step S54, when the item-supply information is received from any user terminal 100 (YES in step S54), the processor 20 functions as the log generator 212 to update the play log in step S55. In step S56, the processor 20 sends the received item-supply information to the game play terminal 300.

The processor 20 continues and repeats the processes of steps S51 to S56 until the game is over. When the game is over, for example, when information indicating the game over is received from the game play terminal 300 (YES in step S57), the processor 20 functions as the list generator 213 to generate a list of users (user list 234), who participate in the game, from the play log in step S58. The processor 20 stores the generated user list 234 in the server 200.

FIG. 16 is a diagram showing a specific example of the user list 234. A "user" column stores information (for example, a user name) indicating users who participate in the game. A "tag" column stores information (tag) generated based on the support performed on the player by each user. In the example of FIG. 16, tags not having square brackets in tags stored in the "tag" column are information automatically generated by the processor 20, and tags having square brackets are information manually input by the operator of the game.

In the example of FIG. 16, the user "AAAAA" is associated with the information: A MAGAZINE, 10 F, A BOSS, and "WINNING AGAINST THE BOSS BECAUSE OF GIFT OF THE MAGAZINE". This indicates that the user "AAAAA" supplies a magazine, for example, in a battle against a boss on a stage of a 10th floor and the avatar object 610 wins the boss with bullets of the supplied magazine.

In addition, the user "BBBBB" is associated with the information: A FIRST-AID KIT, 3 F, ZAKO, and "RESTORATION IMMEDIATELY BEFORE GAME OVER". This indicates that the user "BBBBB" supplies a first-aid kit, for example, in a battle against a Zako enemy on a stage of a 3rd floor, and as a result, that the physical strength of the avatar object 610 is restored immediately before the physical strength becomes 0 (becomes game over).

In addition, the user "CCCCC" is associated with the information: A BARRICADE, 5 F, ZAKO, and "STOP TWO ZOMBIES FROM COMING HERE USING BARRICADE". This indicates that the user "CCCCC" supplies a barricade (obstacle object 672 in FIGS. 11A to 11D), for example, in a battle against a Zako enemy on a stage of a 5th floor, and as a result, succeeds in making two Zako enemies stuck.

In the example of FIG. 16, one support provided is associated with the user name of each user 3, but a tag for each of the multiple times of support can be associated with the user name of the user 3 who has performed the support several times. It is preferable that the respective tags are distinguished from one another in the user list 234. Thereby, after the game over, the player who refers to the user list 421 using the transmission terminal 400 can accurately grasp the content of each support.

<Transmission of Behavior Instruction Data>

(Transmission Processing in Transmission Terminal 400)

Figure 17:
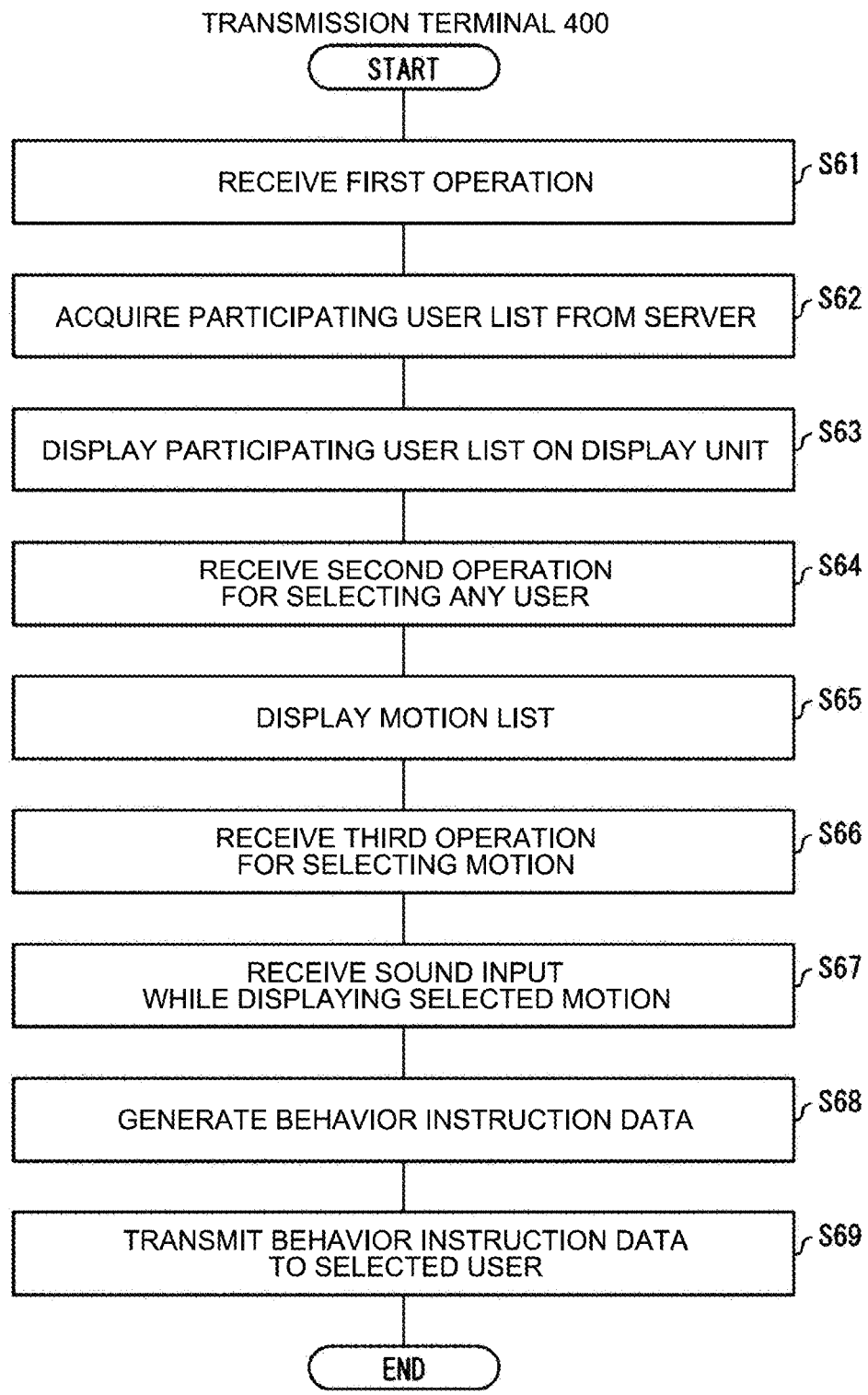
FIG. 17 is a flowchart showing a part of processing to be executed in the transmission terminal according to an embodiment.
Figure 18A:
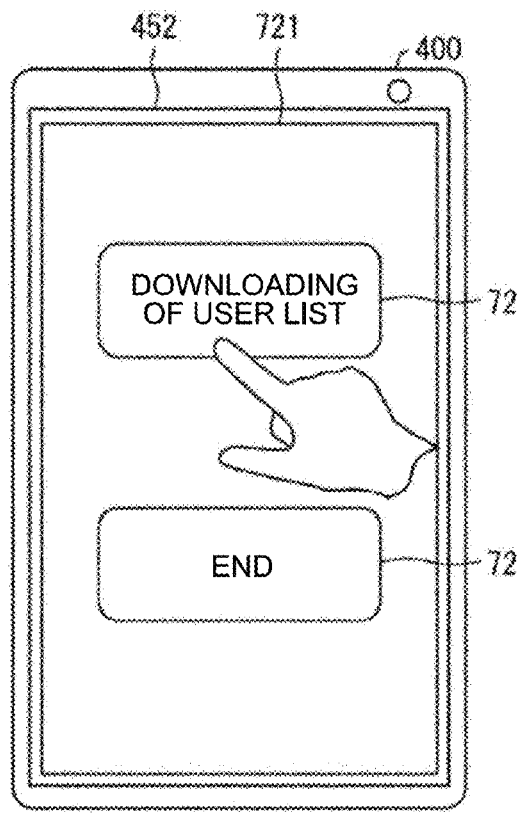
FIGS. 18A and 18B are diagrams showing a specific example of a screen displayed on the transmission terminal according to an embodiment.
Figure 18B:
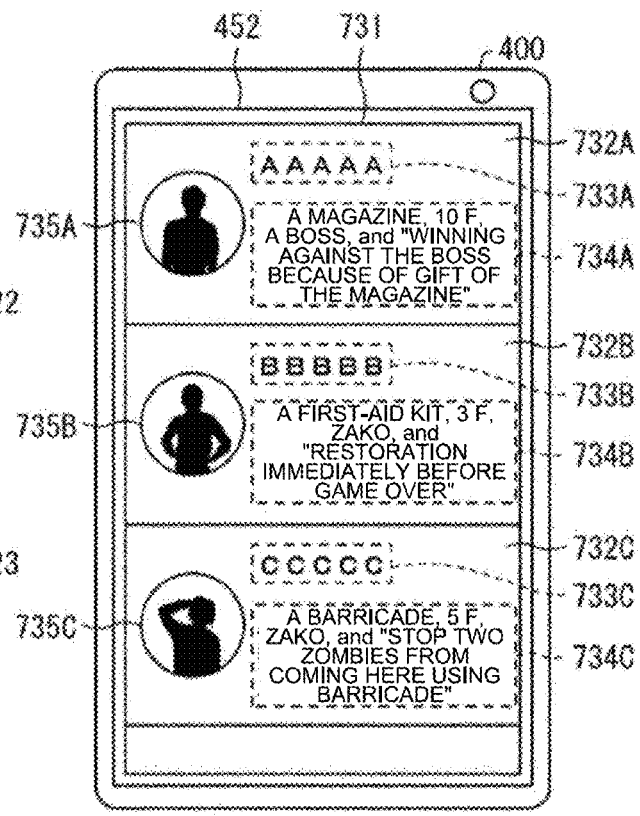
Figure 19:
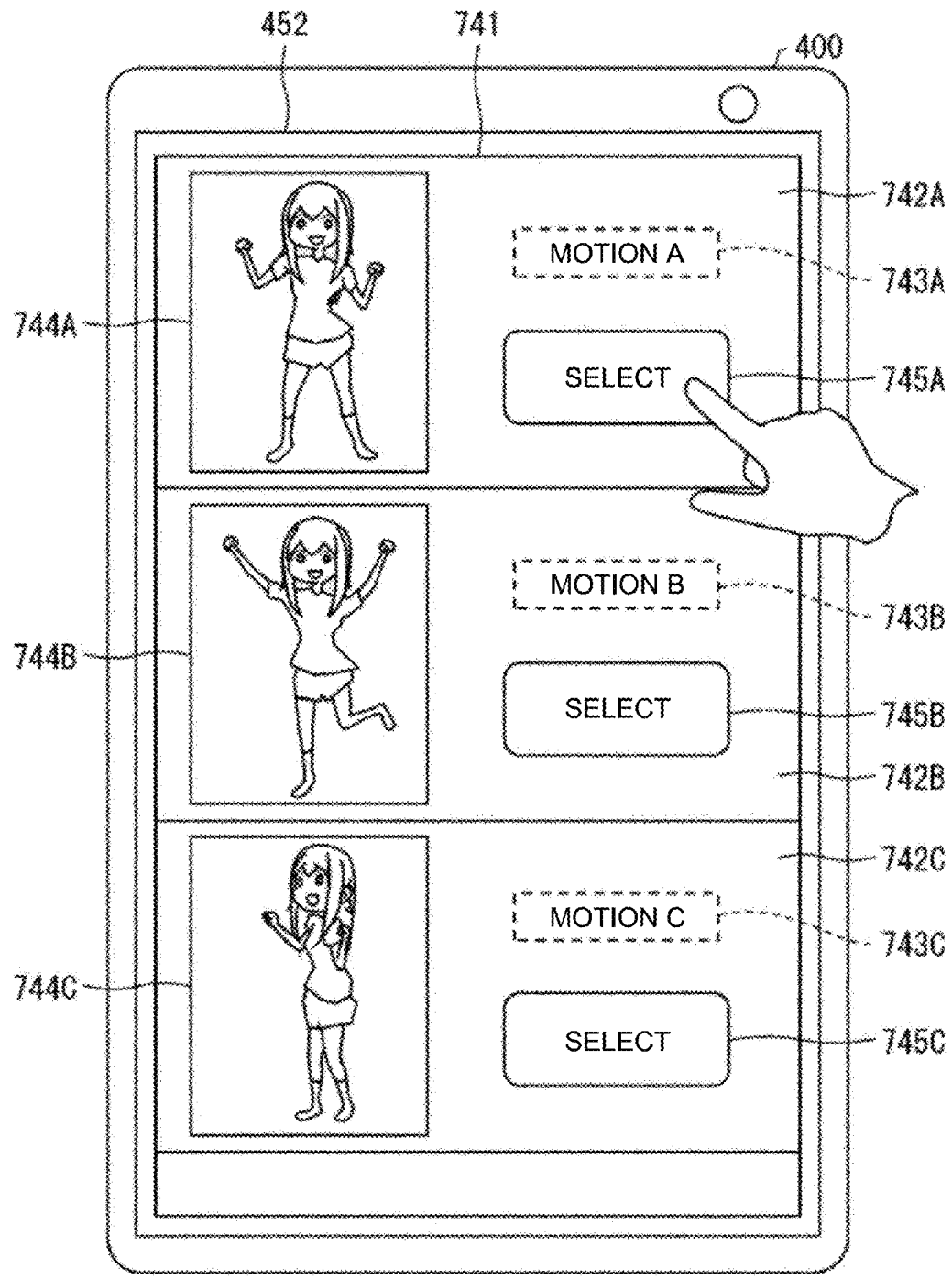
FIG. 19 is a diagram showing another specific example of a screen displayed on the transmission terminal according to an embodiment.

FIG. 17 is a flowchart showing an example of a flow of transmission processing by the transmission terminal 400. FIGS. 18A and 18B are diagrams showing a specific example of a screen displayed on the transmission terminal 400. FIG. 19 is a diagram showing another specific example of the screen displayed on the transmission terminal.

In step S61, the processor 40 functions as the operation receiver 413 to receive a first operation for displaying the list (user list 234) of users who participate in the game. A download screen 721 shown in FIG. 18A is a screen for downloading the user list 234 from the server 200 and controlling the display unit 452 to display it. As an example, the download screen 721 is a screen to be displayed immediately after a start operation of an application for executing the transmission processing shown in FIG. 17 is input to the transmission terminal 400.

The download screen 721 includes UI images 722 and 723 as an example. The UI image 722 receives an operation for downloading the user list 234, that is, the first operation. The first operation may be, for example, an operation for tapping the UI image 722. The UI image 723 receives an operation for terminating the application. Such an operation may be, for example, an operation for tapping the UI image 723.

Upon reception of the tap operation on the UI image 722, the processor 40 functions as the communication controller 411 to acquire (receive) the user list 234 from the server 200 in step S62. In step S63, the processor 40 functions as the display controller 412 to control the display unit 452 to display the user list 234. Specifically, the processor 40 controls the display unit 452 to display a user list screen generated based on the user list 234. As an example, the user list screen may be a user list screen 731 shown in FIG. 18B. The user list screen 731 includes record images corresponding to respective records in the user list 234. In the example of FIG. 18B, record images 732A to 732C are described as the record images, but the number of record images is not limited to three. In the example of FIG. 18B, when the number of records in the user list 234 is greater than 3 (that is, when the number of users participating in the game is greater than 3), the player can control the display unit 452 to display another record image by, for example, inputting an operation of scrolling the screen (for example, a drag operation or a flick operation) to the touch screen 45.

As an example, the record images 732A to 732C include user names 733A to 733C, tag information 734A to 734C, and icons 735A to 735C, respectively. Hereinafter, the record images 732A to 732C, the user names 733A to 733C, the tag information 734A to 734C, and the icons 735A to 735C are a "record image 732", a "user name 733", "tag information 734", and an "icon 735", respectively, when being not necessary to be distinguished from one another.

The user name 733 is information indicating each of users who participate in the game stored in the "user" column in the user list 234. The tag information 734 is information indicating a tag associated with each of users who participate in the game in the user list 234. For example, the record image 732A includes "AAAAA" as the user name 733A. Therefore, the record image 732A includes, as the tag information 734A, the information associated with the "AAAAA" in the user list 234: A MAGAZINE, 10 F, A BOSS, and "WINNING AGAINST THE BOSS BECAUSE OF GIFT OF THE MAGAZINE". The icon 735 is, for example, an image set in advance by the user.

The processor 40 may store the received user list in the transmission terminal 400 (in the user list 421 of FIG. 7). The download screen 721 may include a UI image (not shown) for displaying the user list 421 on the display unit 452. In this example, when the UI image is tapped, the processor 40 reads the user list 421 without downloading the user list 234, generates a user list screen from the user list 421, and controls the display unit 452 to display the generated user list screen.

In step S64, the processor 40 functions as the operation receiver 413 to receive a second operation for selecting any of the users included in the user list screen 731. As an example, the second operation may be an operation of tapping any of the record images 732 on the user list screen 731. In the example of FIG. 18B, the player inputs a tap operation to the record image 732A. In other words, the player selects the user "AAAAA" as a user who transmits the behavior instruction data.

Upon reception of the tap operation on the record image 732, the processor 40 functions as the display controller 412 to control the display unit 452 to display the motion list 422. Specifically, the processor 40 controls the display unit 452 to display a motion list screen generated based on the motion list 422. As an example, the motion list screen may be a motion list screen 741 shown in FIG. 19. The motion list screen 741 includes record images corresponding to respective records in the motion list 422. In the example of FIG. 19, record images 742A to 742C are described as the record images, but the number of record images is not limited to three. In the example of FIG. 19, when the number of records in the motion list 422 is greater than 4, the player can control the display unit 452 to display another record image by, for example, inputting an operation of scrolling the screen (for example, a drag operation or a flick operation) to the touch screen 45.

As an example, the record images 742A to 742C include motion names 743A to 743C, motion images 744A to 744C, and UI images 745A to 745C, respectively. Hereinafter, the record images 742A to 742C, the motion names 743A to 743C, the motion images 744A to 744C, and the UI images 745A to 745C are a "record image 7432", a "motion name 743", a "motion image 744", and a "UI image 745", respectively, when being not necessary to be distinguished from one another.

The motion name 743 is information for identifying the motion stored in the motion list 422. The motion image 744 is an image generated from motion data associated with each motion name in the motion list 422. As an example, the processor 40 includes an image of the avatar object 610, which takes a first posture in each motion data, in the record image 742 as the motion image 744. The motion image 744 may be a UI image that receives a predetermined operation (for example, a tap operation on the motion image 744) from the player. Upon reception of the predetermined operation, the processor 40 may reproduce a motion moving image in which the avatar object 610 behaves in accordance with the motion data. The processor 40 may automatically display the motion list screen 741 again when the motion moving image is completed.

The record image 742 may include, for example, a UI image including the text "motion reproduction" instead of the motion image 744.

In step S66, the processor 40 functions as the operation receiver 413 to receive a third operation for selecting a motion. As an example, the third operation may be a tap operation on the UI image 745. In other words, the UI image 745 receives an operation for selecting motion data corresponding to each of the record images 742. By receiving the third operation, the processor 40 functions as the motion specifier 415 to specify the motion data selected by the player.

In step S67, the processor 40 functions as the display controller 412 and the sound receiver 414 to receive a sound input of the player while reproducing the motion moving image in which the avatar object 610 behaves in accordance with the selected motion data.

Figure 20:
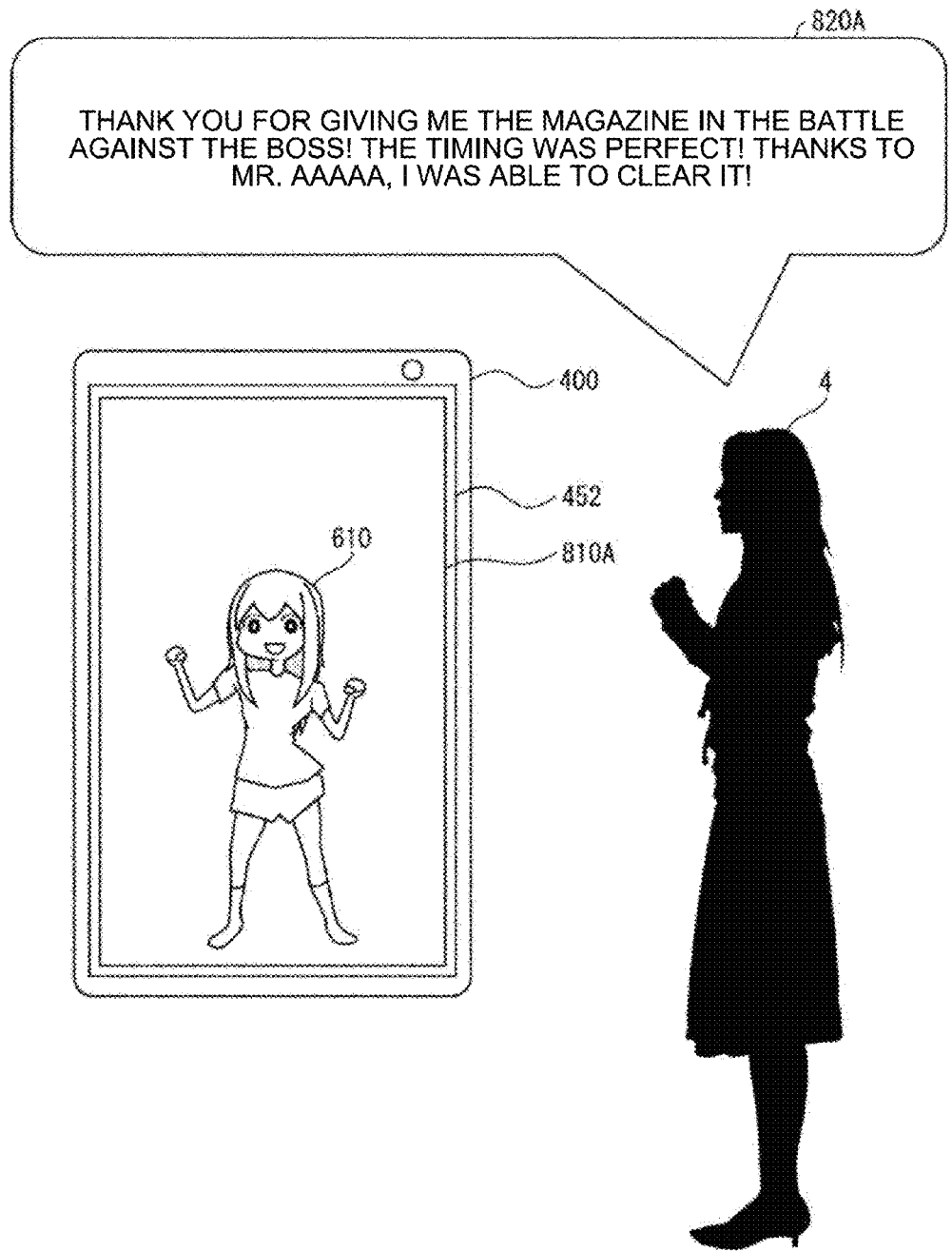
FIG. 20 is a diagram showing a specific example of a sound input by a player according to an embodiment.

FIG. 20 is a diagram showing a specific example of a sound input by a player 4. As shown in FIG. 20, the player 4 inputs speech sound 820A while reproducing a motion moving image 810A. The speech sound 820A is a speech sound directed to the user 3 (hereinafter, user 3A) with a user name "AAAAA". In other words, in the example of FIG. 20, the player 4 selects a user 3A (first user) in step S64, and creates behavior instruction data directed to the user 3A. It is assumed that the user terminal 100 used by the user 3A is a user terminal 100A.

Since the speech sound 820A is a speech sound directed to the user 3A, the speech sound is based on the content of the support provided for the avatar object 610 (in other words, the player 4) by the user 3A. Specifically, the user 3A supplies a magazine in a battle against a boss on a stage of a 10th floor, and the avatar object 610 wins the boss with bullets of the supplied magazine. Therefore, the speech sound 820A includes the contents "THANK YOU FOR GIVING ME THE MAGAZINE IN THE BATTLE AGAINST THE BOSS! THE TIMING WAS PERFECT! THANKS TO MR. AAAAA, I WAS ABLE TO CLEAR IT!". As described above, it is preferable that the speech sound includes the content of the support provided by the user 3 in the game and gratitude to the user 3.

In an aspect, the player 4 creates a speech content directed to the user 3 before starting the sound input, that is, before inputting the third operation to the transmission terminal 400. In another aspect, the speech content directed to the user 3 may be automatically generated by the processor 40. In addition, the processor 40 may display the tag associated with the user 3 selected by the second operation in a manner of being superimposed on the motion moving image 810A.

The processor 40 converts the received sound into sound data. In step S68, the processor 40 functions as the behavior instruction data generator 416 to generate behavior instruction data including the sound data and the motion data of the selected motion.

Figure 21A:
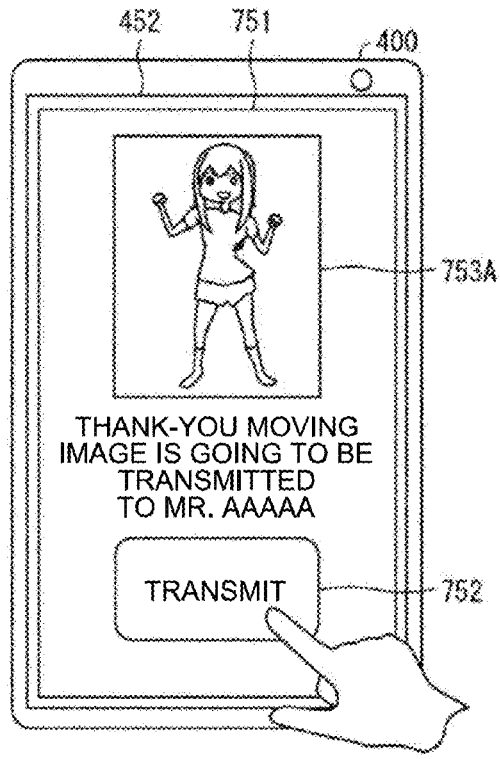
FIGS. 21A to 21C are diagrams showing further another specific example of a screen displayed on the transmission terminal according to an embodiment and an overview of transmission of behavior instruction data.
Figure 21B:
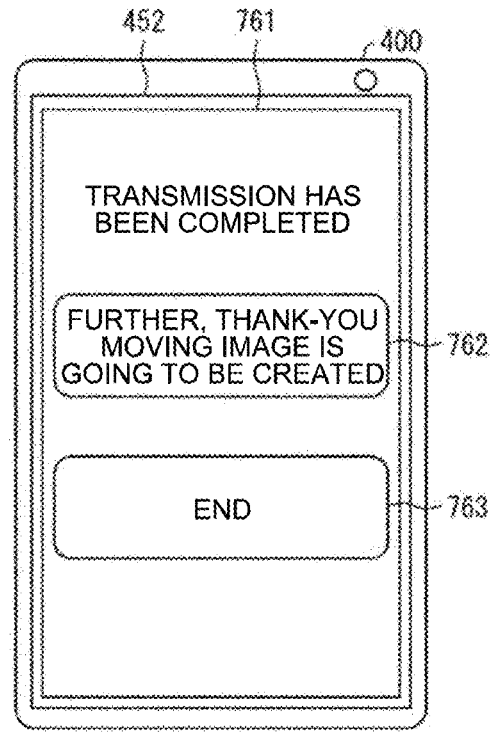
Figure 21C:
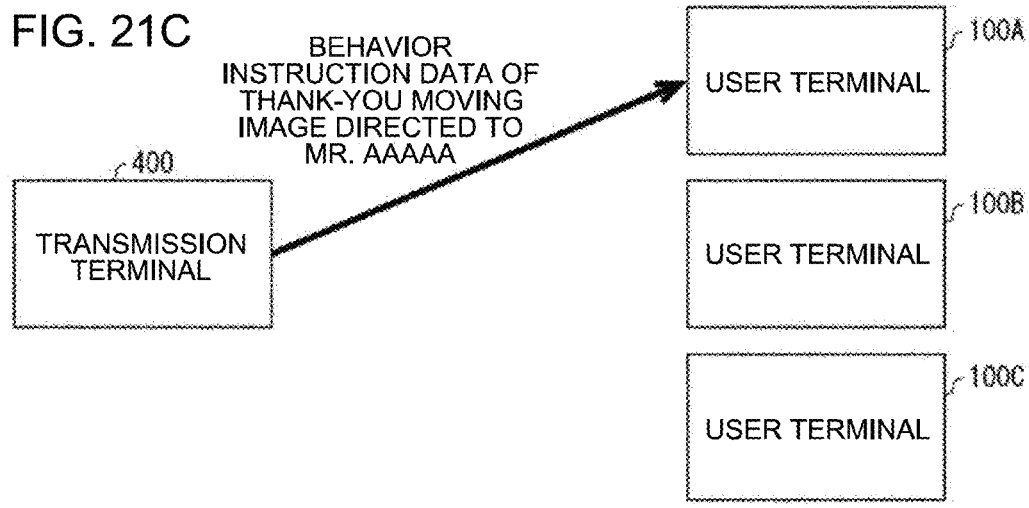

In step S69, the processor 40 functions as the communication controller 411 to transmit the generated behavior instruction data to the user terminal 100 (first computer) of the selected user 3 (user 3A in the example of FIG. 20). FIGS. 21A to 21C are diagrams showing further another specific example of the screen displayed on the transmission terminal 400. After executing step S68, the processor 40 functions as the display controller 412 to control the display unit 452 to display the transmission screen. As an example, the transmission screen may be a transmission screen 751 shown in FIG. 21A. The transmission screen 751 includes a UI image 752 and a motion image 753A. Further, as shown in FIG. 21A, the transmission screen 751 may include information indicating a user to whom the behavior instruction data is transmitted.

The UI image 752 receives an operation for transmitting the behavior instruction data to the selected user 3. The operation may be, for example, a tap operation on the UI image 752. The motion image 753A is a UI image that receives an operation for reproducing the moving image based on the generated behavior instruction data, that is, the moving image based on the behavior instruction data generated for the user 3A. The operation may be, for example, a tap operation on the motion image 753A. The UI image, which receives the operation for reproducing the generated moving image, is not limited to the motion image 753A. For example, the UI image may be a UI image including a text "moving image reproduction". The processor 40 may automatically display the transmission screen 751 again when the moving image is completed.

The transmission screen 751 may preferably further include a UI image that receives an operation for returning to the reception of the sound input. The operation may be, for example, a tap operation on the UI image. The transmission screen 751 includes the UI image, whereby the player 4 can perform the sound input again when the sound input fails, such as when the speech content is mistake. The UI image may be a UI image that receives an operation for returning to the selection of motion data.

Upon reception of the tap operation on the UI image 752, the processor 40 sends the behavior instruction data together with the information indicating the user 3A to the server 200. The server 200 specifies the user terminal 100, which is a destination of the behavior instruction data, based on the information indicating the user 3A, and sends the behavior instruction data to the specified user terminal 100 (that is, the user terminal 100A).

When the sending of the behavior instruction data is completed, the processor 40 may control the display unit 452 to display a transmission completion screen 761 shown in FIG. 21B as an example. The transmission completion screen 761 includes UI images 762 and 763 as an image. Further, the transmission completion screen 761 may include a text indicating that the sending of the behavior instruction data is completed, as shown in FIG. 21B.

The UI image 762 receives an operation for starting creation of behavior instruction data directed to another user 3. The operation may be, for example, an operation of tapping the UI image 762. Upon reception of the tap operation, the processor 40 controls the display unit 452 to display the user list screen again. In other words, when the tap operation is received, the transmission process returns to step S63. At this time, the processor 40 may generate a user list screen based on the user list 421 stored in the transmission terminal 400, and control the display unit 452 to display the generated user list screen. The UI image 763 receives an operation for completing the application. The operation may be, for example, an operation of tapping the UI image 763. When the operation is received, the transmission process ends.

In the example described with reference to FIGS. 20 and 21A to 21C, as shown in FIG. 21C, the transmission terminal 400 sends the behavior instruction data of the moving image directed to the user 3A (the user 3 with the user name "AAAAA") only to the user terminal 100A.

Figure 22:
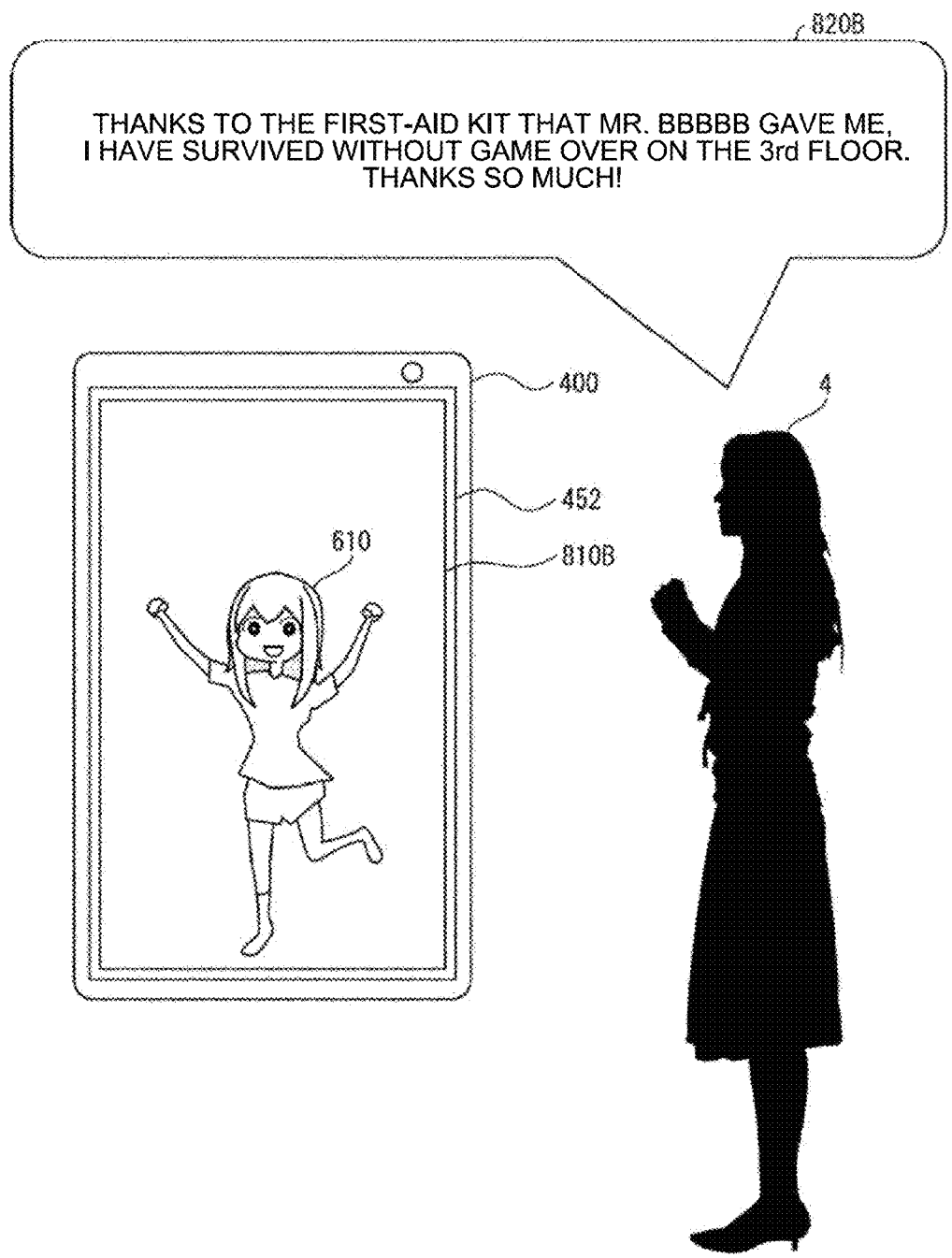
FIG. 22 is a diagram showing another specific example of a sound input by a player according to an embodiment.

FIG. 22 is a diagram showing another specific example of a sound input by the player 4. As shown in FIG. 22, the player 4 inputs a speech sound 820B while reproducing a motion moving image 810B. The speech sound 820B is a speech sound directed to the user 3 (hereinafter, user 3B) with a user name "BBBBB". In other words, in the example of FIG. 22, the player 4 inputs a tap operation on a record image 732B corresponding to the user 3B and creates behavior instruction data directed to the user 3B in step S64. It is assumed that the user terminal 100 used by the user 3B is a user terminal 100B.

Since the speech sound 820B is the speech sound directed to the user 3B, the speech sound is based on the content of the support provided for the avatar object 610 (in other words, the player 4) by the user 3B. Specifically, the user 3B of the user "BBBBB" supplies a first-aid kit in a battle against a Zako enemy on a stage of a 3rd floor, and as a result, the physical strength of the avatar object 610 is restored immediately before the physical strength becomes 0 (becomes game over). For this reason, the speech sound 820B includes the contents "THANKS TO THE FIRST-AID KIT THAT MR. BBBBB GAVE ME, I HAVE SURVIVED WITHOUT GAME OVER ON THE 3RD FLOOR. THANKS SO MUCH!".

FIGS. 23A to 23C are diagrams showing further another specific example of the screen displayed on the transmission terminal 400. The transmission screen 751 shown in FIG. 23A includes a UI image 752 and a motion image 753B. The motion image 753B reproduces a moving image in accordance with the behavior instruction data generated for the user 3B when receiving a tap operation.

Upon reception of the tap operation on the UI image 752, the processor 40 sends the behavior instruction data together with the information indicating the user 3B, to the server 200. The server 200 specifies the user terminal 100, which is a destination of the behavior instruction data, based on the information indicating the user 3B, and sends the behavior instruction data to the specified user terminal 100 (that is, the user terminal 100B).

In the example described with reference to FIGS. 22 and 23A to 23C, as shown in FIG. 23C, the transmission terminal 400 sends the behavior instruction data of the moving image directed to the user 3B (the user 3 with the user name "BBBBB") only to the user terminal 100B.

As described above, the content of the sound based on the sound data included in the behavior instruction data is based on the content of the support provided for the player 4 in participating in the latest game by the user 3. Since the content of the support is different for each user 3, the content of the sound is different for each user 3. In other words, after the game is over, behavior instruction data including sounds having different contents is sent to at least some of the user terminals 100 of the users 3 who participates in the game.

Further, the motion of the avatar object 610 in the example of FIG. 22 is different from the motion in the example of FIG. 20. In other words, the player 4 selects, in the generation of the behavior instruction data directed to the user 3B, motion data different from that at the time of the generation of the behavior instruction data directed to the user 3A. Specifically, in step S66, the player 4 inputs a tap operation on the UI image 745B that selects the motion data corresponding to the record image 742B. In this way, the player 4 can make the motion data included in the behavior instruction data different for each user 3.

Then, the behavior instruction data for each user 3 including the sound data having different contents for each user 3 and the motion data selected for each user 3 is sent only to the user terminal 100 of each user 3. In other words, the unique behavior instruction data unique to each of the user terminals 100 is sent to each of the user terminals 100 of the selected user 3.

Figure 24:
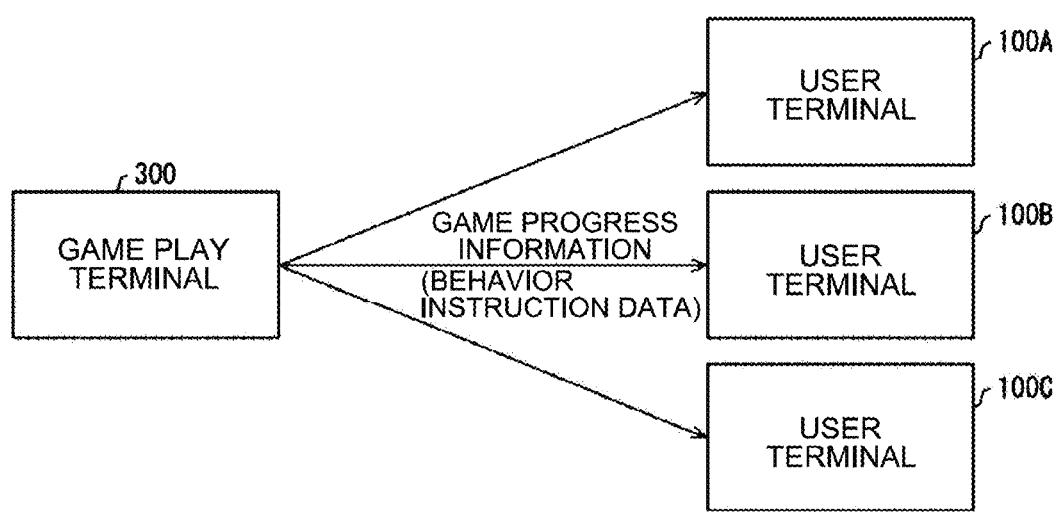
FIG. 24 is a diagram showing an overview of sending of game progress information from the game play terminal to the user terminal according to an embodiment.

FIG. 24 is a diagram showing an overview of sending of game progress information from the game play terminal 300 to the user terminal 100. While the behavior instruction data for reproducing the moving image in the user terminal 100 is unique for each of the user terminals 100, as shown in FIG. 24, the game progress information sent to the user terminals 100 of all of the users 3 participating in the game during the game execution are common among the respective user terminals 100. In other words, the behavior instruction data included in the game progress information is also common among the respective user terminals 100. As described above, it can be said that the behavior instruction data for reproducing the moving image is different from the behavior instruction data for progressing the game from viewpoints of the difference between the user terminals 100 and the destination.

(Moving Image Reproduction Processing in User Terminal 100)

Figure 25:
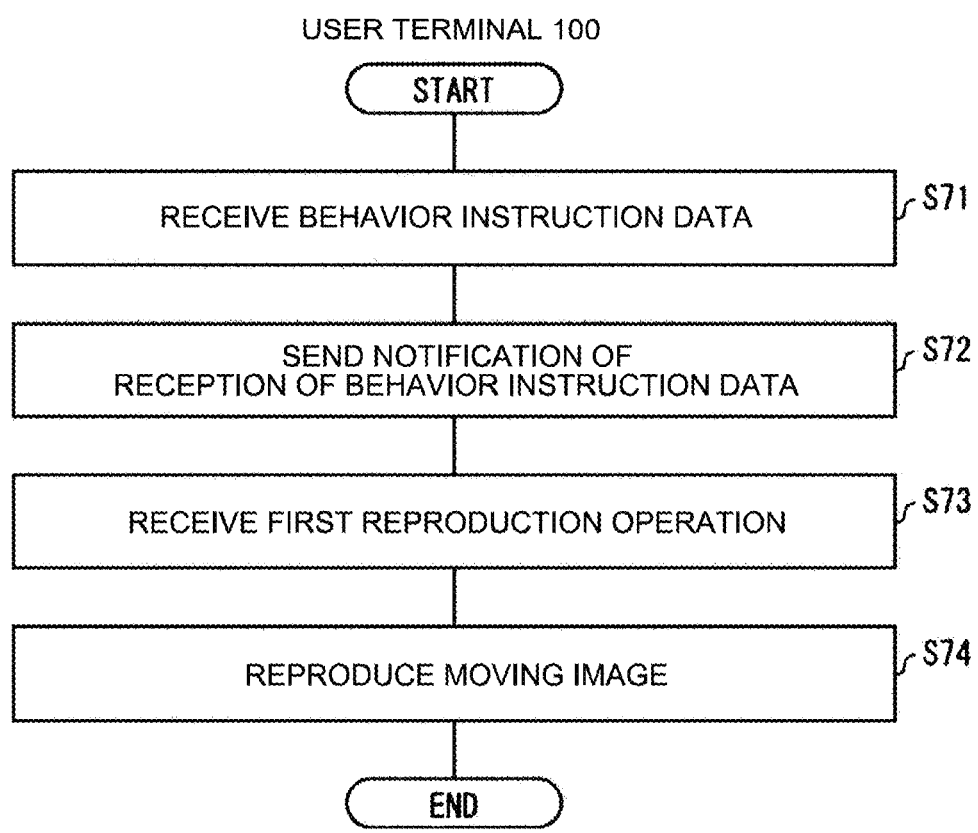
FIG. 25 is a flowchart showing a part of processing to be executed in the user terminal according to an embodiment.

FIG. 25 is a flowchart showing an example of moving image reproduction processing to be executed by the user terminal 100.

In step S71, the processor 10 functions as the moving image reproducer 117 to receive the behavior instruction data. In step S72, the processor 10 functions as the moving image reproducer 117 to notify the user 3 of the reception of the behavior instruction data. As an example, the processor 10 notifies the user 3 of the reception of the behavior instruction data, using at least one of a display of a notification image on the display unit 152, reproduction of a notification sound from a speaker (not shown), and lighting or flickering of a lighting unit (not shown) configured by an LED (light-emitting diode).

In step S73, the processor 10 functions as the operation receiver 111 to receive a first reproduction operation for reproducing the moving image. As an example, the first reproduction operation may be an operation of tapping the notification image. In step S74, the processor 10 functions as the moving image reproducer 117 to reproduce the moving image by rendering the behavior instruction data. As an example, the processor 10 may start an application for playing the main game to reproduce the moving image, or may start an application for reproducing the moving image different from the above-described application to reproduce the moving image. Hereinafter, the moving image will be referred to as a "thank-you moving image".

Figure 26:
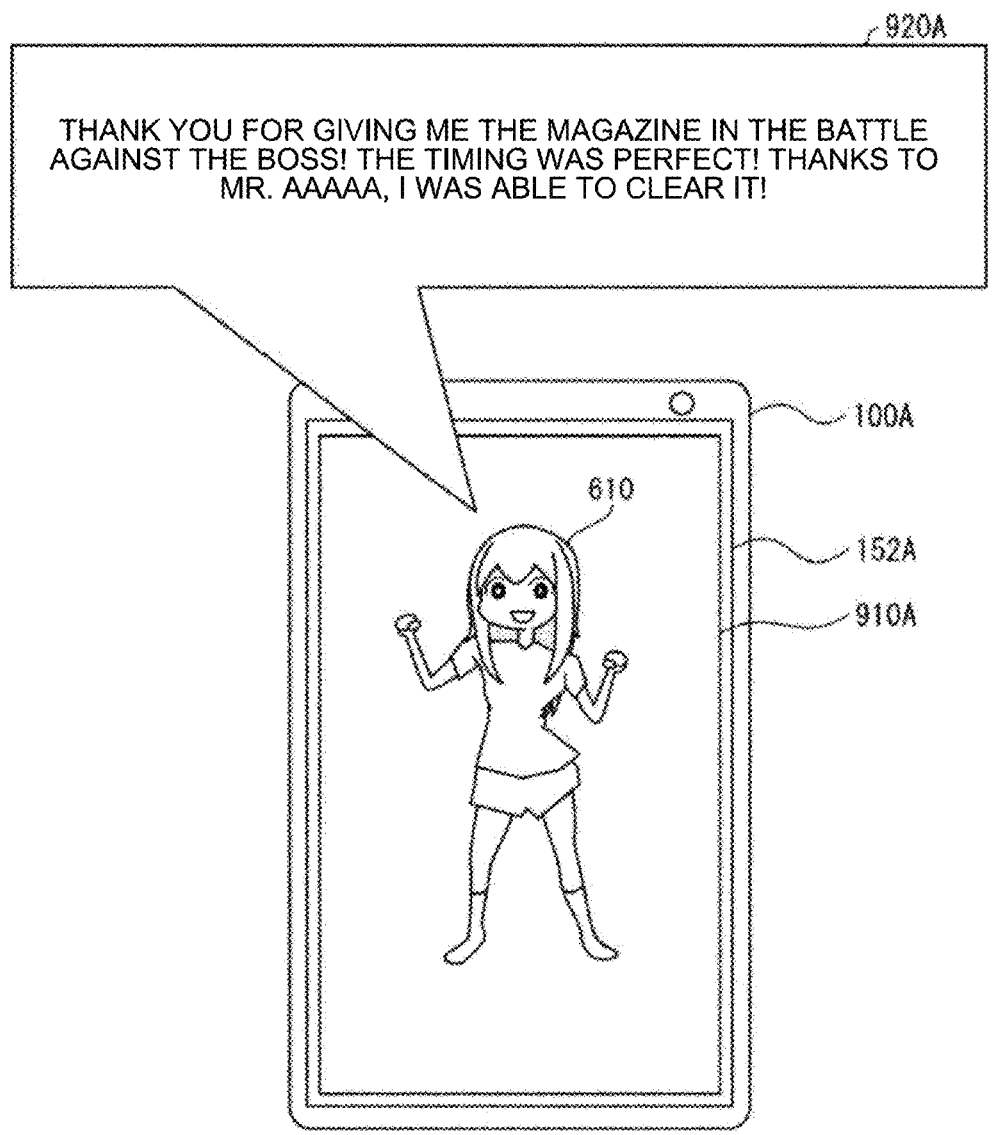
FIG. 26 is a diagram showing a specific example of moving image reproduction.

FIG. 26 is a diagram showing a specific example of reproduction of a thank-you moving image, and specifically, is a diagram showing an example of reproduction of a thank-you moving image in the user terminal 100 of the user 3A. In a thank-you moving image 910A reproduced in the user terminal 100, the avatar object 610 throws out a sound 920A while executing a certain motion. In other words, the processor 10 controls the speaker (not shown) to output the sound 920A while reproducing the thank-you moving image 910A including the avatar object 610 that executes a certain motion.

The motion in the thank-you moving image 910A is based on the motion data selected by the player 4 in the generation of the behavior instruction data directed to the user 3A, and the sound 920A is based on the sound data generated from the speech sound 820A input by the player 4 in the generation of the behavior instruction data. In other words, the sound 920A is a sound including the content of the support provided by the user 3A in the game and gratitude for the support. In this way, the user 3A can watch the thank-you moving image in which the avatar object 610 speaks the content of the support provided by himself/herself in the game and the gratitude for the support by the input of the first reproduction operation.

As an example, the user terminal 100 may control the touch screen 15 to display at least one UI image after the reproduction of the thank-you moving image 910A is completed. The UI image may be, for example, a UI image that receives an operation for reproducing the thank-you moving image 910A again, may be a UI image that receives an operation for transitioning to another screen, or may be a UI image that receives an operation for completing the application.

Further, as an example, the user terminal 100 may control the touch screen 15 to display at least one UI image during the reproduction of the thank-you moving image 910A. The UI image may be, for example, a plurality of UI images that receive operations of temporarily stopping or completing the thank-you moving image 910A being reproduced, or changing a reproducing scene.

These UI images displayed during the reproduction of the thank-you moving image 910A and after the thank-you moving image 910A is hunted do not include a UI image for answering to the avatar object 610. In other words, the thank-you moving image 910A according to the present embodiment does not include a means for answering to the avatar object 610.

Figure 27:
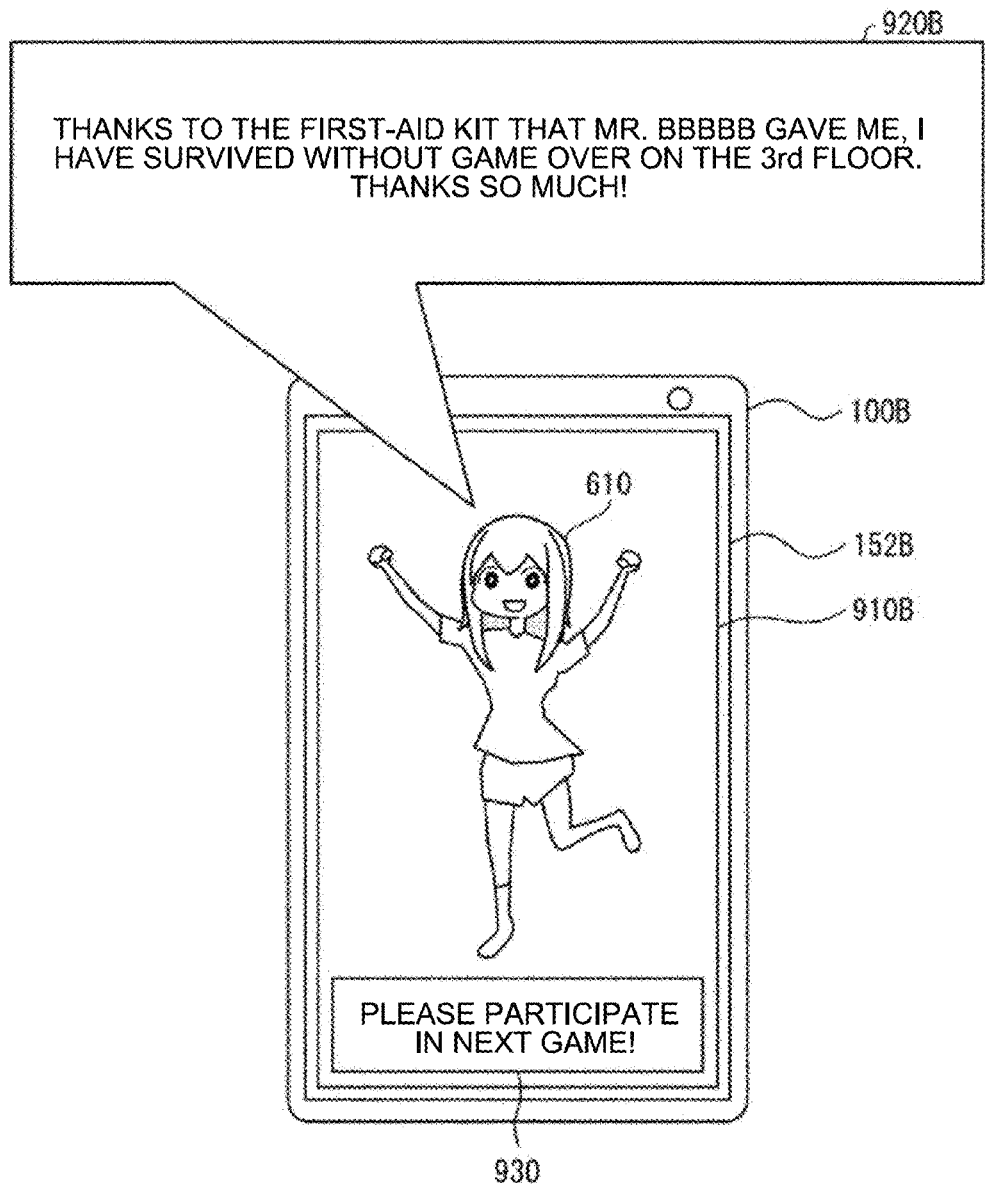
FIG. 27 is a diagram showing another specific example of moving image reproduction.

FIG. 27 is a diagram showing another specific example of reproduction of a thank-you moving image, and specifically, is a diagram showing an example of reproduction of a thank-you moving image in the user terminal 100 of the user 3B. In a thank-you moving image 910B reproduced in the user terminal 100, the avatar object 610 throws out a sound 920B while executing a certain motion. In other words, the processor 10 controls the speaker (not shown) to output the sound 920B while reproducing the thank-you moving image 910B including the avatar object 610 that executes a certain motion.

The motion in the thank-you moving image 910B is based on the motion data selected by the player 4 in the generation of the behavior instruction data directed to the user 3B, and the sound 920B is based on the sound data generated from the speech sound 820B input by the player 4 in the generation of the behavior instruction data. Therefore, the motion performed by the avatar object 610 in the example of FIG. 27 is different from the motion in the example of FIG. 26. Further, the sound 920B is a sound including the content of the support provided by the user 3B in the game and gratitude for the support. Therefore, the content of the sound 920B in the example of FIG. 27 is different from the content of sound 920A in the example of FIG. 26.

As described above, the thank-you moving image received by at least some of the user terminals 100 of the users 3 participating in the game after the game is over is a moving image in which the speech content of the avatar object 610 is different for each user 3.

The processor 10 may display a UI image 930 including the content for urging participation in the next game in a manner of being superimposed on the moving image 910. The UI image 930 may be transmitted together with the behavior instruction data, or may be stored in the user terminal 100 as the game information 132.

In the embodiment described above, the example has been described in which the avatar object 610 behaves in the virtual space 600B similar to the virtual space 600A defined by the game play terminal 300, and the field-of-view image 660 of the field-of-view area 640B depending on the position, direction, and inclination of the virtual camera 620B is displayed on the touch screen 15 of the user terminal 100. However, the space where the avatar object 610 behaves is not limited to the virtual space, and may be a real space. An example of the real space may include a space specified by the acquired image captured and acquired by the camera 17.

On the user terminal 100, the avatar object 610 may behaves in accordance with the game progress information in the space (hereinafter, also referred to as an augmented reality space) where the avatar object 610 is arranged with respect to the image acquired by the camera 17. Thereby, it can make the user feel an impression that the avatar object 610 actually behaves in the real space in front of the user.

In addition, the avatar object 610 in the augmented reality space moves in response to the motion of the player (performer) who is playing live, and outputs the speech sound of the performer. For this reason, the number of the variations in the behavior of the avatar object 610 in the augmented reality space significantly increases (becomes practically infinite depending on the performer), and behavior and speech can be made depending on the current situation, which attracts the user's attention. In the following description, an example will be described in which the avatar object 610 behaves in the augmented reality space.

Figure 28A:
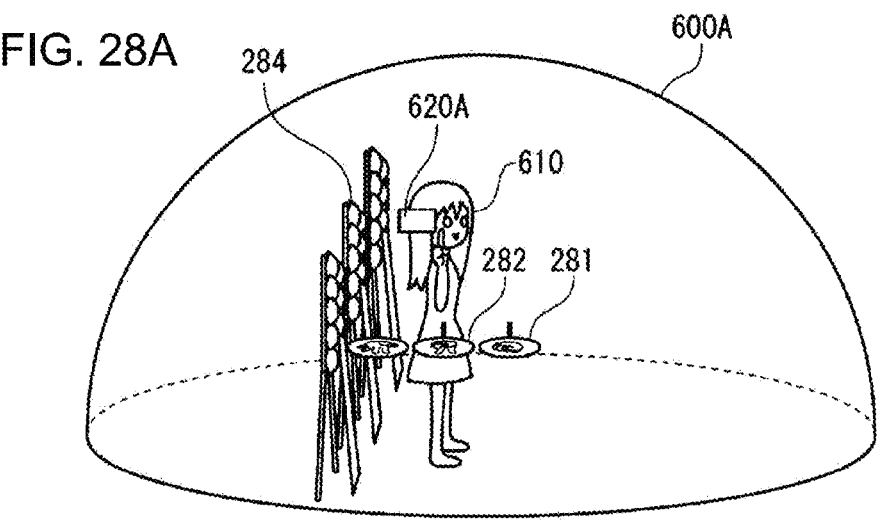
FIG. 28A is a diagram for schematically illustrating a virtual space defined on a game play terminal side in the progress of a rock-paper-scissors game.

An example will be described with reference to FIGS. 28A and 28B through FIGS. 32A to 32C in which the user performs a game (hereinafter, referred to as a rock-paper-scissors game) in which the avatar object 610 behaving live in the augmented reality space is confronted by rock-paper-scissors. FIG. 28A is a diagram schematically illustrating the virtual space 600A defined closer to the game play terminal 300 when the rock-paper-scissors game progressed.

In FIG. 28A, the avatar object 610, option objects 281 to 283, and a wreath object 284 reminiscent of a wreath are arranged in the virtual space 600A. The avatar object 610 moves depending on the motion of the player (performer) who behaves live, and outputs the speech sound of the performer. The virtual camera 620A is arranged at the position of the head of the avatar object 610. In addition, although not shown, other objects, that is, objects decorating the periphery of the avatar object 610, a viewer object corresponding the viewer, a background object, and a floor object are arranged in the virtual space 600A.

Further, each of the option objects 281 to 283 is configured by a bar portion and a disk portion at a tip. Illustrations representing rock/scissors/paper are drawn on the surface of the disk portion. In each of the option objects 281 to 283, the bar portion can be gripped in response to a grip motion of the player. The operation (motion) of gripping the option objects 281 to 283 by the player is detected by a controller 540 provided with a motion sensor 520 that is attached to the hand of the player and detects movement of the hand (a behavior of the hand (for example, a position of each finger and shape and direction of the grip)). The player grips the option object corresponding to the final outstretching hand (rock/scissors/paper) among the option objects 281 to 283 and raises it above, whereby the outstretching hand of the avatar object 610 is decided.

The game play terminal 300 performs live transmission of game progress information including information and sound data (behavior instruction data) for specifying position, posture, and direction of at least the avatar object 610 and the option objects 281 to 283 among the objects arranged in the virtual space 600A, toward the plurality of user terminals 100 at predetermined time intervals. The game progress information transmitted toward the plurality of user terminals 100 is information common to the plurality of user terminals 100. Thereby, the behaviors of at least the avatar object 610 and the option objects 281 to 283 can be shared (synchronized) between the game play terminal 300 and each of the plurality of user terminals 100. The object shared between the game play terminal 300 and the plurality of user terminals 100 may be only the avatar object 610 as long as including at least the avatar object 610 who can behave live by the performer among the objects arranged in the virtual space 600A, or may include objects other than the avatar object 610 and the option objects 281 to 283. Further, the data transmitted from the game play terminal 300 toward the plurality of user terminals 100 includes not only the game progress information but also initial arrangement information, game information 132, and information for specifying the type (rock, scissors, or paper) of the option object decided by the hand to be outstretched by the avatar object 610.

Figure 28B:
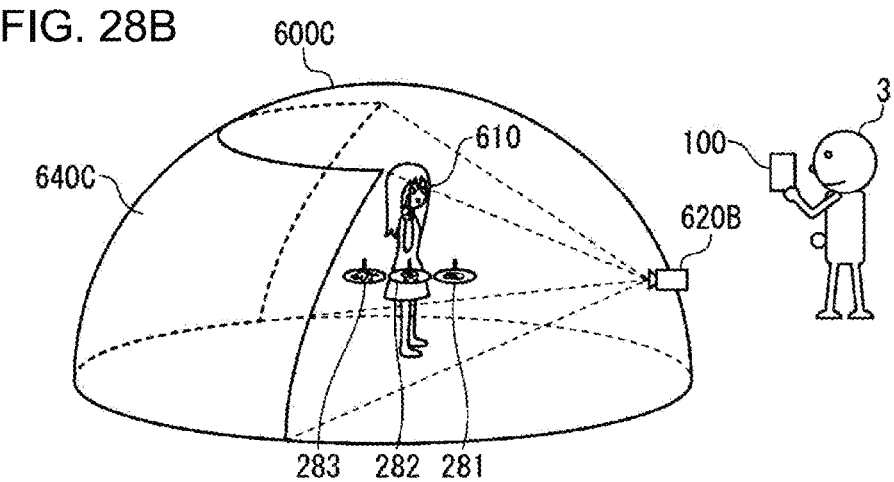
FIG. 28B is a diagram for schematically illustrating an augmented reality virtual space defined on a user terminal side and superimposed on an acquired image.
Figure 29:
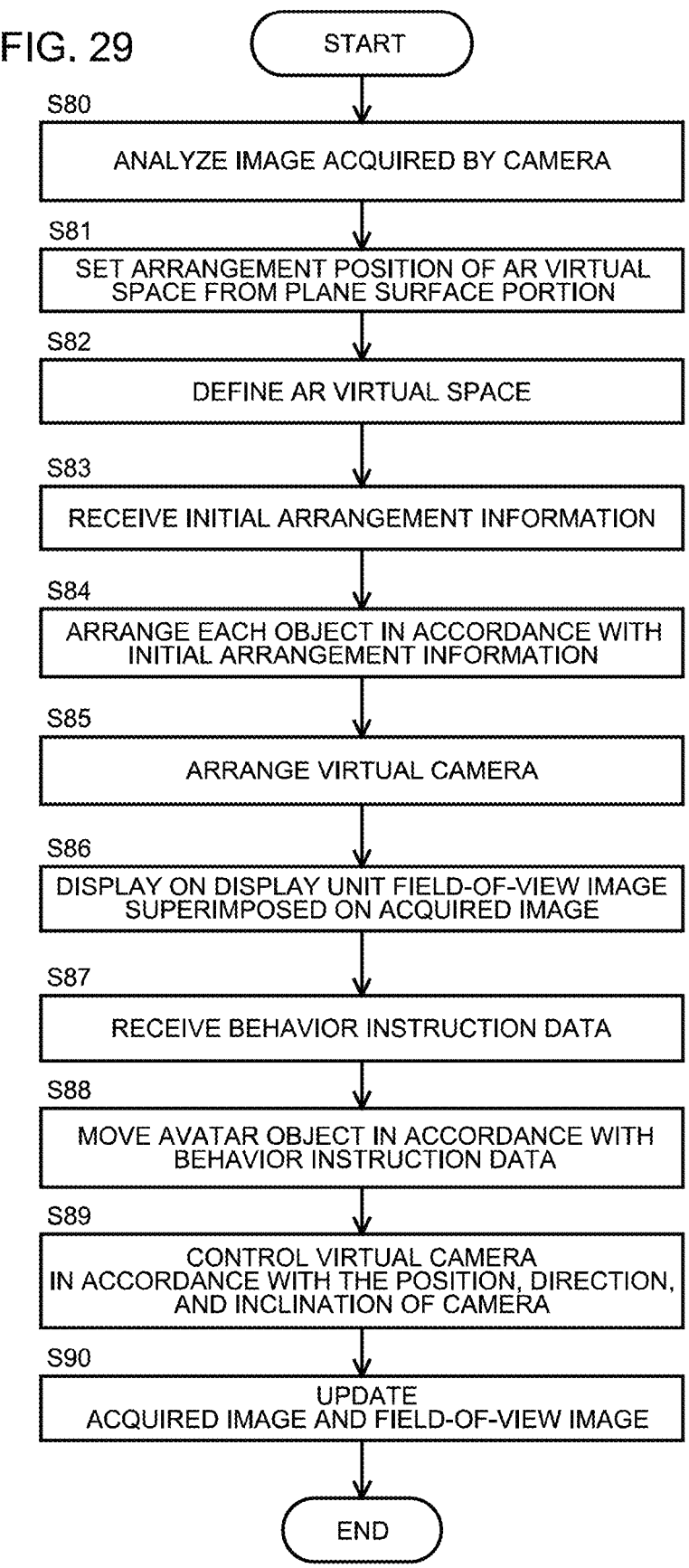
FIG. 29 is a flowchart showing an example of a flow of processing for displaying an image in an augmented reality space.

FIG. 28B is a diagram schematically illustrating a virtual space 600C (hereinafter, also referred to as AR virtual space 600C) for augmented reality defined closer to the user terminal 100 and superimposed on the acquired image. Further, FIG. 29 is a flowchart showing an example of a flow of processing for displaying an image in the augmented reality space.

First, in step S80, the processor 10 analyzes the acquired image captured and acquired by the camera 17, using techniques related to image recognition and space recognition. Thereby, for example, a three-dimensional space is specified from the acquired image, and a plane surface portion (for example, a horizontal portion, specifically, a surface of the floor) and a size (a width) of the plane surface portion are specified.

Next, in step S81, the processor 10 sets, based on the specified plane surface portion, an arrangement position at which a field-of-view image in the AR virtual space 600C is arranged (superimposed) on the acquired image. The processor 10 sets a predetermined position (for example, a center position of the plane surface portion) of the plane surface portion as a position at which the field-of-view image in the AR virtual space 600C is arranged. Thereby, the arrangement position of the field-of-view image matches with the predetermined position of the field-of-view image.

In step S82, the processor 10 defines the AR virtual space 600C shown in FIG. 28B. In step S83, the processor 10 receives the initial arrangement information (similarly to S6 and S22 in FIG. 8). In step S84, the processor 10 arranges various objects in the AR virtual space 600C in accordance with the initial arrangement information. In the example of FIG. 28B, various objects are some of the objects in the virtual space 600A, and are the avatar object 610 and the option objects 281 to 283. In FIG. 28B, the avatar object 610 and the option objects 281 to 283 are arranged to have the same positional relation as in FIG. 28A.

In step S85, the processor 10 arranges the virtual camera 620B in the AR virtual space 600C. The processor 10 arranges, based on a capturing direction (for example, orientation, inclination) of the camera 17 at the time of capturing the acquired image, for example, the virtual camera 620B at a position where the AR virtual space 600C is viewed in the same direction as the capturing direction. Specifically, when the capturing direction is substantially a horizontal direction, the virtual camera 620B is arranged at a position (for example, FIGS. 30A to 30C and the like) where the AR virtual space 600C is viewed in the horizontal direction, and when the capturing direction is a direction obliquely viewed down from above, the virtual camera 620B is arranged at a position (for example, FIGS. 33A and 33B) where the AR virtual space 600C is obliquely viewed down from above.

In step S86, the processor 10 controls the display unit 152 to display the image formed in the augmented reality space such that the field-of-view image 640C acquired from the virtual camera 620B is superimposed on the image acquired by the camera 17. At this time, the processor 10 superimposes the field-of-view image 640C at a predetermined position on the acquired image set in step S81 with a display size according to the size of the plane surface portion specified in step S80 to generate and display the image in the augmented reality space.

In step S87, the processor 10 receives the behavior instruction data (similarly to S26 in FIG. 8). In step S88, the processor 10 moves the avatar object 610 in the augmented reality space in accordance with the behavior instruction data (similarly to S27 in FIG. 8). In other words, the processor 10 reproduces the video, in which the avatar object 610 is behaving in the augmented reality space, by the real-time rendering. Thereby, the behaviors of the avatar object 610 and the option objects 281 to 283 in the virtual space 600A closer to the game play terminal 300 can synchronize with the behaviors of the avatar object 610 and the option objects 281 to 283 in the augmented reality space closer to the user terminal 100.

In step S89, the processor 10 controls the virtual camera 620B in synchronization with the changes in the position, direction, and inclination of the camera 17. In step S90, the processor 10 updates the acquired image and the field-of-view image. Thereby, the acquired image changes depending on the change in the position of the camera 17, the display position of the field-of-view image also changes due to the change in the predetermined position, and the field-of-view image changes depending on the change in the position of the virtual camera 620B. Thereby, for example, when the camera 17 is turned to the left as if the left surface of the avatar object 610 is captured, the acquired image captured and acquired by the camera 17 is updated to the field-of-view image when the avatar object 610 is viewed from the left surface. In addition, when the camera 17 is turned to the right as if the right surface of the avatar object 610 is captured, the acquired image captured and acquired by the camera 17 is updated to the field-of-view image when the avatar object 610 is viewed from the right surface.

Figure 30A:
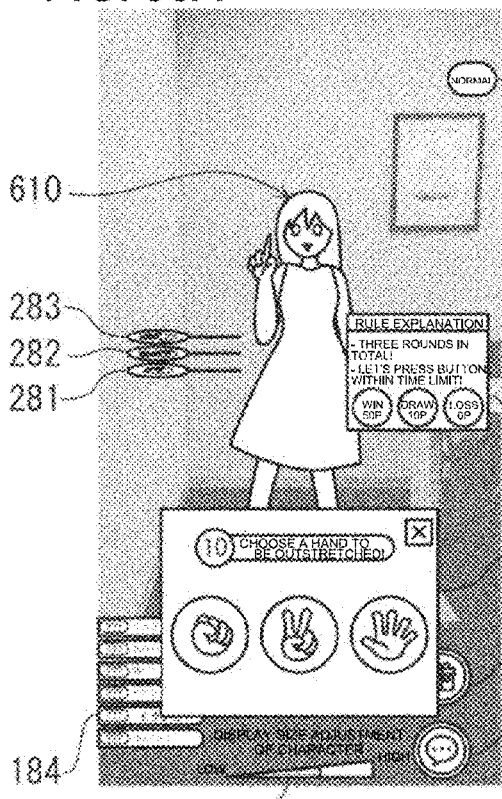
FIGS. 30A, 30A', 30B and 30C are diagrams showing a display example in which an avatar object is arranged with respect to an acquired image A captured and acquired by a camera of a user terminal owned by a user A.
Figure 30A:
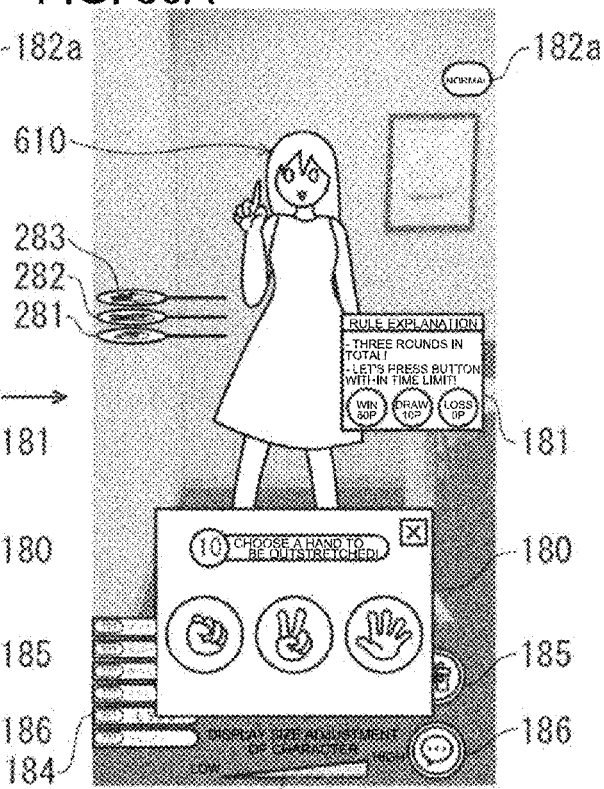

FIGS. 30A to 30C through FIGS. 32A to 32C are diagrams showing display examples of the display unit 152 of the user terminal 100 during the progress of the rock-paper-scissors game. FIGS. 30A, 30A', 30B and 30C show a display example in which the avatar object 610 is arranged in an acquired image A (an image of a room where a picture is decorated on a wall and a desk is placed) captured and acquired by the camera 17 of the user terminal 100A owned by the user A.

FIG. 30A shows a display example when the avatar object 610 in the virtual space 600A is in the state shown in FIG. 28A. The acquired image A is an image captured in the horizontal direction. For this reason, the virtual camera 620B is arranged at a position where the AR virtual space 600C is viewed in the horizontal direction. As a result, the avatar object 610 is in a front view in FIG. 30A. As shown in FIG. 30A, the avatar object 610 is displayed in a state of being erected at a substantially center position of the floor, which is a plane surface portion of the acquired image A, and the option objects 281 to 283 are arranged on a right front side (having the same positional relation as in FIG. 28A) of the avatar object 610 with reference to the avatar object 610. The avatar object 610 in the FIG. 30A shows a scene where sound is being output together with a state (motion) of thinking, for example, "what should I outstretch? what should I choose?".

Further, during the progress of the rock-paper-scissors game, various UIs and game information are displayed on the display unit 152. In FIG. 30A, for example, a selection UI 180, a rule explanation display 181, a normal mode transition icon 182a, a display size adjustment UI 183, an item-supply icon 185, and a comment input icon 186 are displayed in a manner of being superimposed on the image in the augmented reality space. Further, a comment display unit 184 for displaying a comment content directed to the avatar object 610 is provided at a lower left of the display unit 152.

The rule explanation display 181 is an image for explaining a rule for the rock-paper-scissors game. In FIG. 30A, for example, messages such as "three rounds in total!", "let's press a button within a time limit!", "win 50 P", "draw 10 P", and "loss 0 P" are displayed.

The selection UI 180 includes a button icon for selecting a hand to be outstretched by the user, and is a UI for receiving an input operation (tap operation) on the button icon. Therefore, as shown in FIG. 30A, the selection UI 180 is displayed in preference to the avatar object 610, the comment display unit 184, the item-supply icon 185, and the comment input icon 186. In FIG. 30A, a message such as "choose a hand to be outstretched!" is displayed, and a button icon corresponding to rock, a button icon corresponding to scissors, and a button icon corresponding to paper are displayed from the left below the message. Thereby, the user can intuitively recognize that the hand to be outstretched can be selected by a touch operation on the button icon. In addition, the time limit (herein, "10") capable of selecting the hand to be outstretched is displayed on the left side of the message "choose a hand to be outstretched!", and an "×" button for deleting the selection UI 180 itself is displayed on the right side of the message.

The user can delete the selection UI 180 by selecting the "×" button even when the selection of the hand to be outstretched is not finished. This is because when the selection UI 180 is displayed, the avatar object 610 (character), the comment display unit 184, and the item-supply icon 185 are hidden in the selection UI 180 and the image of the avatar object 610 become difficult to be seen from. When the user does not select the hand to be outstretched within the time limit as a result of deletion of the selection UI 180, the hand to be outstretched of the user may be automatically determined. In addition, when the selection UI 180 is deleted, an icon (a message icon such as "come back to game") is displayed to display the selection UI 180 again, the selection UI 180 may be displayed again by the input operation on the icon, the selection UI 180 may be displayed again by an instruction of the performer, and the selection UI 180 may be displayed again when some conditions are satisfied (for example, when the time limit reaches a specific value).

The display size adjustment UI 183 is a UI for receiving an input operation for adjusting a display size of the field-of-view image including the avatar object 610 and the option objects 281 to 283 arranged with respect to the acquired image. In FIG. 30A, an input gauge is displayed below a message such as "display size adjustment of character", a "small" is displayed on a left end of the input gauge, and a "large" is displayed on a right end of the input gauge. The processor 10 receives an input operation (tap operation) on the input gauge to perform a process of adjusting the display size of the avatar object 610 included in the field-of-view image in accordance with the input operation.

FIG. 30A' is a display example when an input operation (for example, a tap operation on the right end of the input gauge) is performed to maximize the display size with respect to the input gauge. The gauge of the display size adjustment UI 183 is maximized in accordance with the input operation, and the display size of the field-of-view image including the avatar object 610 and the option objects 281 to 283 is displayed in the maximum size larger than that in FIG. 30A at the same time.

When the field-of-view image including the avatar object 610 and the option objects 281 to 283 is arranged, the display size is determined depending on the size of the analyzed plane surface portion as described above. Therefore, depending on the analysis result, the avatar object 610 may be displayed extremely large or small with respect to the acquired image. In such a case, the display size of the avatar object 610 can be adjusted to an appropriate display size or a display size of user's preference for the acquired image by the input operation on the input gauge.

The normal mode transition icon 182a is an icon for switching to a mode in which the avatar object 610 during the rock-paper-scissors game behaves not in the augmented reality space but in the virtual space similar to the virtual space 600A closer to the game play terminal 300. The processor 10 receives an input operation on the normal mode transition icon 182a to execute, for example, the processing on the user terminal 100 shown in FIG. 8, to define the virtual space 600B synchronizing with the virtual space 600A in the game play terminal 300, and to produce the behavior of the avatar object 610 in the virtual space 600B, thereby displaying the field-of-view image from the virtual camera 620B. This will be described below with reference to FIGS. 32A to 32C.

The item-supply icon 185 is an icon that serves as a trigger for supplying an item and giving the item to the avatar object 610. When the input operation on the item-supply icon 185 is received, a window is displayed for selecting from a plurality of types of items and supplying the selected item. As described above, the selection UI 180 is displayed in preference to the item-supply icon 185. Therefore, when the selection UI 180 is displayed in a manner of being superimposed on the item-supply icon 185, the input operation on the item-supply icon 185 may not be effectively received unless the display of the selection UI 180 is not erased. Further, even when the selection UI 180 is displayed in a manner of being superimposed on the item-supply icon 185, the input operation on the item-supply icon 185 may be effectively received in a state where the display of the selection UI 180 is maintained.

The comment input icon 186 is an icon that serves as a trigger for inputting a comment directed to the avatar object 610. When an input operation on the comment input icon 186 is received, a window is displayed for inputting and sending a comment. The selection UI 180 is displayed at a position where the selection UI is not displayed in a manner of being superimposed on the comment input icon 186, but similarly to the item-supply icon 185, the input operation on the comment input icon 18 may not be effectively received unless the display of the selection UI 180 is not erased. Further, even when the selection UI 180 is displayed, the input operation on the comment input icon 18 may be effectively received in a state where the display of the selection UI 180 is maintained. On the comment display unit 184, a predetermined number of comments are displayed together with the user name in order from the newest comment input to the avatar object 610.

Figure 30B:
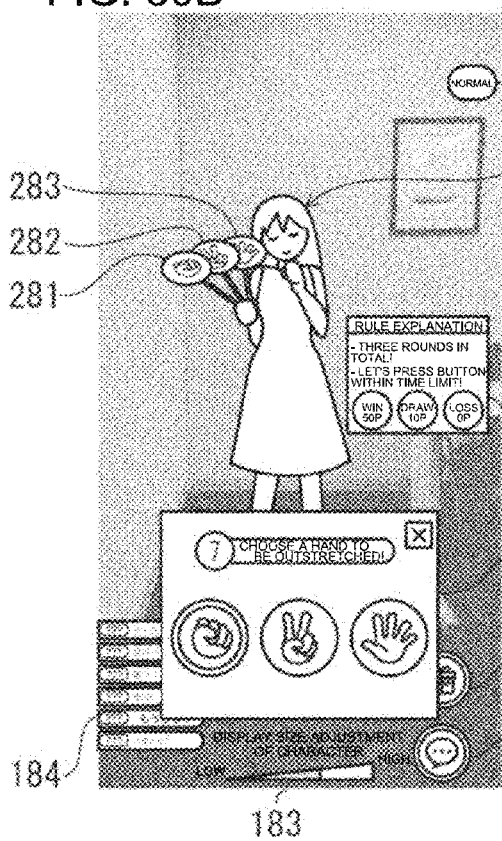

FIG. 30B shows a display example when the user selects a hand to be outstretched. FIG. 30B shows an example in which "rock" is selected. When "rock" is selected, as shown in FIG. 30B, a button icon of "rock" in the selection UI 180 is updated to the selected state (a state surrounded by double circles). In FIG. 30B, since the time limit is "7", the user determines the hand to be outstretched with 7 seconds left. On the other hand, the avatar object 610 in the FIG. 30B shows a scene where sound is being output together with a state (motion) of thinking, for example, "what should I choose? scissors or paper?" in a state of gripping the option objects 281 to 283. After the time limit has elapsed, the avatar object 610 raises any one of the option objects 281 to 283 with a shout such as "rock-paper-scissors" at the timing of the performer.

Figure 30C:
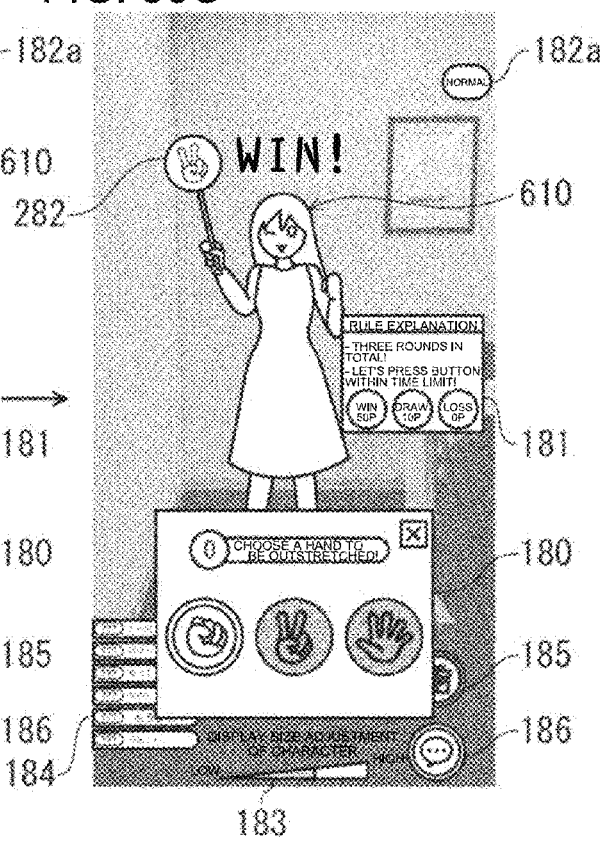

FIG. 30C shows a display example when the avatar object 610 outstretches the hand after the time limit has elapsed. In FIG. 30C, the avatar object 610 raises the option object 282 of "scissors". Thereby, the fact is notified that the avatar object 610 raises "scissors". When the avatar object 610 outstretches the hand, information is received to specify the type (rock, scissors, or paper) of the option object determined by the hand to be outstretched by the avatar object 610. The processor 10 determines, on the basis of the information, win or loss of the user compared with the hand to be outstretched by the user. In FIGS. 30A to 30C, since the user A selects "rock", it is determined that the user A wins. As a result, a message such as "win" is displayed above the avatar object 610.

Figure 31A:
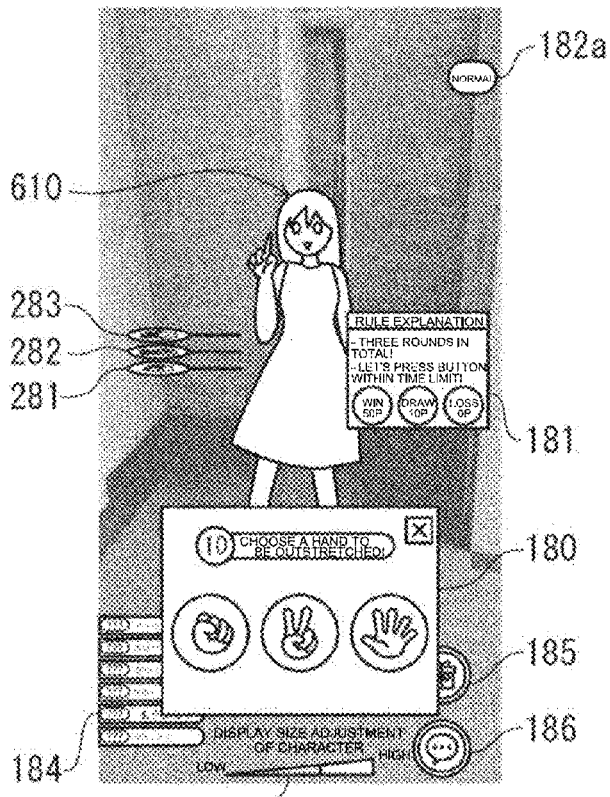
FIGS. 31A to 31C are diagrams showing a display example in which an avatar object is arranged with respect to an acquired image B captured and acquired by a camera of a user terminal owned by a user B.
Figure 31B:
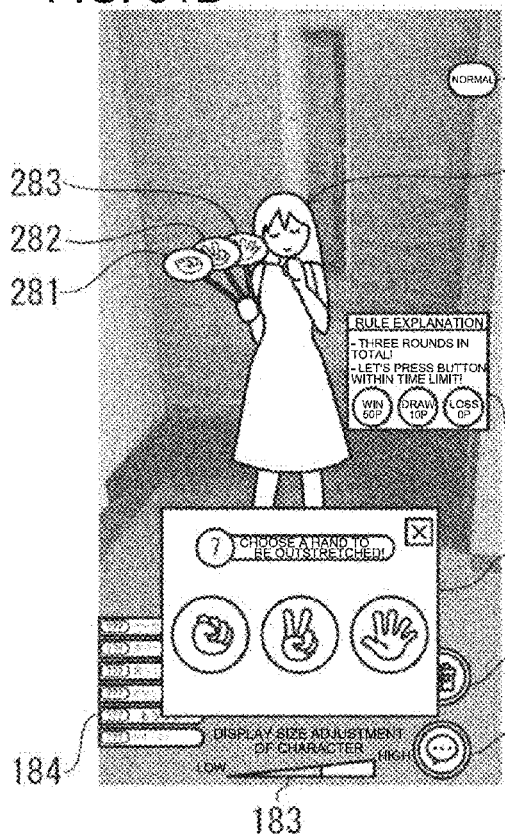
Figure 31C:
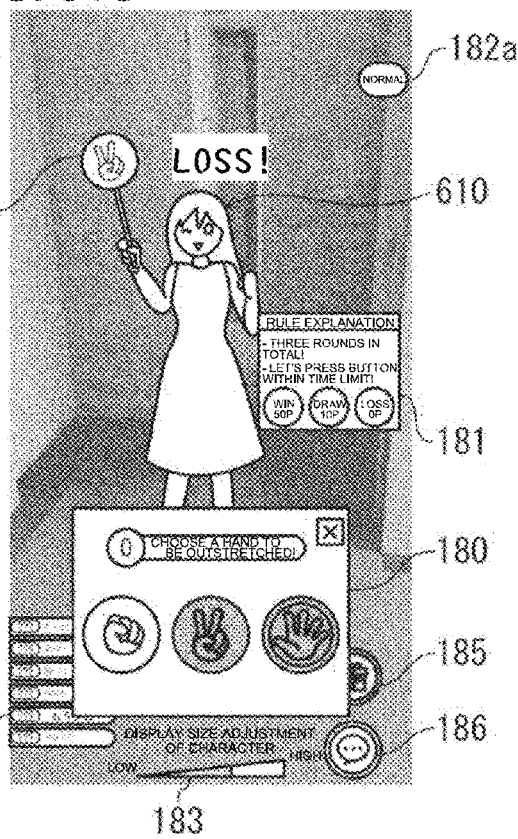

FIGS. 31A to 31C show a display example in which the avatar object 610 is arranged with respect to an acquired image B (an image of an entrance in which a mirror is hung on a wall) captured and acquired by the camera 17 of the user terminal 100B owned by the user B. Also in FIGS. 31A to 31C, the avatar object 610 is displayed in a state of being erected at a substantially center position of the floor, which is a plane surface portion of the acquired image B, and the option objects 281 to 283 are arranged on a right front side of the avatar object 610 with reference to the avatar object 610.

FIG. 31A shows a display example of the user terminal 100B at the same timing as that in FIG. 30A. Similarly, FIGS. 31B and 31C show display examples of the user terminal 100B at the same timings as those in FIGS. 30B and 30C. Comparing FIGS. 31A to 31C with FIGS. 30A to 30C, respectively, the erecting positions of the avatar objects 610 (that is, an arrangement position of the field-of-view image from the virtual camera 620B) with respect to the acquired images may be different from one another due to the difference in the acquired images, but since the avatar object 610 behaves based on the common game progress information, the avatar object 610 and the option objects 281 to 283 synchronize with one another among the plurality of user terminals.

On the other hand, since the user B has not yet selected the hand to be outstretched in FIG. 31B in which the time limit is "7", none of the button icons has been updated to the selected state. Thereafter, it is assumed that the user B selects "paper" within the time limit. As shown in FIG. 31C, since the avatar object 610 raises the option object 282 of "scissors" and the "scissors" is outstretched (similarly to FIG. 30C), the user B loses. In this way, the behaviors of the avatar objects 610 played by the player are common among the plurality of user terminals, but the results of the rock-paper-scissors game are different from one another among the plurality of user terminals depending on the user's input operations.

Figure 32A:
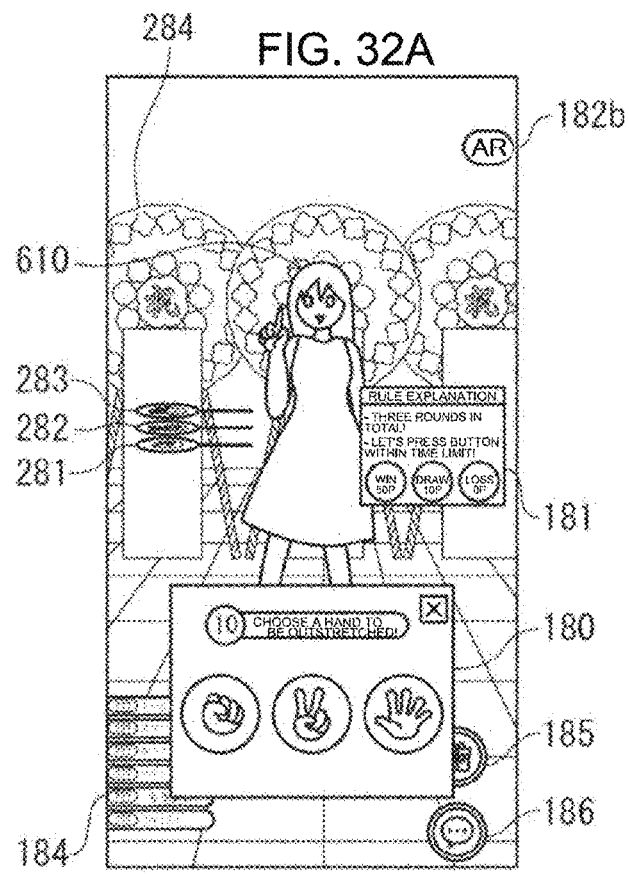
FIGS. 32A to 32C are diagrams showing a display example after an input operation to a normal mode transition icon is received.
Figure 32B:
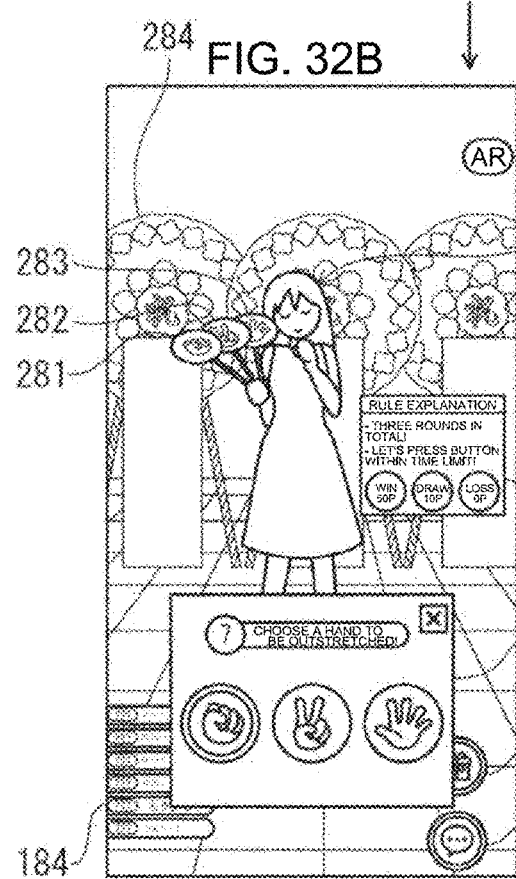
Figure 32C:
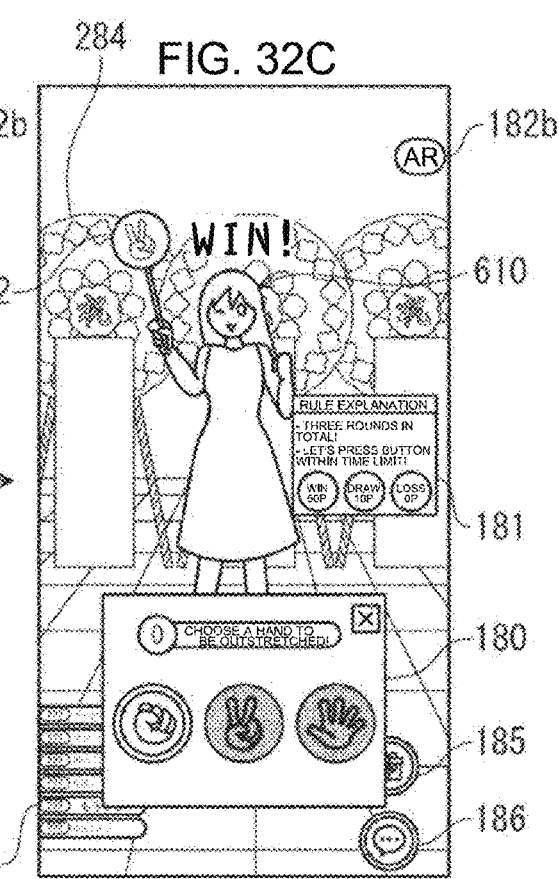

FIGS. 32A to 32C are diagrams showing a display example after an input operation on the normal mode transition icon 182a is received in the user terminal 100 owned by any user during the progress of the rock-paper-scissors game.

FIG. 32A shows a display example when the input operation on the normal mode transition icon 182a is received at the timing at which FIG. 30A or 31A is displayed. The processor 10 receives the input operation on the normal mode transition icon 182a to execute, for example, the processing on the user terminal 100 shown in FIG. 8 and to define the virtual space 600B synchronizing with the virtual space 600A in the game play terminal 300. Therefore, the objects of the wreath object 284, the viewer object, and the background object are arranged in the virtual space 600B in addition to the avatar object 610 and the option objects 281 to 283. Further, the processor 10 produces the behavior of the avatar object 610 in the virtual space 600B on the basis of the game progress information, and displays the field-of-view image from the virtual camera 620B on the display unit 152. Therefore, unlike FIGS. 30A to 30C and FIGS. 31A to 30C, the wreath object 284 is displayed behind the avatar object 610, and the floor object and the background are object at the same time.

During switching to a mode in which the avatar object 610 behaves in the virtual space 600B upon the reception of the input operation on the normal mode transition icon 182a, the processor 10 may control the display size and the display position of the avatar object 610 in the display area of the touch screen 15 of the user terminal 100 so as not to change significantly. For example, the processor 10 may arrange the virtual camera 620B at a position where the display size and the display position of the avatar object 610 do not change in the display area of the touch screen 15 of the user terminal 100. Thereby, it is possible to prevent the display of the avatar object 610, to which the user pays attention, from being significantly changed before and after the switching to the mode in which the avatar object 610 behaves in the virtual space 600B.

In FIG. 32A, an AR mode transition icon 182b is displayed instead of the normal mode transition icon 182a. The AR mode transition icon 182b is an icon for switching to a mode in which the avatar object 610 during the rock-paper-scissors game behaves in the augmented reality space again. The processor 10 receives an input operation on the AR mode transition icon 182b to execute, for example, the processing on the user terminal 100 shown in FIG. 29 and to switch to a mode in which the avatar object 610 behaves in the augmented reality space where the avatar object 610 is arranged on the acquired image. Even during the switching to the mode in which the avatar object 610 behaves in the augmented reality space upon the reception of the input operation on the AR mode transition icon 182b, the processor 10 may control the display size and the display position of the avatar object 610 in the display area of the touch screen 15 of the user terminal 100 so as not to change significantly.

FIGS. 32B and 32C are display examples at the same timings as those in FIGS. 30B and 30C, respectively, when the avatar object 610 behaves in the virtual space 600B. For example, when the input operation on the normal mode transition icon 182a is received at the timing at which FIG. 30B is displayed, the display example is switched to the display example shown in FIG. 32B, and when the input operation on the normal mode transition icon 182a is received at the timing at which FIG. 30C is displayed, the display example is switched to the display example shown in FIG. 32C.

In FIG. 29 through FIGS. 31A to 31C, an example has been described in which the augmented reality space is a space where only some of objects in the virtual space 600A are arranged with respect to the image acquired by the camera 17. However, the objects arranged with respect to the image acquired by the camera 17 are not limited thereto as long as including the avatar object 610 played by the player, and may be all the objects arranged in the virtual space 600A. In other words, the augmented reality space may be a space in which the entire virtual space similar to the virtual space 600A is arranged with respect to the image acquired by the camera 17.

In this case, the processor 10 may specify whether the entire virtual space similar to the virtual space 600A is arranged or whether only some objects in the virtual space 600A are arranged with respect to the image acquired by the camera 17, depending on the type of content (game type) to be live transmitted. Specifically, as long as the user can specify only the avatar object 610 or a surrounding situation of the avatar object 610, when a type of live game (for example, the game shown in FIGS. 9A, 9B, 10A and 10B or the rock-paper-scissors game) in which the game can progress is performed, the processor 10 causes only some objects in the virtual space 600A to be arranged with respect to the image acquired by the camera 17, and produces the behavior of the avatar object 610 in the augmented reality space as shown in FIGS. 29, 30A, 30A', 30B, 30C and the like.

On the other hand, in a case of performing a type of live game in which the user can easily carry on the game if the user can get a bird's eye view of the entire virtual space including the avatar object 610, the processor 10 causes the entire virtual space similar to the virtual space 600A to be miniaturized and arranged with respect to the image acquired by the camera 17, and produces the behavior of the avatar object 610 in the augmented reality space. Examples of the type of live game in which the user can easily carry on the game if the user can get a bird's eye view of the entire virtual space include the live games shown in FIGS. 11A to 11D, 12A to 12D and the like.

Figure 33A:
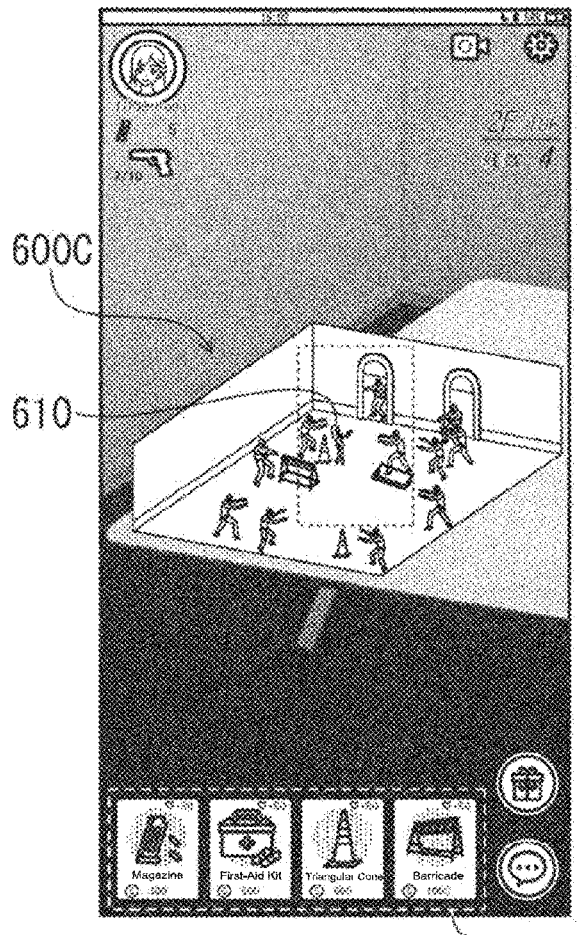
FIGS. 33A and 33B are diagrams showing a display example in which an augmented reality space is generated in which the entire virtual space is miniaturized and arranged with respect to an image acquired from a camera and an avatar object behaves in the augmented reality space.
Figure 33B:
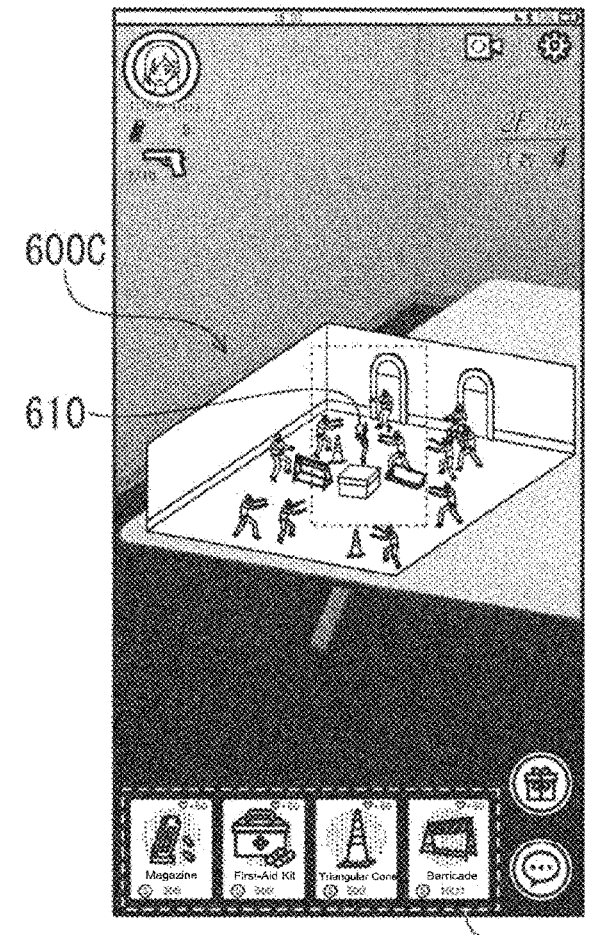

In FIGS. 11A to 11D and 12A to 12D, the virtual space similar to the virtual space 600A closer to the game play terminal 300 is defined closer to the user terminal 100 while the live game is in progress, and the field-of-view image corresponding to the field-of-view area of the virtual camera 620B in the virtual space is shown. In FIGS. 33A and 33B, the augmented reality space is generated in which the entire virtual space 600A described above is miniaturized and arranged with respect to the image acquired by the camera 17, and the display example is described in which the avatar object 610 behaves in the augmented reality space.

In FIGS. 33A and 33B, an acquired image C (an image of a large desk captured obliquely from above) is acquired by the camera 17, a top plate of a desk in the acquired image C is specified as a plane surface portion in step S81 of FIG. 29, and a predetermined position of the plane surface portion is set as an arrangement position where the field-of-view image from the virtual camera 620B is arranged. In FIGS. 33A and 33B, it is assumed that the entire virtual space 600A is defined as an AR virtual space 600C, and an image of the entire AR virtual space 600C obliquely viewed down from above by the virtual camera 620B is specified as a field-ofview image. Therefore, as shown in FIGS. 33A and 33B, the augmented reality space is generated in which the field-of-view image capable of enabling the entire AR virtual space 600C similar to the virtual space 600A to make a bird's eye view is arranged at a predetermined position of the top plate of the desk.

Figure 11A:
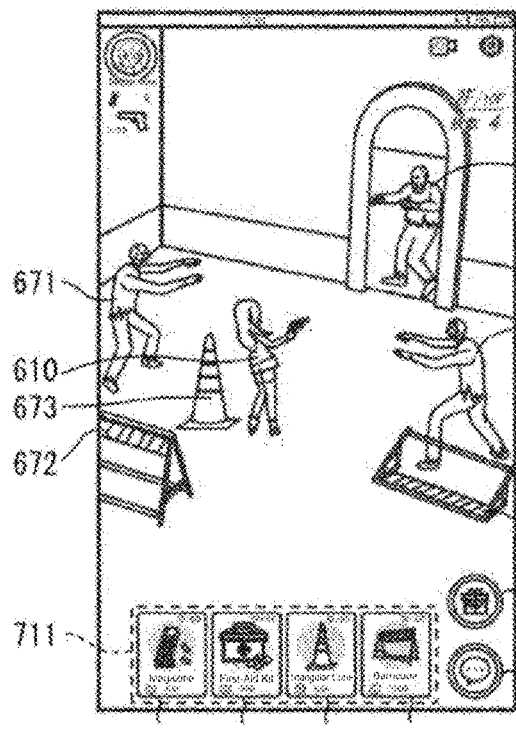
FIGS. 11A to 11D are diagrams showing another example of a field-of-view image visually recognized by the user of the user terminal.
Figure 11B:
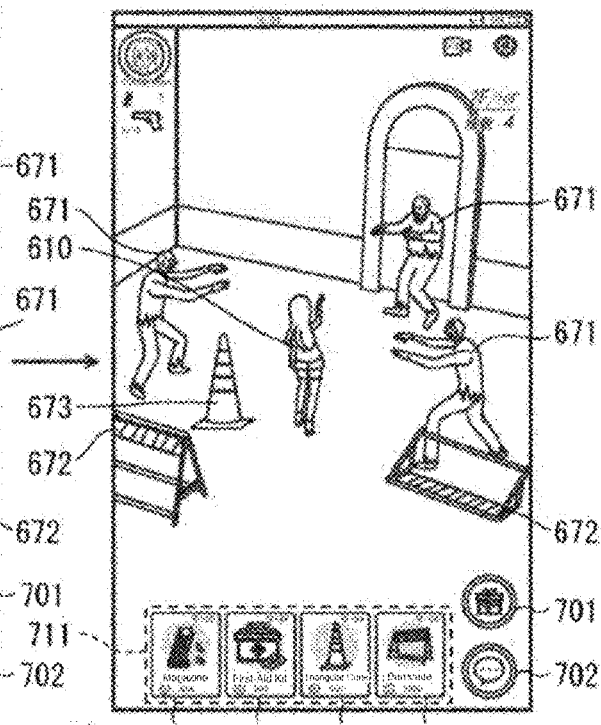

In FIG. 33A, the entire virtual space 600A at the timing of FIG. 11A is defined as the AR virtual space 600C, and an augmented reality space is displayed in which an image of the entire AR virtual space 600C captured obliquely from above by the virtual camera 620B is arranged on the top plate of the desk. In FIG. 33B, the entire virtual space 600A at the timing of FIG. 11C is defined as the AR virtual space 600C, and an augmented reality space is displayed in which an image of the entire AR virtual space 600C captured obliquely from above by the virtual camera 620B is arranged on the top plate of the desk.

Figure 11C:
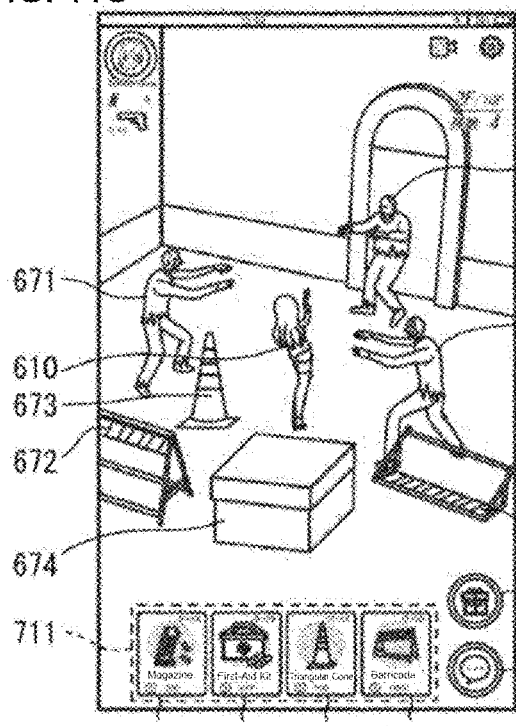
Figure 11D:
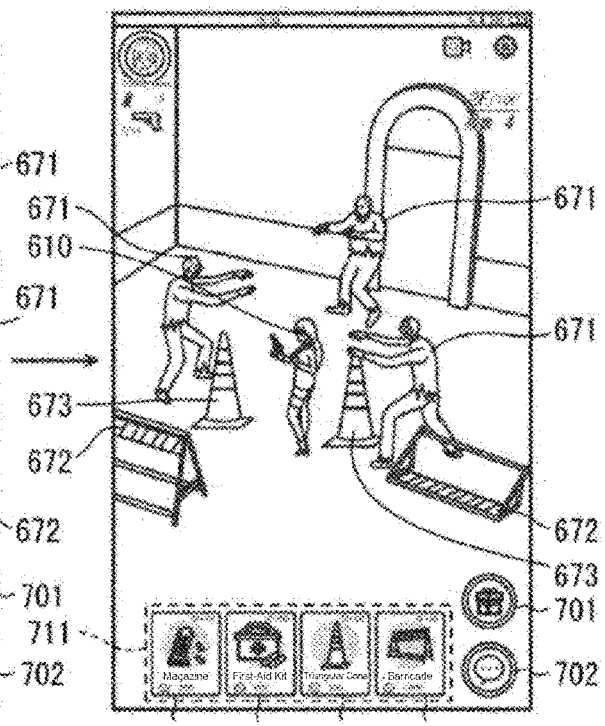

Images in a dotted line box in the AR virtual space 600C of FIGS. 33A and 33B are consistent with the images shown in FIGS. 11A and 11C, respectively. In FIGS. 33A and 33B, since the entire virtual space 600A is miniaturized, images (outside the dotted line box) of parts not shown in FIGS. 11A and 11C are also shown. In the AR virtual space 600C of FIGS. 33A and 33B, the plurality of objects including the avatar object 610 behave as shown in FIGS. 11A to 11D and the like. Therefore, the plurality of objects including the avatar object 610 also behave in the augmented reality space shown in FIGS. 33A and 33B.

Further, also in FIGS. 33A and 33B, various icons including the UI image 711 are displayed as in FIGS. 11A to 11D and the like. Therefore, it is possible to grasp, for example, the number of Zako enemies approaching the avatar object 610 in the virtual space, and to provide the user with the fun of having the user consider points such as whether to supply the item and where to supply the item after the user grasps that where the obstacle object making the Zako enemy stuck is supplied.

Although not shown in FIGS. 33A and 33B, the normal mode transition icon 182a and the display size adjustment UI 183 may be displayed as in FIGS. 30A to 30C and the like. In this case, the processor 10 may receive the input operation on the normal mode transition icon 182a to execute, for example, the processing on the user terminal 100 shown in FIG. 8 and to perform switching to the field-of-view image shown in FIGS. 11A to 11D and the like. In addition, the processor 10 may receive the input operation on the input gauge of the display size adjustment UI 183 to adjust the display size of the entire AR virtual space 600C arranged on the top plate of the desk in accordance with the input operation.

Effects of Present Embodiment

According to the present embodiment, the avatar object 610 can behave in the augmented reality space where the objects including the avatar object 610 are arranged on the acquired image acquired by the camera 17. Thereby, the user can be given the impression (realism) as if the avatar object 610 is actually behaving in the real space in front of the user. Further, the avatar object 610 in the augmented reality space moves depending on the motion of the player who is performing live, and outputs the speech sound of the performer. For this reason, the number of the variations in the behavior of the avatar object 610 in the augmented reality space significantly increases (becomes practically infinite depending on the performer), and behavior and speech can be made depending on the current situation, which attracts the user's attention.

Further, when the avatar object 610 behaves in the augmented reality space, the switching to the mode in which the avatar object 610 behaves in the virtual space is performed by the input operation on the normal mode transition icon 182a as illustrated in FIGS. 32A to 32C. In addition, when the avatar object 610 behaves in the virtual space, the switching to the mode in which the avatar object 610 behaves in the augmented reality space is performed by the input operation on the AR mode transition icon 182b as exemplarily illustrated in FIGS. 30A to 30C and the like. Thereby, the mode can be selected depending on the user's preference, and the user's attention can be further attracted.

In addition, when the avatar object 610 behaves in the augmented reality space, the display size of the avatar object 610 included in the field-of-view image can be adjusted by the input operation on the input gauge of the display size adjustment UI 183, depending on the user's preference. Further, even when the avatar object 610 is displayed extremely large or conversely small with respect to the acquired image based on the analysis result in step S80, the display size of the avatar object 610 can be adjusted to an appropriate display size for the acquired image. Therefore, it is possible to prevent the game from progressing while leaving a sense of incompatibility.

Further, as shown in FIGS. 30A to 30C, 31A to 31C and the like, the behaviors of the avatar object 610 arranged on the acquired images synchronize with one another among the plurality of user terminals, while the images (background of the avatar object 610) in the augmented reality space can be made different from one another, depending on the acquired images among the plurality of user terminals. Thereby, the number of the variations of the augmented reality space can be increased (becomes practically infinite depending to the acquired image) without an increase of a processing load on the game play terminal 300 that outputs the game progress information, so that the user's attention can be attracted. In addition, the game results (for example, win or loss) can be made different among the plurality of the user terminals in accordance with the operations input by the users. Thereby, when the user wins, a sense of superiority to another user can be aroused, and when the user loses, motivation for the next game play can be improved.

Further, the game progressing in the augmented reality space is a live game in which the player performs live as shown in FIGS. 30A to 30C, 33A, 33B and the like. Thereby, it is possible to improve the user's sense of presence and to improve the taste (interest) of the game.

In addition, since the rock-paper-scissors game among the live games progresses, in accordance with the input operation on the selection UI 180 from the user and the behavior of the avatar object 610 raising the option object, the preference of the game can be improved.

Further, the UI (for example, the selection UI 180 and the UI image 711 for receiving the item-supply operation) for the user to take the action on the player is displayed depending on the progress of the game (for example, fluctuations in the number of Zako enemies in the game shown in FIGS. 33A and 33B such as a first round and a second round in the rock-paper-scissors game). Thereby, it is possible to improve the operability of the user for the progress of the game.

Further, as shown in FIGS. 30A to 30C, 33A, 33B and the like, depending on the type of content (type of live game), it is possible to distinguish whether to arrange a part of the virtual space or the entire virtual space on the acquired image. Thereby, it is possible to generate different augmented reality spaces depending on the types of content and to improve the taste of the game.

<Modifications>

Modifications of the embodiment described above will be listed below.

(1) An example has been described in which the acquired image constituting the augmented reality space in the above embodiment is an image captured in real time by the camera 17. However, the acquired image constituting the augmented reality space is not limited to the image captured in real time, and may be an image captured in the past. Further, the acquired image constituting the augmented reality space may be an image provided by a service providing device (server) that provides images (including panoramic images) captured at various places in the real space. The image provided in this case may be, for example, an image of the position where the user terminal 100 exists, and an image of a position on a map designated by the user when a so-called position game of moving on the map is being performed.

In the generation of the augmented reality space, an example has been described in which the acquired image is used as it is, and the character is superimposed on the acquired image and is displayed on the touch screen 15. However, the acquired image used in the generation of the augmented reality space is subjected to predetermined processing and editing, and the character may be superimposed on the processed and edited and displayed on the image touch screen 15. The predetermined processing and editing may be, for example, enlargement and reduction according to the input operation and gradation, sharpness, color correction, and special effects according to the current situation (for example, time, date, and time).

(2) In the embodiment described above, an example is shown with reference to FIGS. 28B and 29 as a method of displaying the image in the augmented reality space where some of the objects in the virtual space 600A are arranged on the acquired image. However, as the method of displaying the image in the augmented reality space, other methods may be used as long as the avatar object 610 behaves in the state of being arranged on the acquired image acquired by the camera 17. For example, after the all objects (the viewer object, the floor object, and the background object) in the AR virtual space 600C are arranged in the same manner as the virtual space 600A, display setting of other objects (the viewer object and the decoration object) other than the avatar object 610 and the option objects 281 to 283 is set to non-display setting, the field-of-view image from the virtual camera 620B includes only the avatar object 610 and the option objects 281 to 283 and does not include other objects, and the field-of-view image is superimposed on the acquired image acquired by the camera 17 to generate the image in the augmented reality space. In this case, when the input operation on the normal mode transition icon 182a is received, the objects (the viewer object and the decoration object) that are arranged in the AR virtual space 600C but are set to the non-display setting are switched to the display setting, whereby the avatar object 610 may behaves in the virtual space similar to the virtual space 600A instead of the augmented reality space. Thereby, the processing at the time of transition to the normal mode can be simplified and the processing load can be reduced.

(3) The display mode of the avatar object 610 in the embodiment described above can be different for each user depending on, for example, the types of acquired image used for the generation of the augmented reality space (for example, a room image, a shopping mall image, and a landscape image). For example, even when the game progress information sent from the game play terminal 300 is the same, a costume of the avatar object 610 may be pajama for the user terminal whose acquired image is a room image, and a costume of the avatar object 610 may be climbing suits for the user terminal whose acquired image is a mountain image. In this case, a plurality of types of costume data of the avatar object 610 may be stored in advance on the user terminal 100. The target for changing the display mode of the avatar object 610 is not limited to the costume, but may be a hairstyle, a skin color, and a degree of makeup. Thereby, the number of the variations of the augmented reality space can be increased (becomes practically infinite depending to the acquired image) without an increase of a processing load on the game play terminal 300 that outputs the game progress information, so that the user's attention can be attracted.

Alternatively or additionally, the display mode of the avatar object 610 may be different from the display mode displayed on the user terminal of another user according to the charge by the user during the game. In addition, the display mode of the avatar object 610 may be different depending on the ranking of the user that is updated depending on the result of the live game.

(4) In step S85 of FIG. 29 in the embodiment described above, an example has been described in which the virtual camera 620B is arranged in the same direction as the capturing direction (orientation and inclination) of the camera 17 at the time of capturing the acquired image. However, the position and direction of the virtual camera 620B to be initially arranged are not limited thereto, and may be set depending on the type of content, set depending on the analysis result in step S80, and set to the position and direction set in advance.

Further, an example has been described in which after the virtual camera 620B is initially arranged in step S85, the virtual camera 620B is controlled in synchronization with the changes in the position, direction, and inclination of the camera 17 as shown in step S89 of FIG. 29. However, the virtual camera 620B after the initial arrangement may control the position, direction, and inclination in accordance with the input operation (for example, the swipe operation and the touch operation) from the user. Thereby, the field-of-view area of the virtual camera 620B can be changed depending on the operation input by the user, and as a result, the field-of-view image arranged on the acquired image can be changed. Specifically, the avatar objects (for example, only the avatar object 610, the avatar object 610 and other objects, and the entire virtual space) arranged on the acquired image may be rotated or moved by the swipe operation. Thereby, for example, even when the augmented reality space is generated and the avatar object 610 behaves in a narrow space where the position or direction of the user terminal 100 cannot be sufficiently adjusted, the avatar object 610 can be rotated and moved by the input operation on the touch panel 15.

(5) The embodiment described above illustrates the live game, in which the player of the rock-paper-scissors game shown in FIGS. 30A to 30C and the like fights against the user, as a content that progresses in the augmented reality space, and the live game in which the player participates by providing the support in the game in which the player carries on the game shown in FIGS. 33A, 33B and the like. However, the live game progressing in the augmented reality space is not limited thereto, and may be a puzzle game in which a player and a user operate alternately a pachinko and compete for how many objects imitating fruits blown in the pachinko can be placed on an object imitating a tray arranged in front (which can be placed without failure), or a participation type game in which an avatar object operated by a player, a solder object operated by each of a plurality of users, and an enemy object operated by a game program appear and the user defeats the enemy object while protecting the avatar object 610. The puzzle game may be configured to arrange some objects of the virtual space 600A on the acquired image and to generate an augmented reality space by as in the rock-paper-scissors game shown in FIGS. 30A to 30C and the like, and the participation type game may be configured to arrange the entire virtual space 600A on the acquired image and to generate an augmented reality space as in the game shown in FIGS. 33A, 33B and the like.

In addition, the content progressing in the augmented reality space is not limited to the live game, and may be, for example, a viewing type content for the user to watch a state where the avatar object 610 is singing live or is chatting live.

(6) In the embodiment described above, an example has been described in which the selection UI 180 is displayed in FIGS. 30A to 30C and the UI image 711 is displayed in FIGS. 33A and 33B in order for the user to perform an action on the player. All of these UI images can be UIs for performing actions related to the progress of the game. However, the action performed on the player by the user is not limited to the action related to the progress of the game, and may be an action of sending the comment from the user to the player as described above and an action of performing sound chat. In this case, when the image in the augmented reality space is displayed, the comment input icon 186 described above or a UI image for performing sound chat may be displayed.

(7) In the embodiment described above, it is assumed that the camera 17 of the user terminal 100 is provided on the surface opposite to the surface on which the display unit 152 is provided and the acquired image displayed on the display unit 152 during the capturing with the camera 17 is included (matched) in the actual landscape that the user is directly viewing. However, the camera 17 of the user terminal 100 is not limited to being provided on the surface opposite to the surface on which the display unit 152 is provided, and may be provided on the surface on which the display unit 152 is provided (such that the avatar object 610 is arranged to behave on the acquired image including the user himself/ herself), or may be provided separately from the user terminal 100 so as to be able to communicate with the user terminal 100.

<Supplementary Note>

Matters described in each of the above embodiments will be described below as Supplementary notes.

(Supplementary Note 1):

According to an aspect of an embodiment shown in the present disclosure, there is provided a program to be executed in an information terminal device which comprises a processor, a memory, an input unit, a display unit, and an imaging sensor, the program causing the processor to execute: a step (S86, S90) of displaying on the display unit an image of an augmented reality space where a character is arranged with respect to an acquired image acquired by the imaging sensor; and a step (S88) of producing a behavior of the character in the augmented reality space on the basis of data transmitted from an external source, wherein the data is motion data and sound data that are input by a performer who plays live as the character.

(Supplementary Note 2):

In Supplementary note 1, the program causes the processor to execute: a step (S25) of displaying on the display unit an image in which the character is arranged in a virtual space different from the augmented reality space; and a step of switching, depending on an operation input by a user, the image displayed on the display unit between an image of the augmented reality space and an image of the virtual space (for example, processing when an input operation on a normal mode transition icon 182a is received, processing when an input operation on an AR mode transition icon 182b is received, see FIGS. 30A to 30C and FIGS. 32A to 32C).

(Supplementary Note 3):

In Supplementary note 1 or Supplementary note 2, the program causes the processor to execute a step of adjusting a size of the character based on an operation input by the user (for example, processing when an input operation on a display size adjustment UI 183 is received, see FIG. 30A').

(Supplementary Note 4):

In any one of Supplementary notes 1 to 3, the motion data and the sound data input by the performer are commonly transmitted to a plurality of information terminal devices used by a plurality of users; and a behavior of the character is common among the plurality of information terminal devices, while images of the augmented reality space where the character is arranged, in the plurality of information terminal devices, are different depending on acquired images acquired by imaging sensors of the plurality of information terminal devices, respectively (see FIGS. 30A to 30C and FIGS. 31A to 31C).

(Supplementary Note 5):

In any one of Supplementary notes 1 to 4, the data transmitted from the external source includes the motion data and the sound data that are input by the performer who carries on a game live; and the step of producing the behavior includes producing a behavior of the character who carries on the game based on the data transmitted from the external source (see FIGS. 30A to 30C and FIGS. 31A to 31C).

(Supplementary Note 6):

In Supplementary note 5, the game progresses based on the behavior (motion) of the character and an operation input by the user on the information terminal device (an input operation on a selection UI 180).

(Supplementary Note 7):

In Supplementary note 6, the data transmitted from the external source is commonly transmitted to the plurality of information terminal devices used by the plurality of users; and the behavior of the character is common among the plurality of information terminal devices, while results of the game in the plurality of information terminal devices are different depending on an operation by users on the plurality of information terminal devices (see FIGS. 30A to 30C and FIGS. 31A to 31C).

(Supplementary Note 8):

In any one of Supplementary notes 1 to 7, the program causes the processor to execute a step of displaying on the display unit a UI (User Interface) allowing the user to perform an action on the performer (see FIGS. 30A to 30C and FIGS. 33A and 33B).

(Supplementary Note 9):

In Supplementary note 8, the data transmitted from the external source includes the motion data and the sound data that are input by the performer who carries on a game live; the step of producing the behavior of includes producing a behavior of the character who carries on the game in the augmented reality space, based on the data transmitted from the external source; and the UI includes a UI for performing the action in accordance with the progress of the game (selection UI 180, UI image 711).

(Supplementary Note 10):

In any one of Supplementary notes 1 to 9, the data transmitted from the external source includes data for enabling the display unit to display an image in which the character is arranged in the virtual space; and the step of displaying on the display unit the image of the augmented reality space includes: displaying on the display unit an image in which the virtual space containing the character as a whole is arranged with respect to the acquired image, when the transmitted data is a first type of content data (FIGS. 33A and 33B); and displaying on the display unit an image in which a part of the virtual space containing the character is arranged with respect to the acquired image, when the transmitted data is a second type of content data (FIGS. 30A to 30C).

(Supplementary Note 11):

According to another aspect of an embodiment shown in the present disclosure, there is provided a method to be executed by an information terminal device which includes a processor, a memory, an input unit, a display unit, and an imaging sensor, the method including: a step (S86, S90) of displaying on the display unit an image of an augmented reality space where a character is arranged with respect to an acquired image acquired by the imaging sensor; and a step (S88) of producing a behavior of the character in the augmented reality space on the basis of data transmitted from an external source, wherein the data is motion data and sound data that are input by a performer who plays live as the character.

(Supplementary Note 12):

According to further another aspect of an embodiment shown in the present disclosure, there is provided an information terminal device which includes a processor, a memory, an input unit, a display unit, and an imaging sensor, the information terminal device being configured to: display on the display unit an image of an augmented reality space where a character is arranged with respect to an acquired image acquired by the imaging sensor (S86, S90); and produce a behavior of the character in the augmented reality space on the basis of data transmitted from an external source, wherein the data is motion data and sound data that are input by a performer who plays live as the character (S88).

Implementation Example by Software

The control blocks (particularly, the control units 110, 210, 310, and 410) of the user terminal 100, the server 200, the game play terminal 300 (HMD set 1000), and the transmission terminal 400 may be implemented by a logic circuit (hardware) formed in an integrated circuit (IC chip), or may be implemented by software.

In the latter case, each of the user terminal 100, the server 200, the game play terminal 300 (HMD set 1000), and the transmission terminal 400 includes a computer that performs instructions of a program being software for implementing each function. The computer includes, for example, one or more processors and a computer-readable recording medium stored with the above-described program. In the computer, the processor reads from the recording medium and performs the program to achieve the object of the present invention. As the above-described processor, a CPU (Central Processing Unit) can be used, for example. As the above-described recording medium, a "non-transitory tangible medium" such as a ROM (Read Only Memory) as well as a tape, a disk, a card, a semiconductor memory, and a programmable logic circuit can be used. A RAM (Random Access Memory) or the like in which the above-described program is developed may be further included. The above-described program may be supplied to the above-described computer via an arbitrary transmission medium (such as a communication network and a broadcast wave) capable of sending the program. Note that an aspect of the present invention may also be implemented in a form of a data signal embedded in a carrier wave in which the program is embodied by electronic transmission.

An aspect of the present invention is not limited to each of the above-described embodiments, various modifications are possible within the scope of the present invention defined by aspects, and embodiments that are made by suitably combining technical means disclosed according to the different embodiments are also included in the technical scope of an aspect of the present invention.

REFERENCE SIGNS LIST

1: system;
2: network;
3, 3A, 3B: users (first users);
4: player (performer);
10, 20, 30, 40: processors;
11, 21, 31, 41: memories;
12, 22, 32, 42: storages;
13, 23, 33, 43: communication IFs;
14, 24, 34, 44: input/output IFs;
15, 45: touch screens;
17: camera;
18: ranging sensor;
51: monitor;
52: gaze sensor;
53: first camera;
54: second camera;
55: microphone;
56: speaker;
100, 100A, 100B, 100C: user terminals (computer, first computer, first information processing unit);
110, 210, 310, 410: control units (first control unit, second control unit);
111, 311, 413: operation receivers;
112, 312, 412: display controllers;
113, 313: UI controllers;
114, 314: animation generators;
115, 315: game coordinators;
116, 316: virtual space controllers;
117: moving image reproducer;
120, 220, 320, 420: storage units (first storage unit, second storage unit);
131, 231, 331: game programs (program, first program);
132, 232, 332: game information;
133, 233, 333: user information;
151, 451: input units;
152, 452: display units (display);
200: server;
211: communication mediator;
212: log generator;
213: list generator;
234, 421: user lists;
300: game play terminal (external device, second external device);
317: response processor;

400: transmission terminal (external device, first external device, computer, second information processing unit);
411: communication controller;
414: sound receiver;
415: motion specifier;
416: behavior instruction data generator;
422: motion list;
423: transmission program (program, second program);
540, 1020, 1021: controllers;
500: HMD;
510: HMD sensor;
520: motion sensor;
530: display;
600A, 600B: virtual spaces;
610: avatar object (character);
620A, 620B: virtual cameras;
631, 632, 633, 634: objects;
640A, 640B: field-of-view areas;
650, 660: field-of-view images;
671: enemy objects;
672, 673: obstacle objects;
674: presentment object;
691, 692: speeches;
701, 702, 703A, 70B, 704A, 704B, 705, 706, 711, 711A, 711B, 711C, 711D, 722, 723, 745, 745A, 745B, 745C, 752, 762, 763, 930, 2011, 2022, 2031, 2032, 2033, 2034, 2037, 2038, 2051, 2063, 2072, 2073, 2075: UI images (message UI, UI);
721: download screen;
731: user list screen (list);
732, 732A, 732B, 732C, 742, 742A, 742B, 742C: record images;
733, 733A, 733B, 733C: user names;
734, 734A, 734B, 734C: tag information;
735, 735A, 735B, 735C: icons;
741: motion list screen (option);
743, 743A, 743B, 743C: motion names;
744, 744A, 744B, 744C, 753: motion images;
751: transmission screen;
761: transmission completion screen;
810A, 810B: motion moving images;
820A, 820B: speech sounds;
910A, 910B: moving images;
920A, 920B: sound;
1000: HMD set;
1010: object;
1030: storage medium;
2010: home screen;
2020: ranking screen;
2021: title image;
2026, 2026A, 2026B: ranking;
2027, 2027A, 2027B: amount of charge;
2028, 2028A, 2028B: the number of sending processes;
2029: notification of completion of sending;
2030: last sending date;
2035: detailed display area;
2036: scroll bar;
2040: detailed screen;
2050, 2060: preparation screens;
2052: text;
2053, 2061: selected images;
2054A, 2054B, 2054C, 2062A, 2062B, 2062C, 2062D, 2062E, 2062F: options;
2070: sound input screen; and
2074: tag image.

The invention claimed is:

1. A computer readable storage medium containing a program to be executed by at least one information terminal device of a plurality of information terminal devices in a system that includes: a game play terminal configured to be operated by a performer who carries on a game; and the plurality of information terminal devices configured to be operated by a plurality of users who support a progress of the game, each information terminal device comprising a processor, a memory, an input unit, a display unit, and an imaging sensor,
the program, when executed by the processor, causing the processor to execute steps of:
arranging a virtual camera to acquire an image of a character that is arranged in a virtual space for augmented reality defined for the at least one information terminal device, wherein the character is an object that behaves as an avatar of the performer;
generating an image of an augmented reality space by superimposing, on an acquired image acquired by the imaging sensor, a field-of-view image including an image of the character acquired by the virtual camera;
displaying, on the display unit, the generated image of an augmented reality space;
producing a behavior of the character on a basis of transmission data transmitted from the game play terminal, wherein the transmission data is motion data and sound data that are input by the performer who plays live as the character;
displaying on the display unit an image in which the character is arranged in a similar virtual space to a virtual space defined in the game play terminal; and
switching, depending on an operation input by a user, the image displayed on the display unit between the image of the augmented reality space and the image in which the character is arranged in the similar virtual space,
wherein the motion data and the sound data that are input by the performer are commonly transmitted to the plurality of information terminal devices used by a plurality of users, and
wherein the behavior of the character is common among the plurality of information terminal devices, while images of the augmented reality space where the character is arranged, in the plurality of information terminal devices, are different depending on acquired images acquired by imaging sensors of the plurality of information terminal devices, respectively.

2. The computer readable storage medium according to claim 1, wherein the program, when executed by the processor, causes the processor to execute a step of adjusting a size of the character based on an operation input by the user.

3. The computer readable storage medium according to claim 1, wherein:
the transmission data includes the motion data and the sound data that are input by the performer who carries on the game live; and
the step of producing the behavior includes producing a behavior of the character who carries on the game based on the transmission data.

4. The computer readable storage medium according to claim 3, wherein the game progresses based on the behavior of the character and an operation input by the user on the at least one information terminal device.

5. The computer readable storage medium according to claim 4, wherein:
the transmission data is commonly transmitted to the plurality of information terminal devices used by a plurality of users; and the behavior of the character is common among the plurality of information terminal devices, while results of the game in the plurality of information terminal devices are different depending on operations input by users on the plurality of information terminal devices, respectively.

6. The computer readable storage medium according to claim 1, wherein the program, when executed by the processor, causes the processor to execute a step of displaying on the display unit a UI (User Interface) allowing a user to perform an action on the performer.

7. The computer readable storage medium according to claim 6, wherein:
the transmission data includes the motion data and the sound data that are input by the performer who carries on the game;
the step of producing the behavior includes producing a behavior of the character who carries on the game in the augmented reality space, based on the transmission data; and
the UI includes a UI for performing the action in accordance with progress of the game.

8. The computer readable storage medium according to claim 1, wherein the step of displaying on the display unit the image of the augmented reality space includes:
displaying on the display unit an image in which a virtual space containing the character as a whole is arranged with respect to the acquired image, when the transmission data is a first type of content data; and
displaying on the display unit an image in which a part of the virtual space containing the character is arranged with respect to the acquired image, when the transmission data is a second type of content data.

9. A method to be executed by at least one information terminal device of a plurality of information terminal devices in a system that includes: a game play terminal configured to be operated by a performer who carries on a game; and the plurality of information terminal devices configured to be operated by a plurality of users who support a progress of the game, each information terminal device comprising a processor, a memory, an input unit, a display unit, and an imaging sensor, the method comprising steps of:
arranging a virtual camera to acquire an image of a character that is arranged in a virtual space for augmented reality defined for the at least one information terminal device, wherein the character is an object that behaves as an avatar of the performer;
generating an image of an augmented reality space by superimposing, on an acquired image acquired by the imaging sensor, a field-of-view image including an image of the character acquired by the virtual camera;
displaying, on the display unit, the generated image of an augmented reality space;
producing a behavior of the character on a basis of transmission data transmitted from the game play terminal, wherein the transmission data is motion data and sound data that are input by the performer who plays live as the character;
displaying on the display unit an image in which the character is arranged in a similar virtual space to a virtual space defined in the game play terminal; and
switching, depending on an operation input by a user, the image displayed on the display unit between the image of the augmented reality space and the image in which the character is arranged in the similar virtual space,
wherein the motion data and the sound data that are input by the performer are commonly transmitted to the plurality of information terminal devices used by a plurality of users, and
wherein the behavior of the character is common among the plurality of information terminal devices, while images of the augmented reality space where the character is arranged, in the plurality of information terminal devices, are different depending on acquired images acquired by imaging sensors of the plurality of information terminal devices, respectively.

10. The method according to claim 9, further comprising a step of adjusting a size of the character based on an operation input by the user.

11. The method according to claim 9, wherein:
the transmission data includes the motion data and the sound data that are input by the performer who carries on the game live; and
the step of producing the behavior includes producing a behavior of the character who carries on the game based on the transmission data.

12. The method according to claim 11, wherein the game progresses based on the behavior of the character and an operation input by the user on the at least one information terminal device.

13. The method according to claim 12, wherein:
the transmission data is commonly transmitted to the plurality of information terminal devices used by a plurality of users; and
the behavior of the character is common among the plurality of information terminal devices, while results of the game in the plurality of information terminal devices are different depending on operations input by users on the plurality of information terminal devices, respectively.

14. The method according to claim 9, further comprising a step of displaying on the display unit a UI (User Interface) allowing a user to perform an action on the performer.

15. The method according to claim 14, wherein:
the transmission data includes the motion data and the sound data that are input by the performer who carries on the game;
the step of producing the behavior includes producing a behavior of the character who carries on the game in the augmented reality space, based on the transmission data; and
the UI includes a UI for performing the action in accordance with progress of the game.

16. The method according to claim 9, wherein the step of displaying on the display unit the image of the augmented reality space includes:
displaying on the display unit an image in which a virtual space containing the character as a whole is arranged with respect to the acquired image, when the transmission data is a first type of content data; and
displaying on the display unit an image in which a part of the virtual space containing the character is arranged with respect to the acquired image, when the transmission data is a second type of content data.

17. An information terminal device which is configured as one information terminal device of a plurality of information terminal devices in a system that includes: a game play terminal configured to be operated by a performer who carries on a game; and the plurality of information terminal devices configured to be operated by a plurality of users who support a progress of the game, each information terminal device comprising a processor, a memory, an input unit, a display unit, and an imaging sensor, the information terminal device being configured to:

arrange a virtual camera to acquire an image of a character that is arranged in a virtual space for augmented reality defined for the one information terminal device, wherein the character is an object that behaves as an avatar of the performer;

generate an image of an augmented reality space by superimposing, on an acquired image acquired by the imaging sensor, a field-of-view image including an image of the character acquired by the virtual camera;

display, on the display unit, the generated image of an augmented reality space;

produce a behavior of the character on a basis of transmission data transmitted from the game play terminal, wherein the transmission data is motion data and sound data that are input by the performer who plays live as the character;

display, on the display unit of the one information terminal device, an image in which the character is arranged in a similar virtual space to a virtual space defined in the game play terminal; and switch, depending on an operation input by a user, the image displayed on the display unit between the image of the augmented reality space and the image in which the character is arranged in the similar virtual space, wherein the motion data and the sound data that are input by the performer are commonly transmitted to the plurality of information terminal devices used by a plurality of users, and wherein the behavior of the character is common among the plurality of information terminal devices, while images of the augmented reality space where the character is arranged, in the plurality of information terminal devices, are different depending on acquired images acquired by imaging sensors of the plurality of information terminal devices, respectively.

\* \* \* \* \*